United States Patent
Reid et al.

(10) Patent No.: US 10,789,373 B2
(45) Date of Patent: *Sep. 29, 2020

(54) SYSTEM AND METHOD FOR SECURELY STORING AND SHARING INFORMATION

(71) Applicant: Seed Protocol, LLC, Athens, OH (US)

(72) Inventors: Thomas Alan Reid, Athens, OH (US); Dennie Guy, Crawford, CO (US)

(73) Assignee: REID CONSULTING GROUP, INC., Athens, OH (US)

( * ) Notice: Subject to any disclaimer, the term of this patent is extended or adjusted under 35 U.S.C. 154(b) by 69 days.

This patent is subject to a terminal disclaimer.

(21) Appl. No.: 15/952,530

(22) Filed: Apr. 13, 2018

(65) Prior Publication Data

US 2018/0232526 A1 Aug. 16, 2018

Related U.S. Application Data

(63) Continuation-in-part of application No. 15/170,981, filed on Jun. 2, 2016, now Pat. No. 9,973,484, which
(Continued)

(51) Int. Cl.
*G06F 21/60* (2013.01)
*G06F 21/62* (2013.01)
(Continued)

(52) U.S. Cl.
CPC ........ *G06F 21/602* (2013.01); *G06F 21/6218* (2013.01); *H04L 9/0637* (2013.01);
(Continued)

(58) Field of Classification Search
CPC ........ G06F 21/60; G06F 21/62; G06F 21/602; G06F 21/6218; H04L 9/06; H04L 9/08;
(Continued)

(56) References Cited

U.S. PATENT DOCUMENTS 8,555,342 B1 * 10/2013 Lazar .................. G06F 21/31
713/193
8,566,578 B1   10/2013 Banerjee
(Continued)

FOREIGN PATENT DOCUMENTS

CN    102014133 A   4/2011

OTHER PUBLICATIONS

International Search Report and Written Opinion dated Feb. 2, 2016 for corresponding International Application No. PCT/US2015/059717.
(Continued)

*Primary Examiner* — Thanhnga B Truong
(74) *Attorney, Agent, or Firm* — Tarolli, Sundheim, Covell & Tummino LLP

(57) ABSTRACT

The present application generally relates to systems, devices, and methods to conduct the secure exchange of encrypted data using a three-element-core mechanism consisting of the key masters, the registries and the cloud lockboxes with application programming interfaces providing interaction with a wide variety of user-facing software applications. Together the mechanism provides full lifecycle encryption enabling cross-platform sharing of encrypted data within and between organizations, individuals, applications and devices. Further the mechanism generates chains of encrypted blocks to provide a distributed indelible ledger and support external validation. Triangulation among users, applications and the mechanism deliver both enterprise and business ecosystem cyber security features. Crowdsourcing of anomaly detection extends to users and to subjects of the data. Robust identity masking offers the benefits of anonymization while retaining accountability and enabling two-way communications. The mechanism may also provide
(Continued)

Vulnerabilities in Existing Architectures high availability through multi-level fail over or operations to multiple instances of the core mechanism.

24 Claims, 22 Drawing Sheets

Related U.S. Application Data is a continuation-in-part of application No. 14/539,614, filed on Nov. 12, 2014, now Pat. No. 9,390,228, which is a continuation-in-part of application No. 13/665,861, filed on Oct. 31, 2012, now Pat. No. 9,378,380.

(60) Provisional application No. 61/553,883, filed on Oct. 31, 2011.

(51) Int. Cl.
*H04L 9/32* (2006.01)
*H04L 9/14* (2006.01)
*H04L 9/08* (2006.01)
*H04L 9/06* (2006.01)

(52) U.S. Cl.
CPC ............... *H04L 9/083* (2013.01); *H04L 9/14* (2013.01); *H04L 9/3213* (2013.01); *H04L 9/3231* (2013.01); *H04L 9/3239* (2013.01); *H04L 9/3271* (2013.01); *H04L 2209/38* (2013.01); *H04L 2209/42* (2013.01)

(58) Field of Classification Search
CPC . H04L 9/14; H04L 9/32; H04L 9/0637; H04L 9/083; H04L 9/3213; H04L 9/3231; H04L 9/3239; H04L 9/3271
See application file for complete search history.

(56) References Cited

U.S. PATENT DOCUMENTS

| | | |
|---|---|---|
| 9,246,676 B2 | 1/2016 | Leavy |
| 9,270,663 B2 | 2/2016 | Kravits |
| 2004/0078593 A1 | 4/2004 | Hind |
| 2007/0192836 A1 | 8/2007 | Shiran |
| 2008/0104705 A1 | 5/2008 | Hasbun |
| 2008/0226073 A1* | 9/2008 | Hawkes ................. H04L 63/04 380/270 |
| 2009/0228950 A1 | 9/2009 | Reed |
| 2010/0122120 A1 | 5/2010 | Lin |
| 2011/0055202 A1 | 3/2011 | Heimendinger |
| 2011/0066863 A1 | 3/2011 | Katzenbeisser |
| 2012/0257759 A1 | 10/2012 | Nick |
| 2013/0254897 A1* | 9/2013 | Reedy .................... G06F 21/10 726/26 |
| 2013/0275470 A1 | 10/2013 | Cao |
| 2013/0297662 A1* | 11/2013 | Sharma ............... H04L 63/0815 707/827 |
| 2014/0046708 A1 | 2/2014 | Werner |
| 2014/0068202 A1 | 3/2014 | Goddard |
| 2014/0082749 A1* | 3/2014 | Holland ............... G06F 21/645 726/29 |
| 2014/0129047 A1 | 5/2014 | Barrett |
| 2014/0245012 A1 | 8/2014 | Arya |
| 2015/0074409 A1 | 3/2015 | Reid |

OTHER PUBLICATIONS

International Search Report and Written Opinion dated Aug. 23, 2017 for corresponding International Application No. PCT/US2017/035695.
Extended European Search Report dated Apr. 13, 2018 for corresponding European Application No. 15859389.7.

* cited by examiner

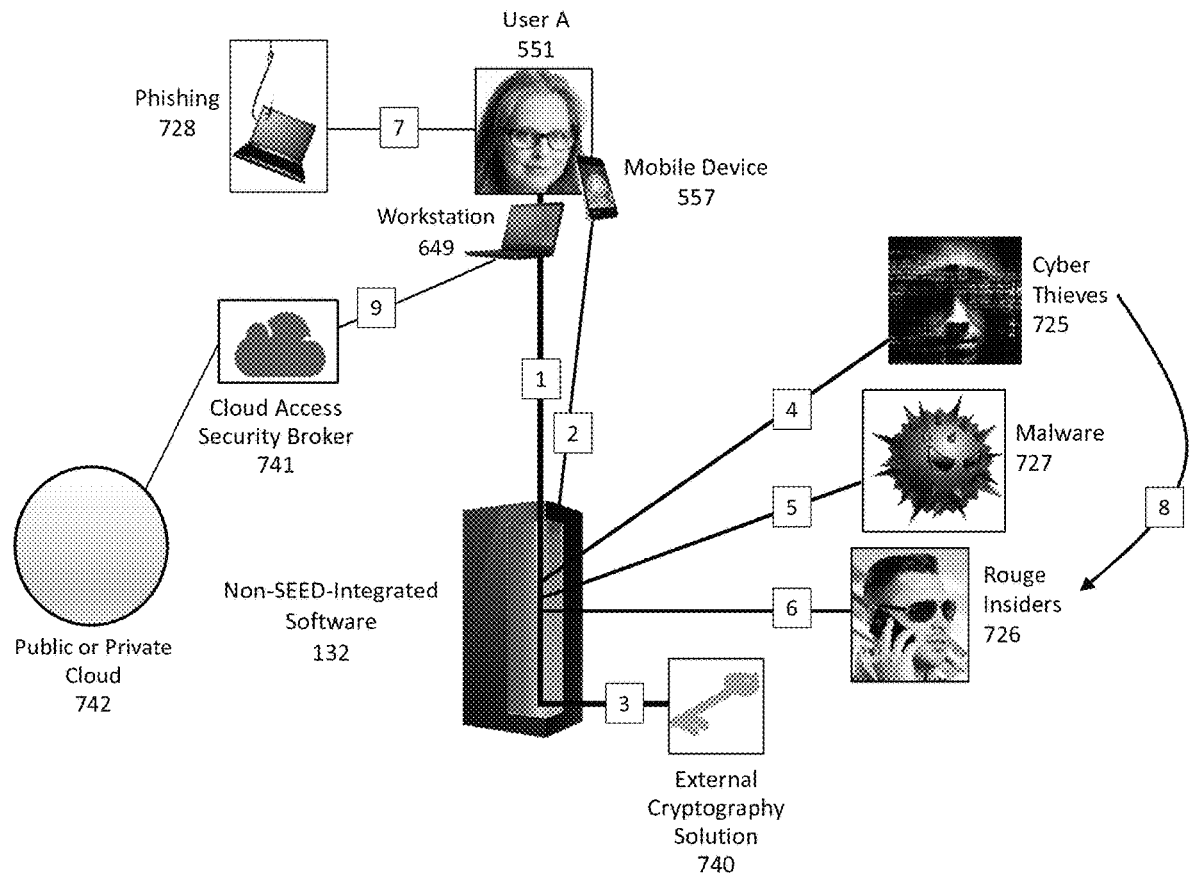
Figure 1: Vulnerabilities in Existing Architectures

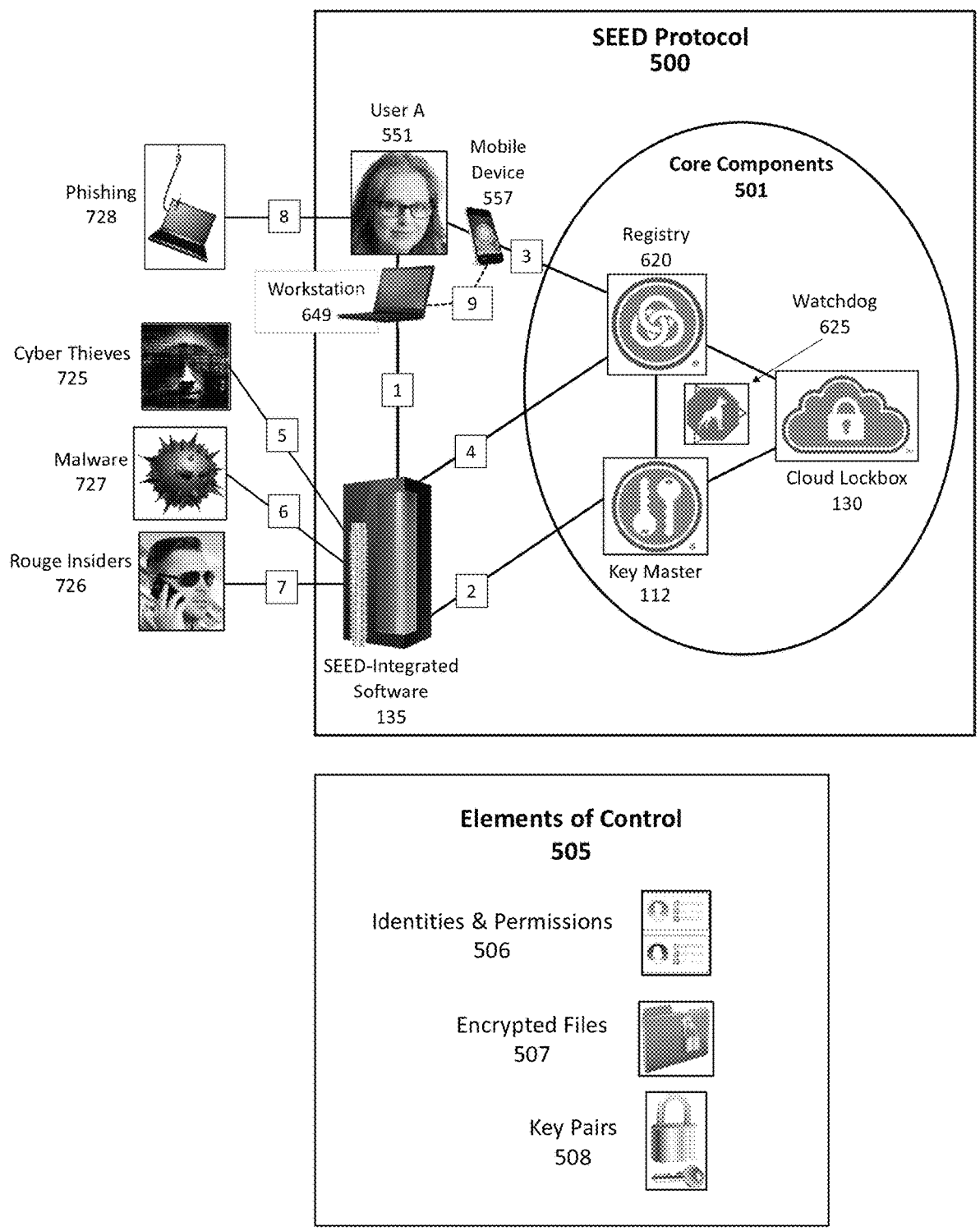
Figure 2: SEED Overview and Multi-Factor Authentication

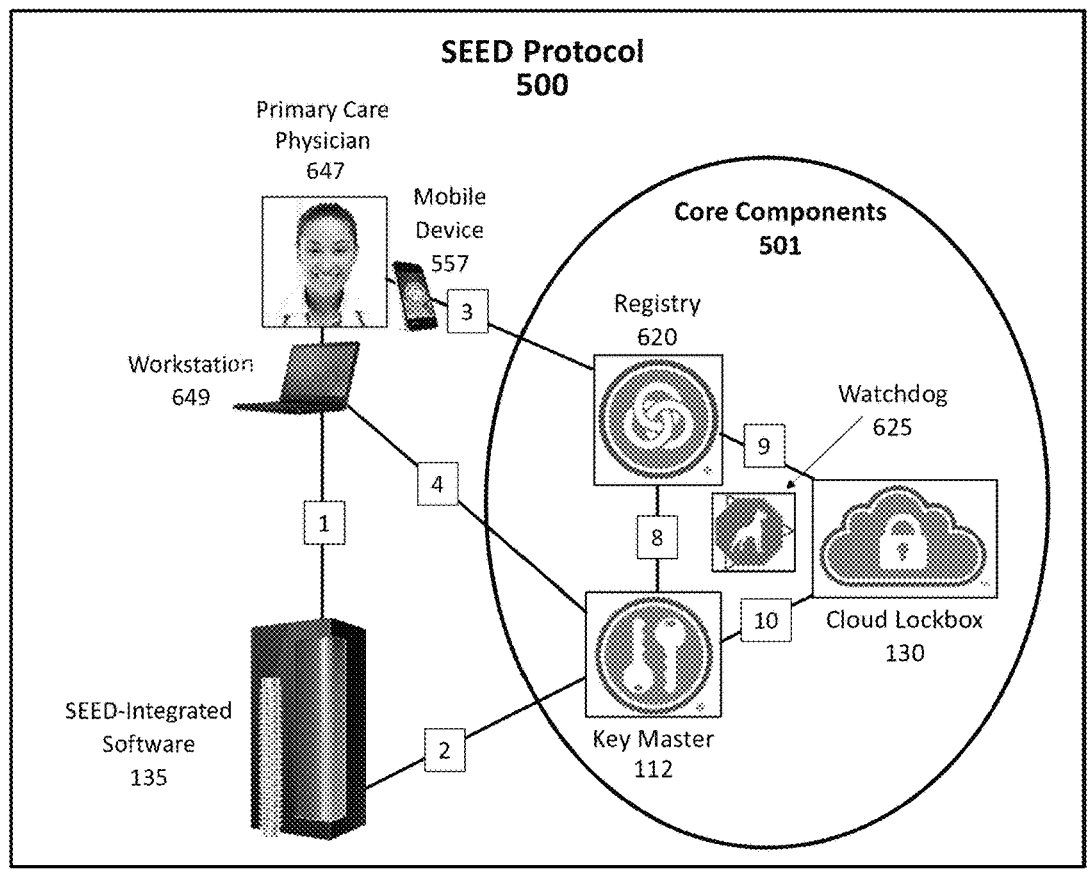
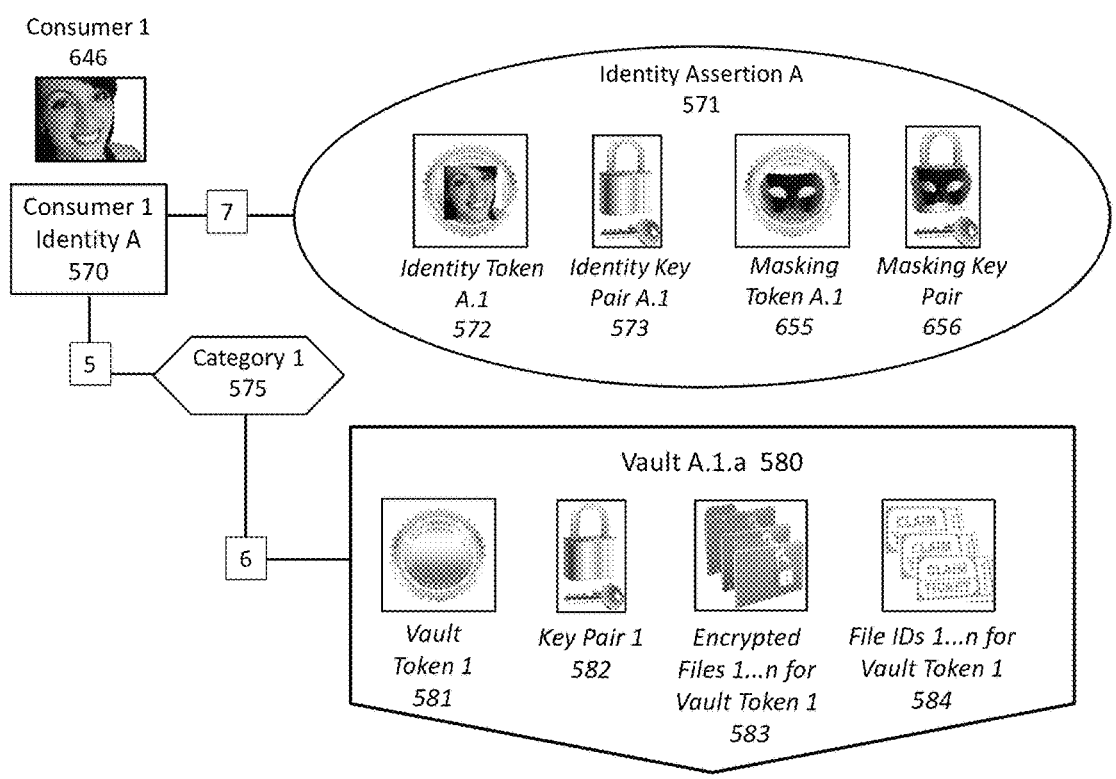
Figure 3: Abstraction of a Vault

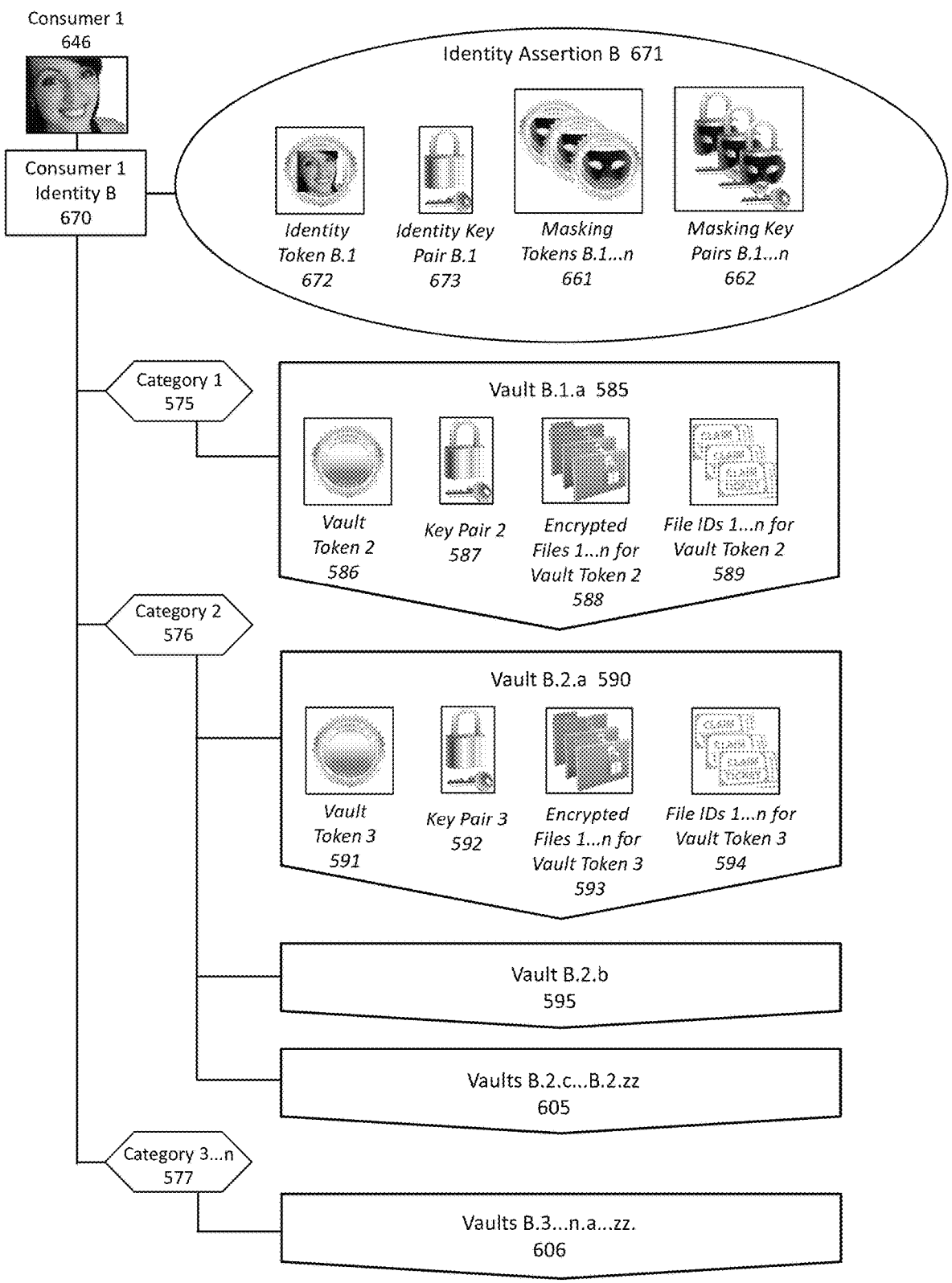
Figure 4: Extension of Person-Centric Vault Abstraction

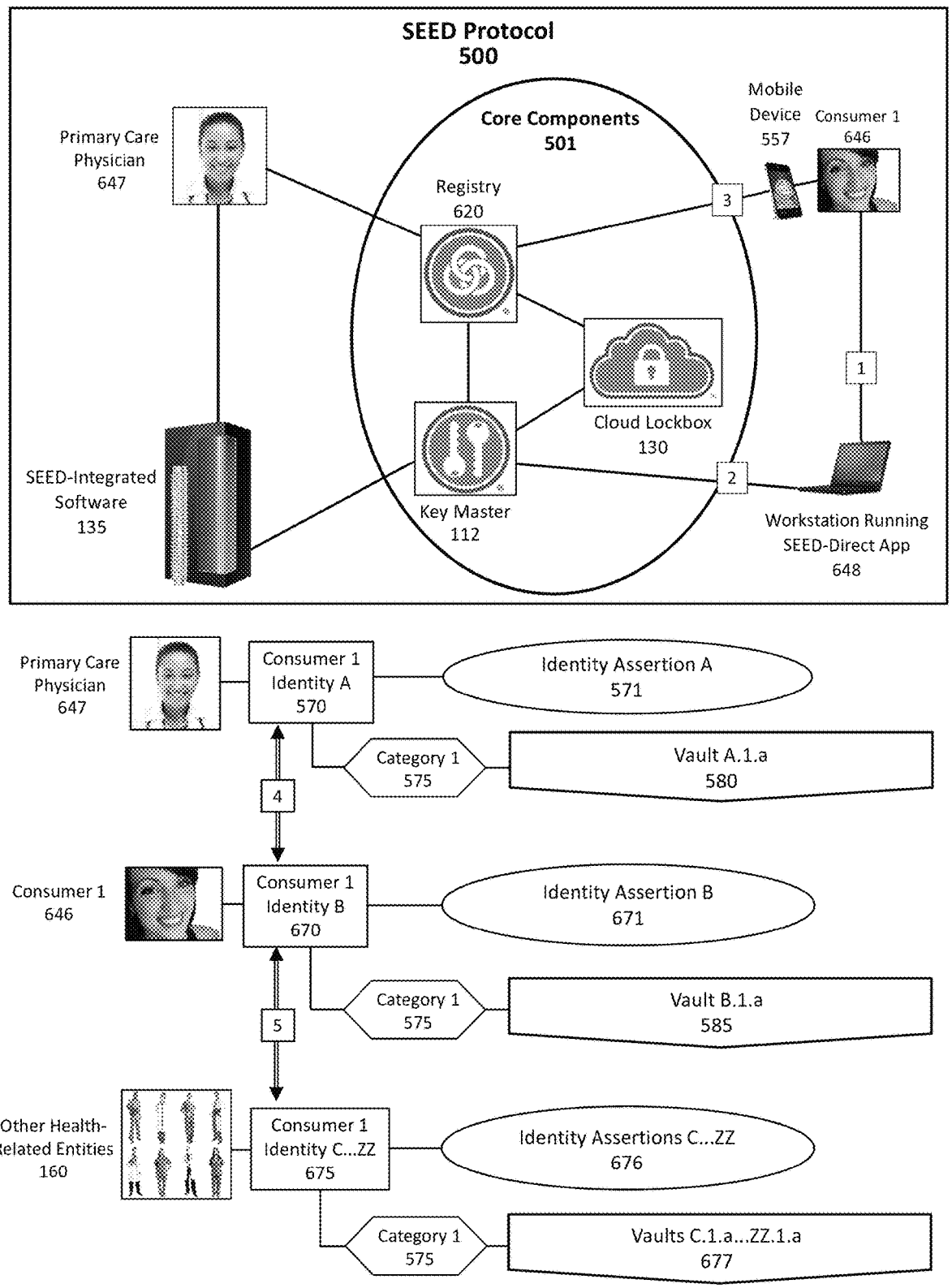
Figure 5: Associating Vaults of Duplicate Identities

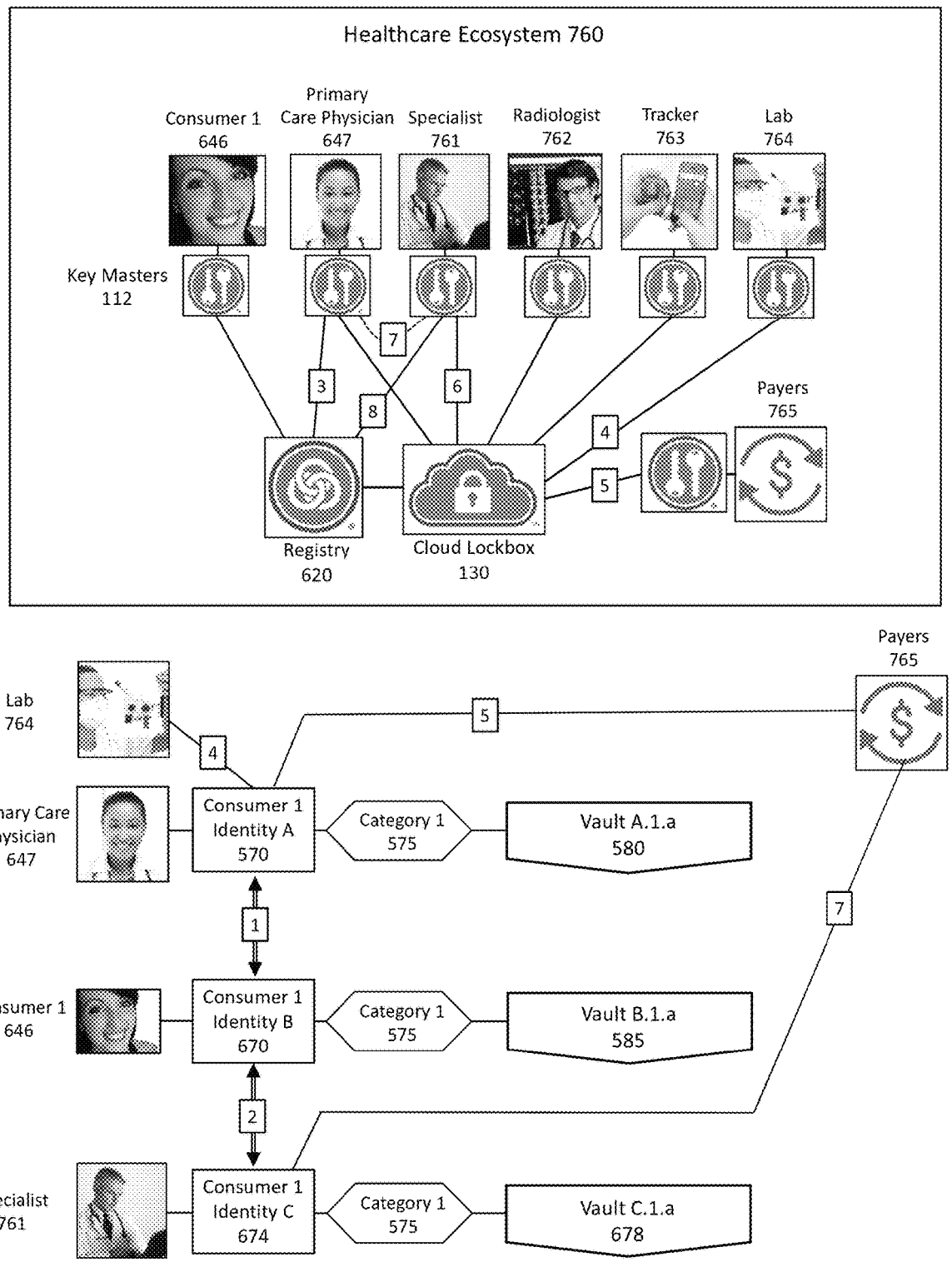
Figure 6: SEED Ecosystem – Healthcare Example

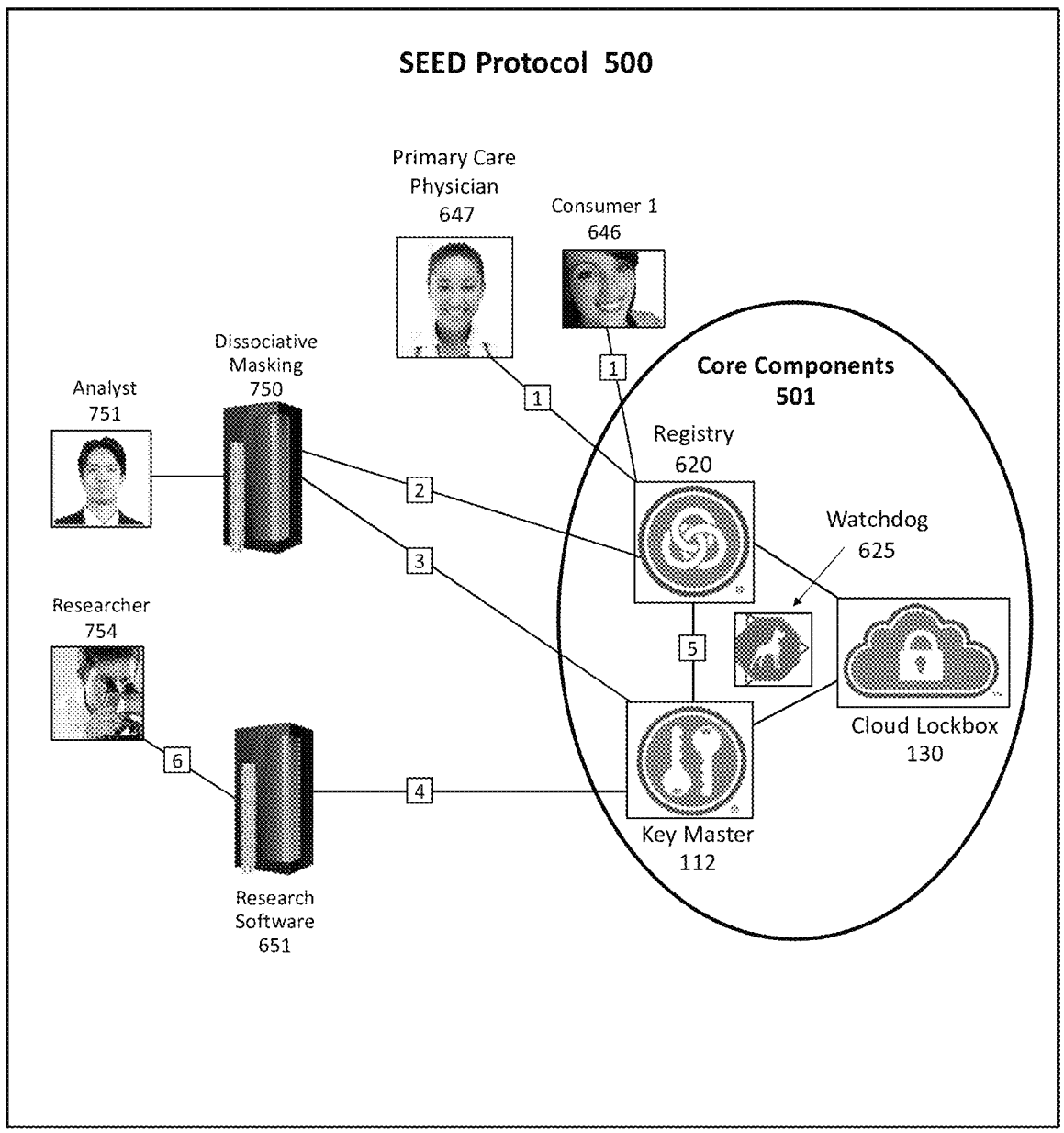
Figure 7: Dissociative Masking with SEED-Integrated Research Software

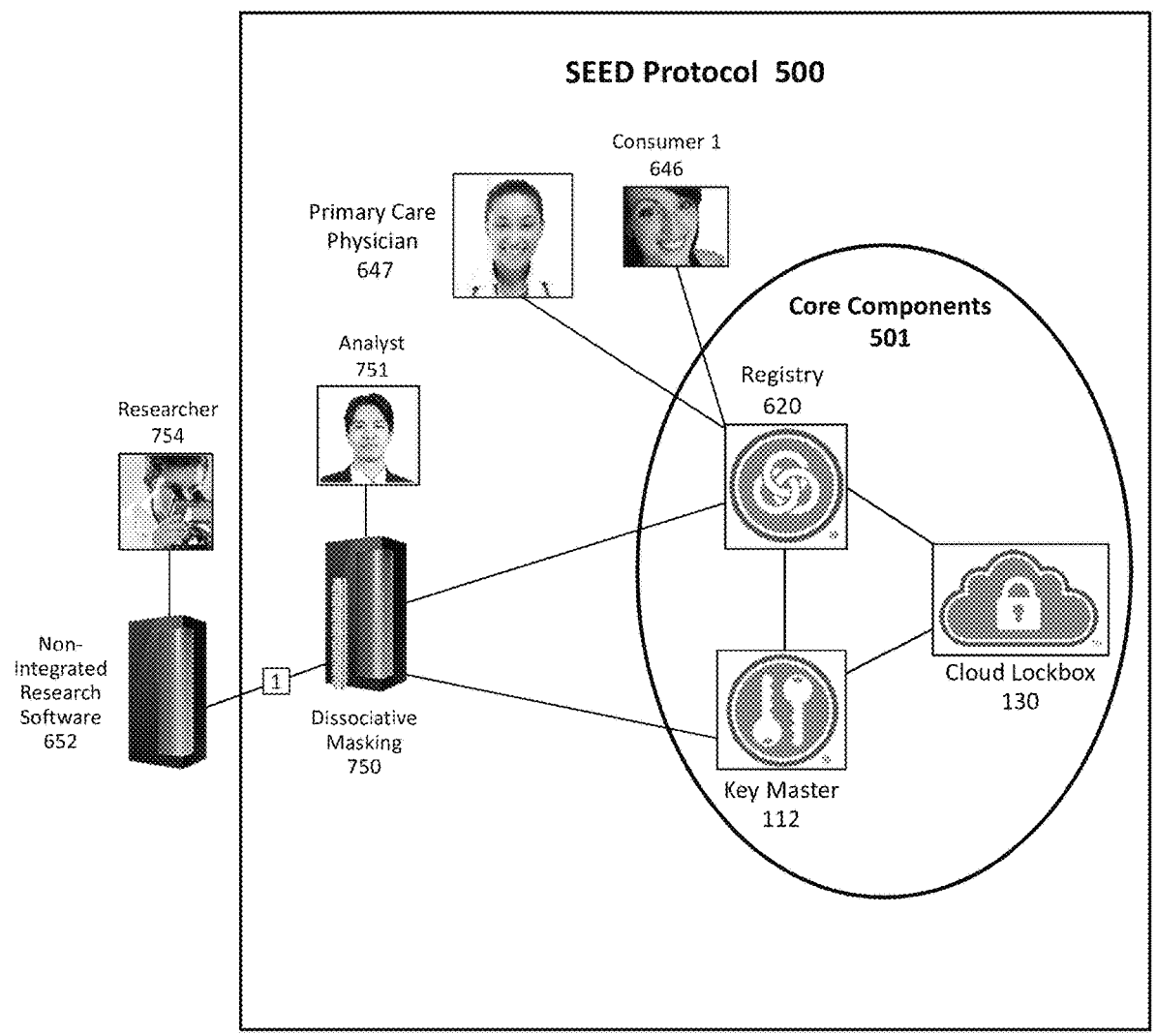
Figure 8: Dissociative Masking with Non-SEED-Integrated Research Software

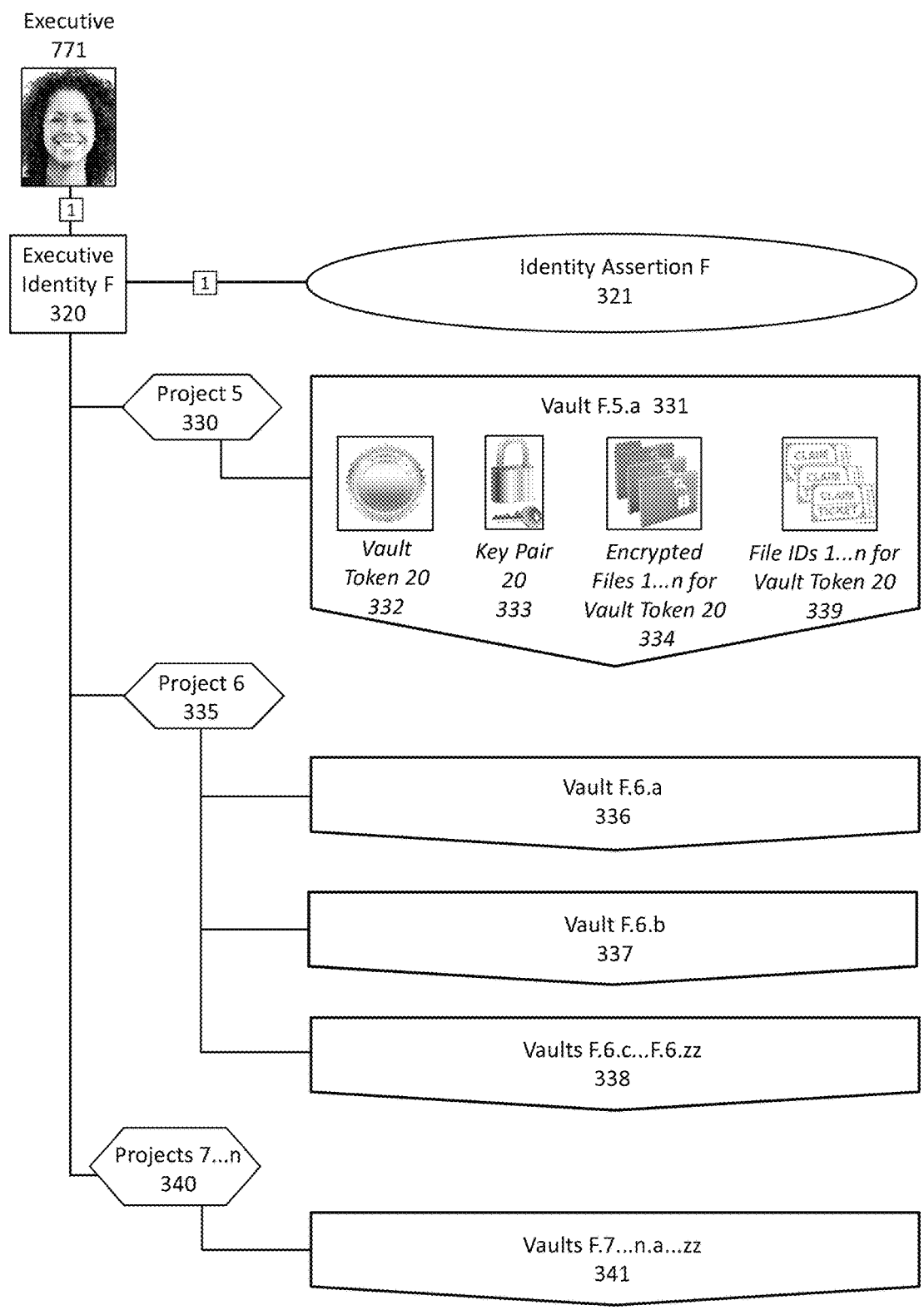
Figure 9: Extension of Project-Centric Vault Abstraction

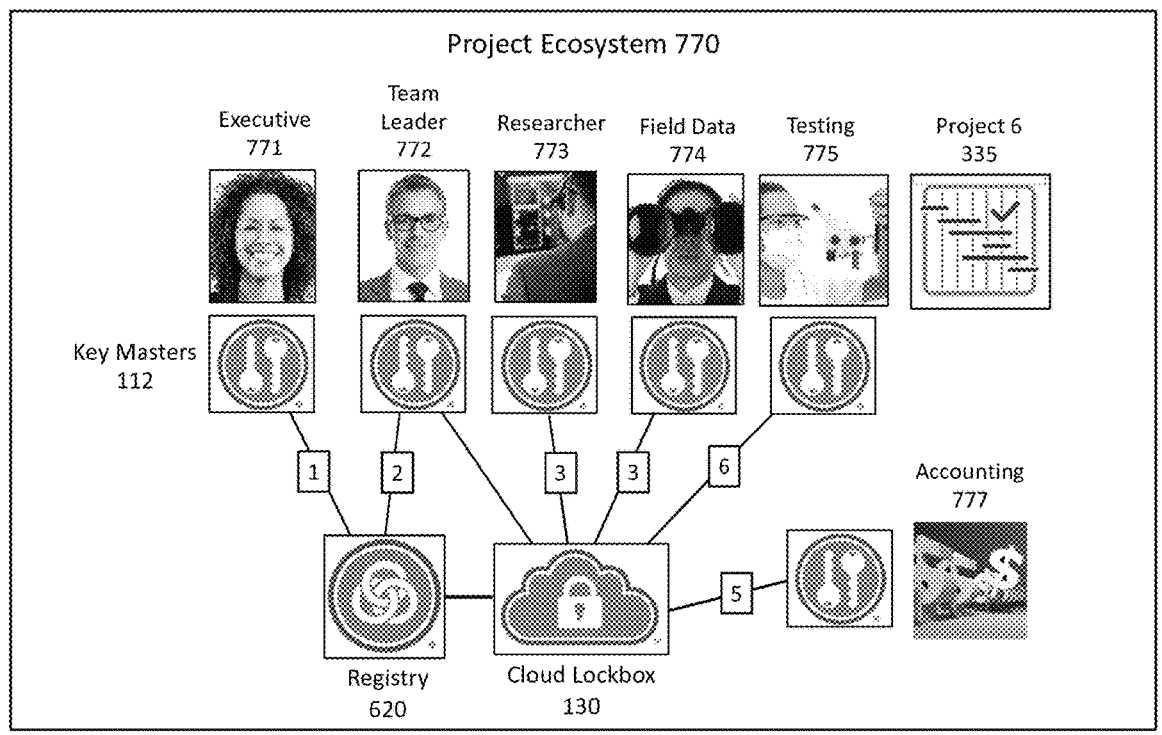
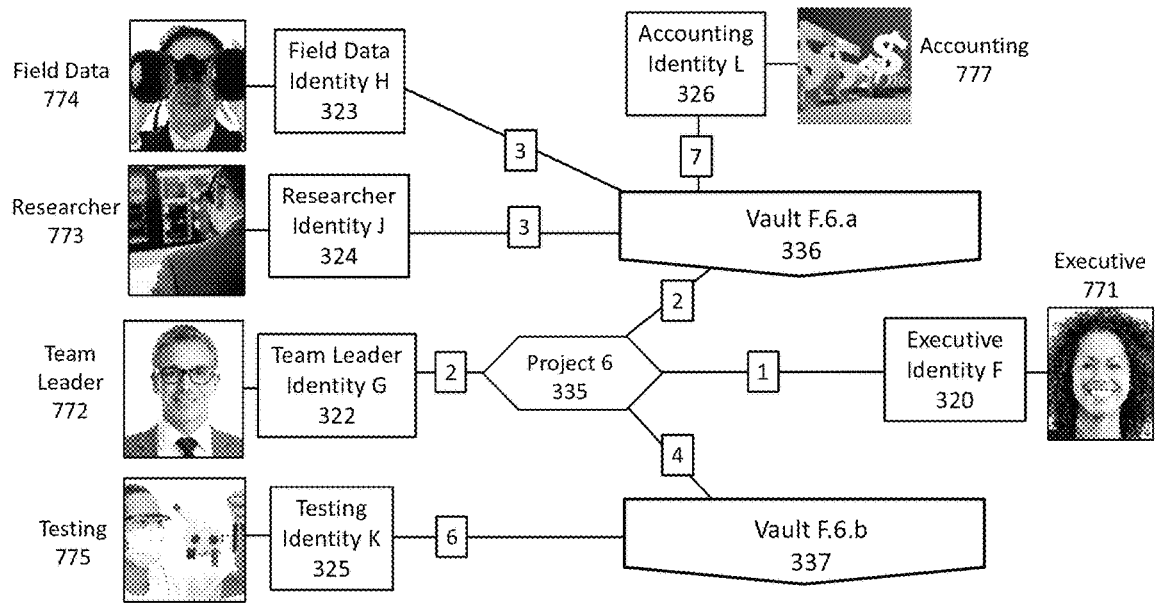
Figure 10: SEED Ecosystem – Project Example

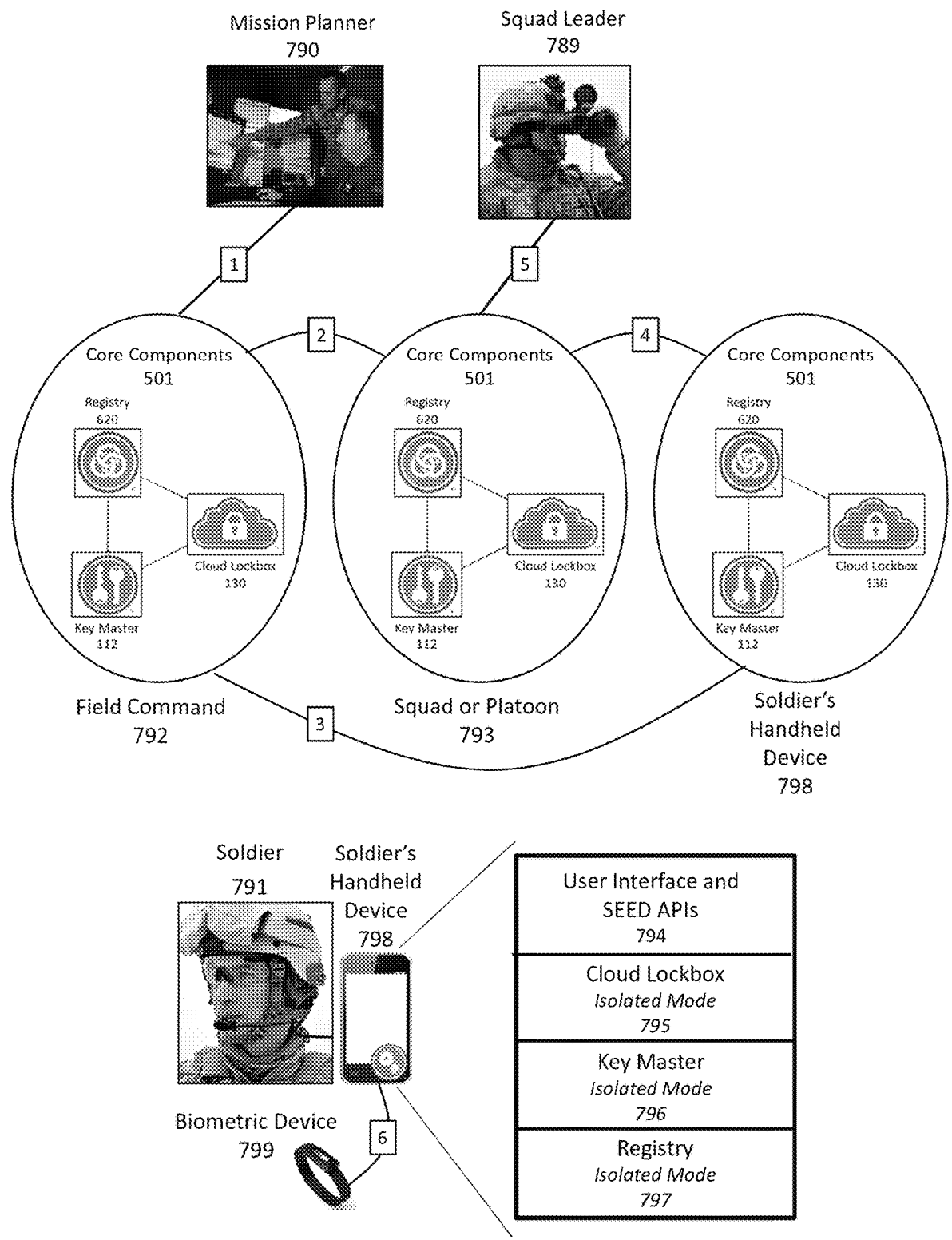
Figure 11: Dynamic Distribution of Mission Data

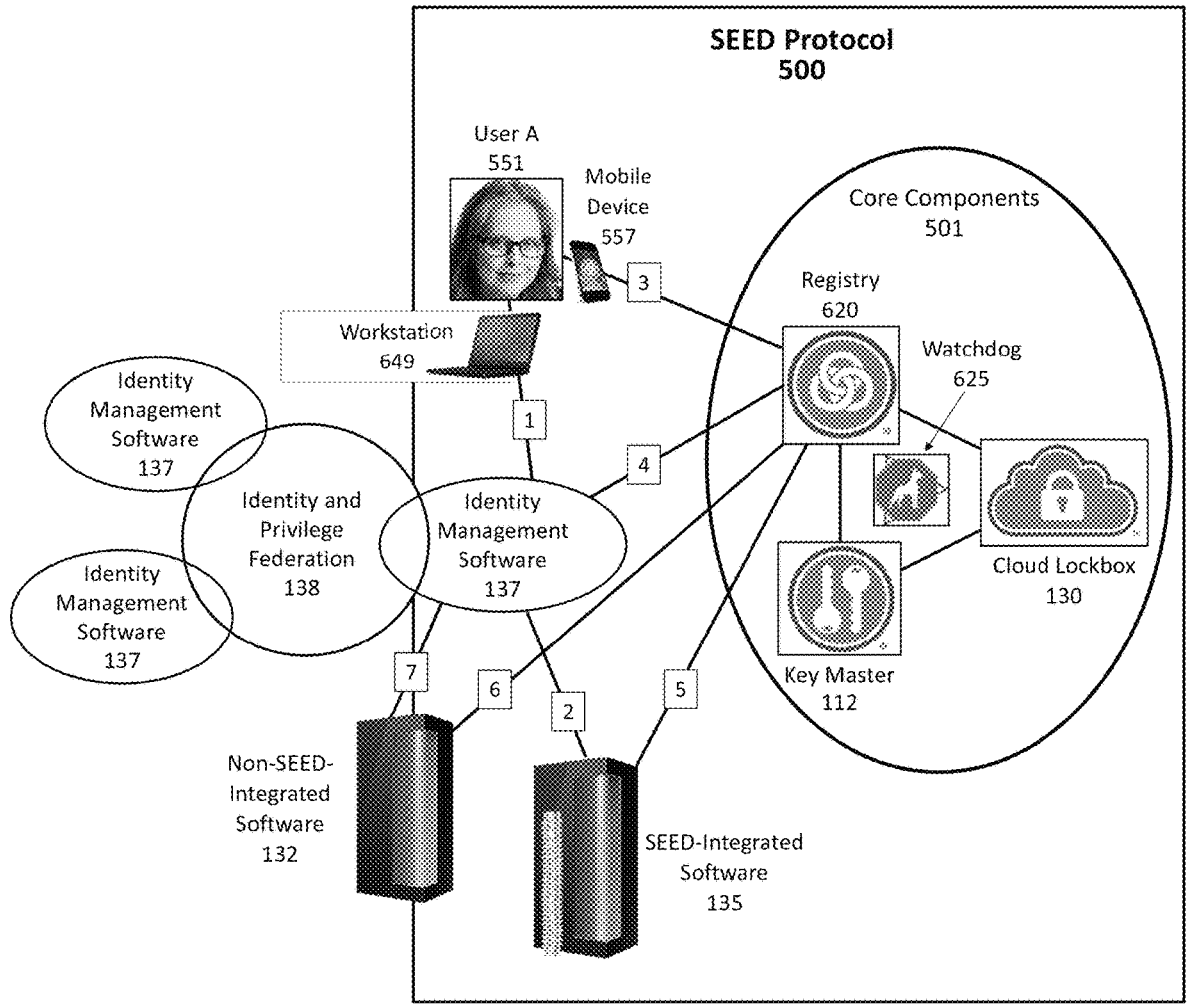
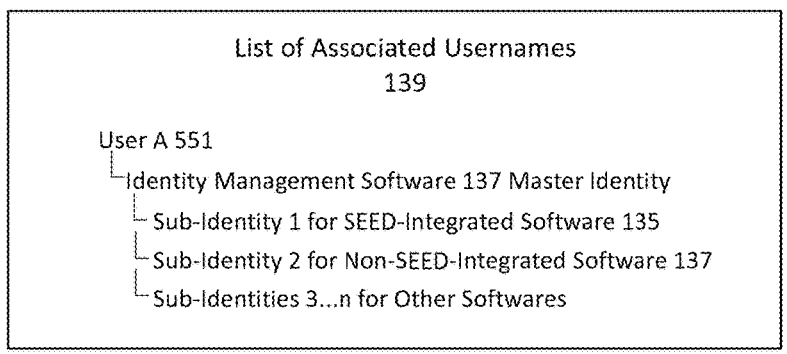
Figure 12: Identity Management and Federation

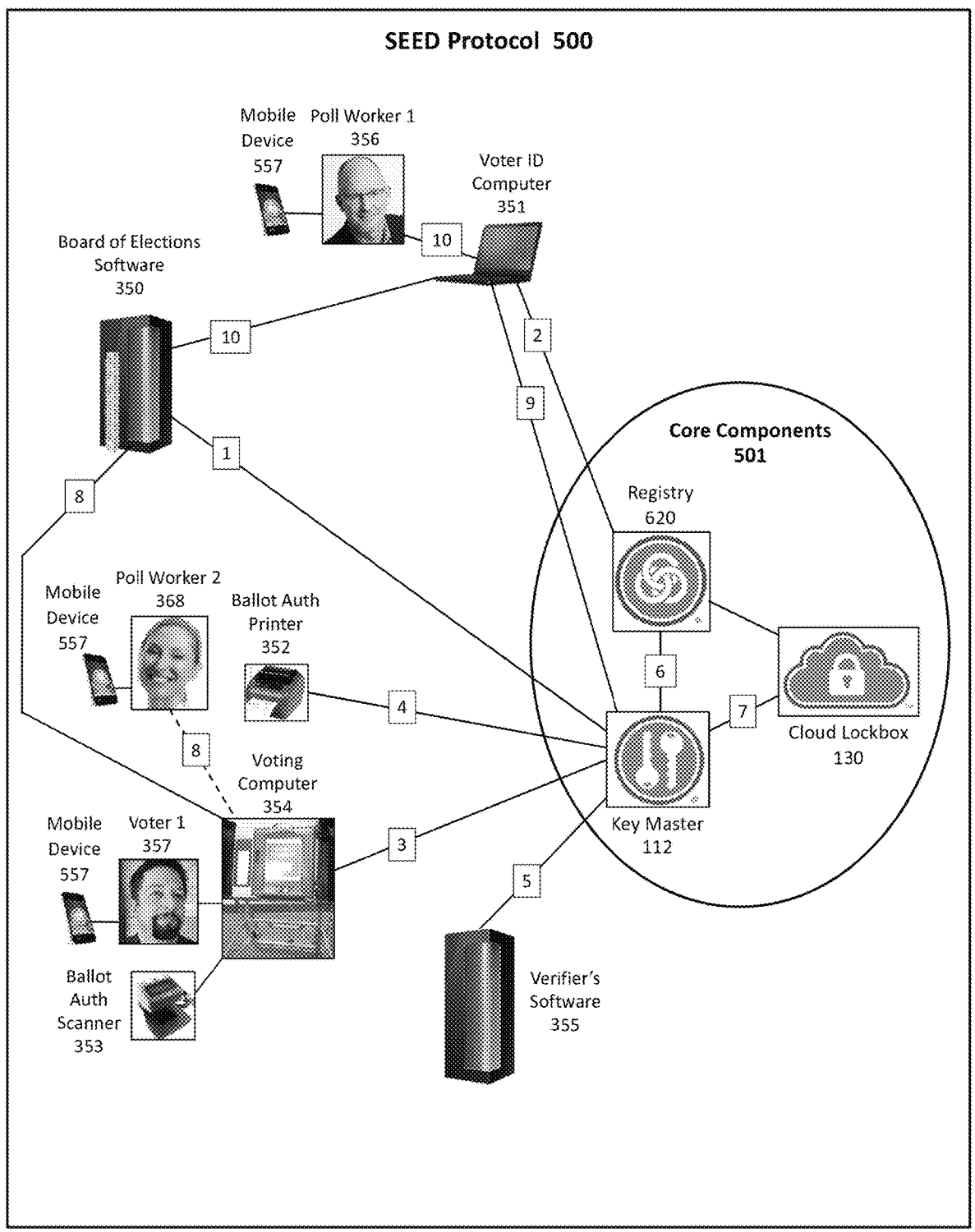
Figure 13: SEED-Chain Based Elections Mechanics

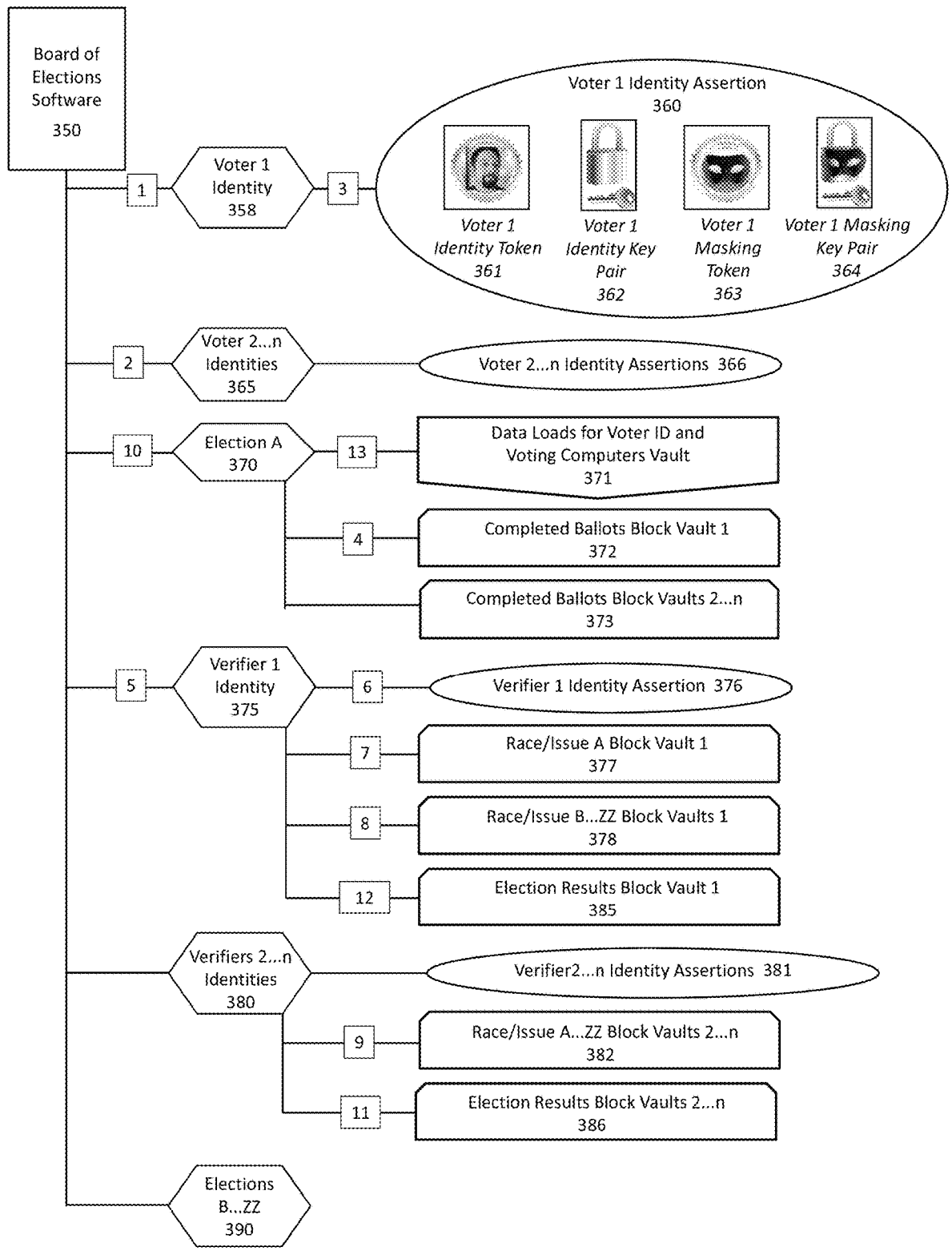
Figure 14: SEED-Chain Based Elections Internals

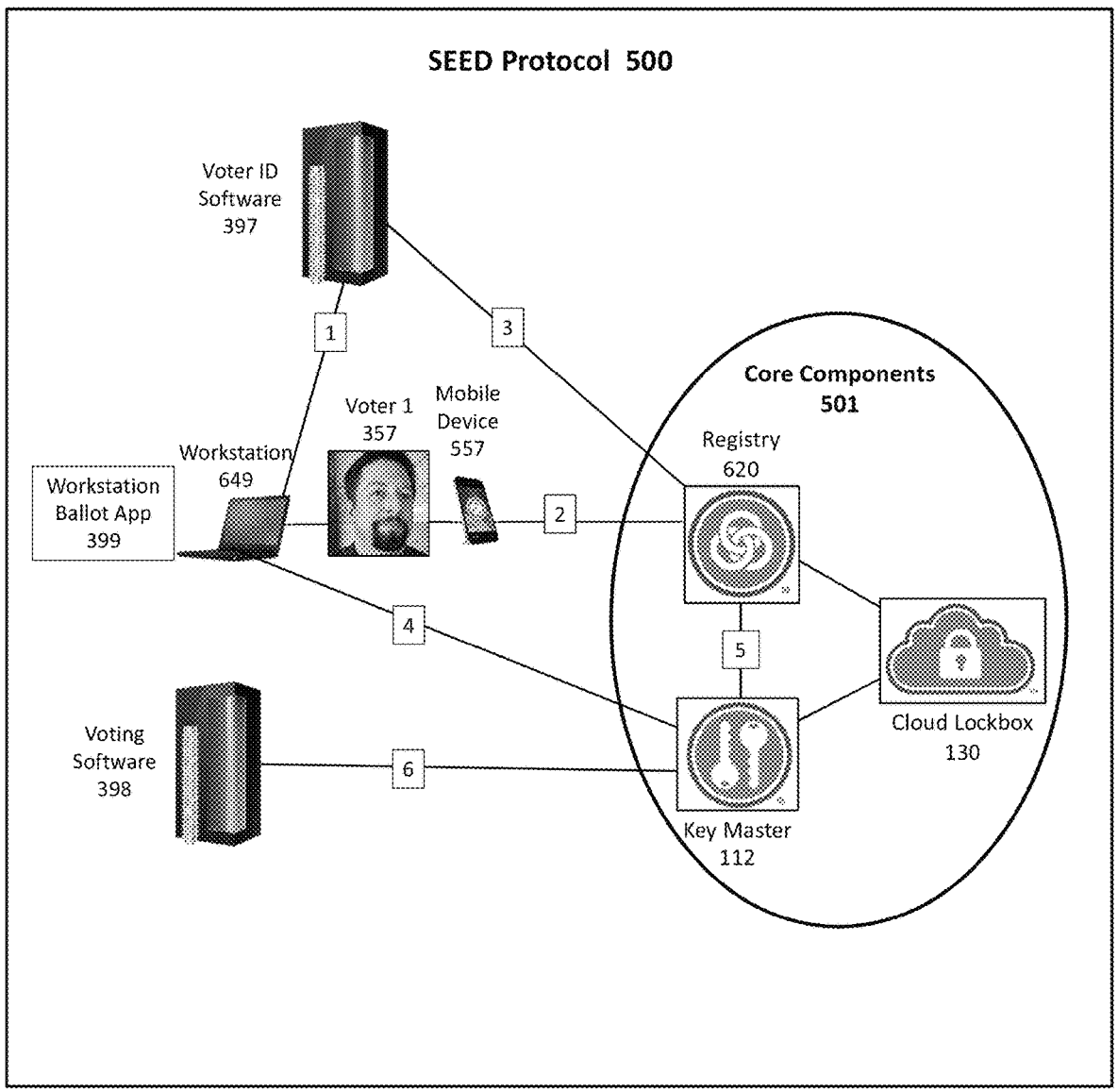
Figure 15: Remote Voting with SEED-Chain Based Elections Mechanism Subsequent to In-Person Identification

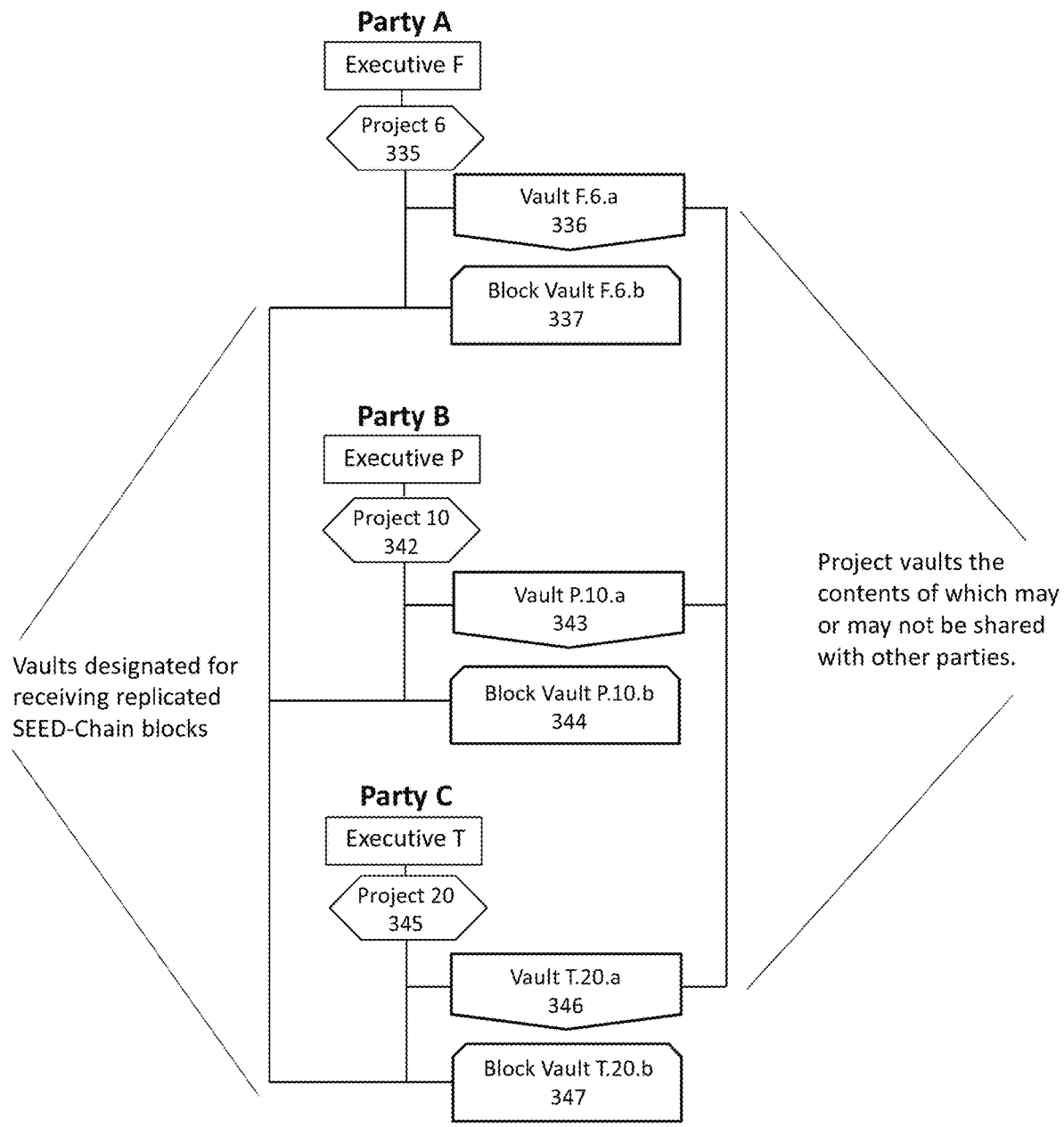
Figure 16: SEED-Chains Smart Contracts Example

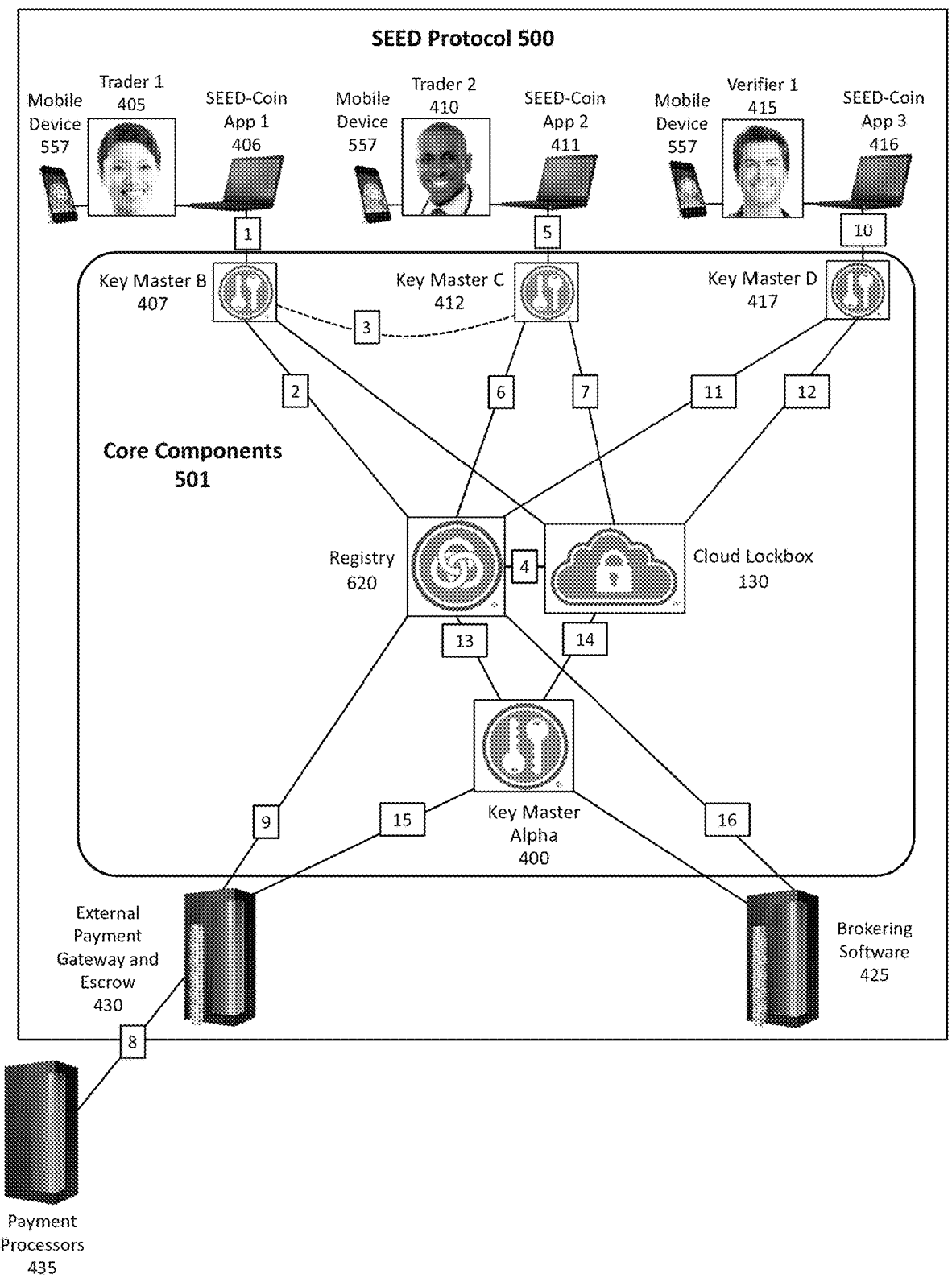
Figure 17: SEED-Coin Ecosystem

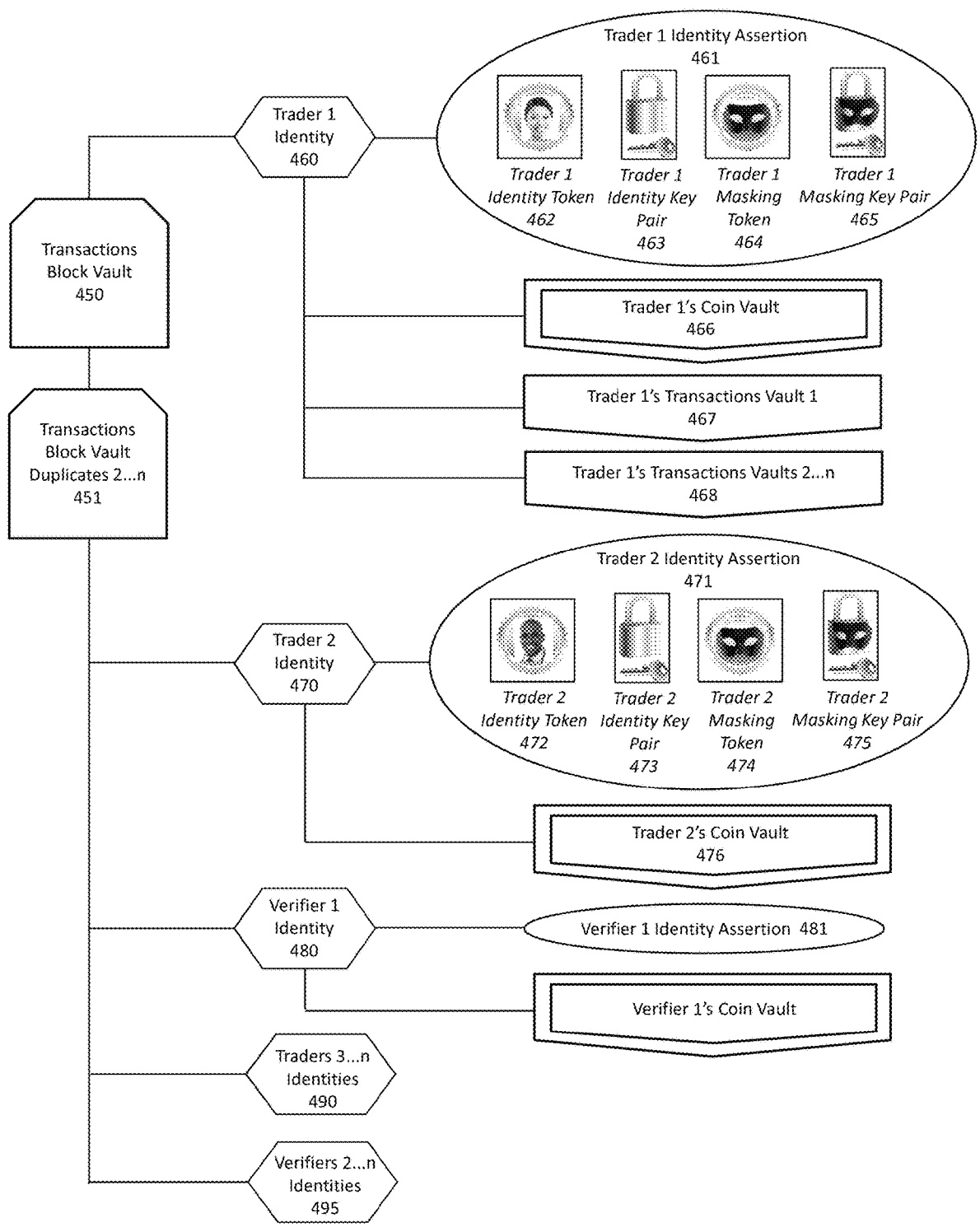
Figure 18: SEED-Coin Crypto Currency Internals

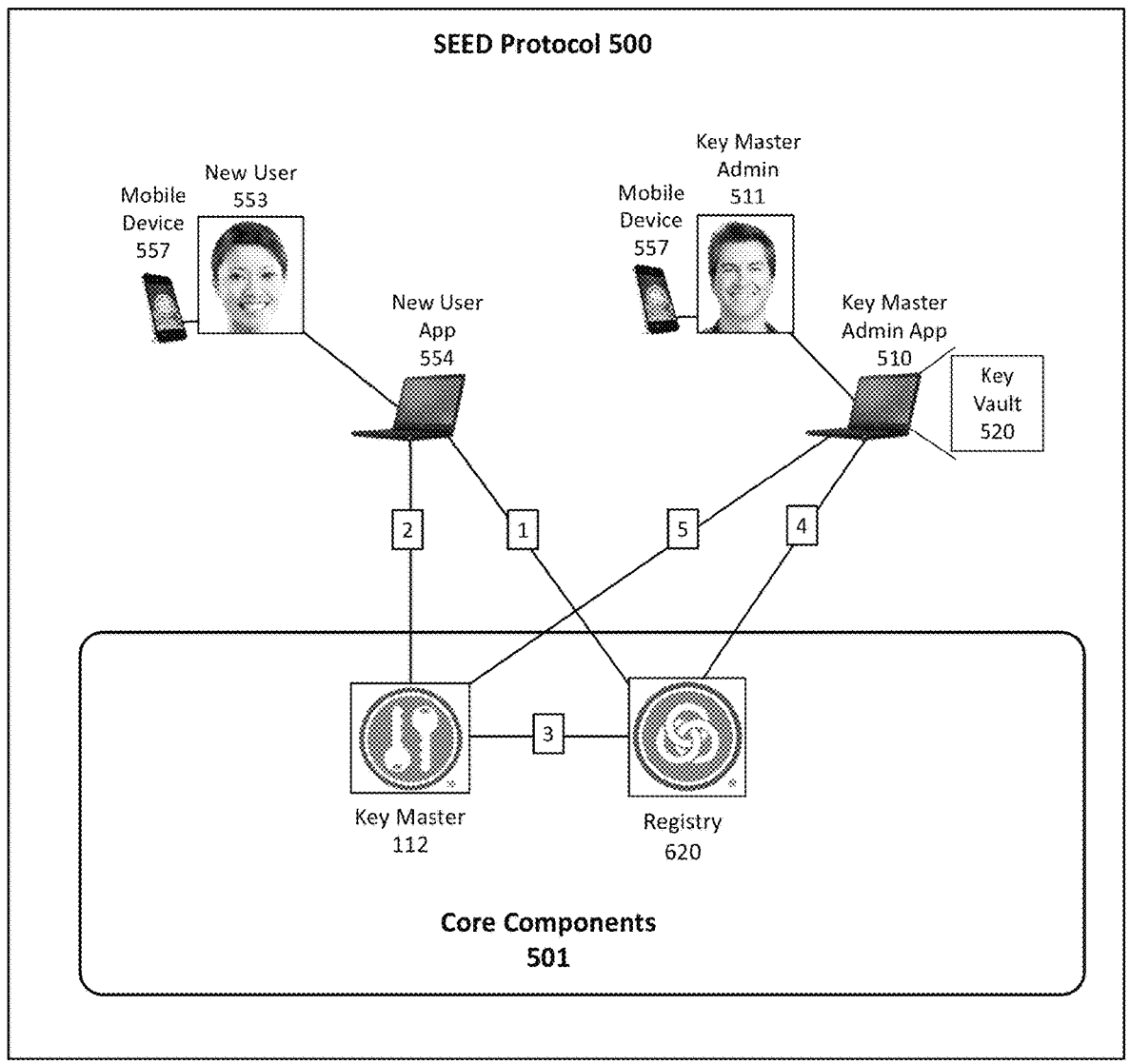
Figure 19: Key Master Administration Application

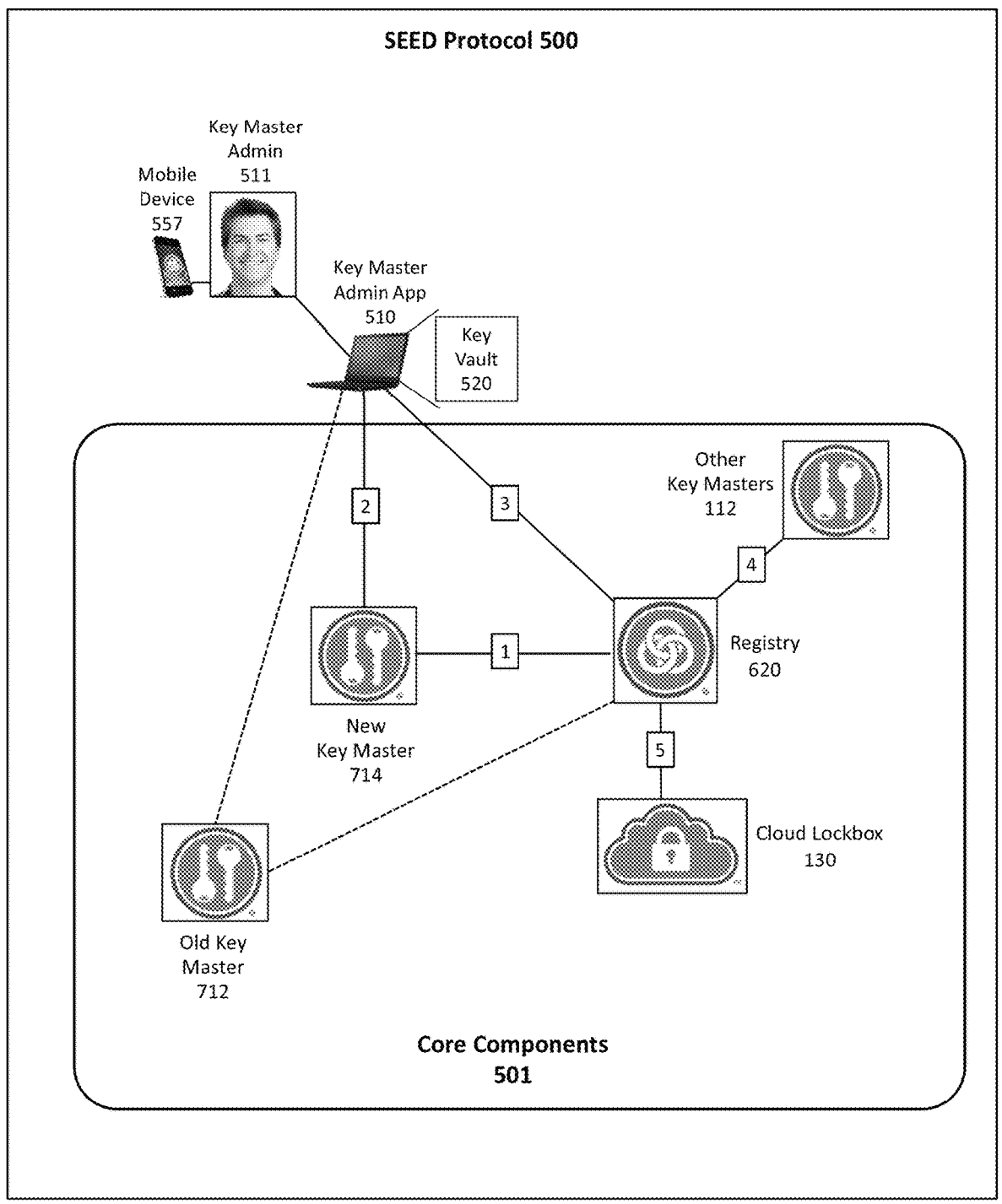
Figure 20: Key Vault and Key Restoration

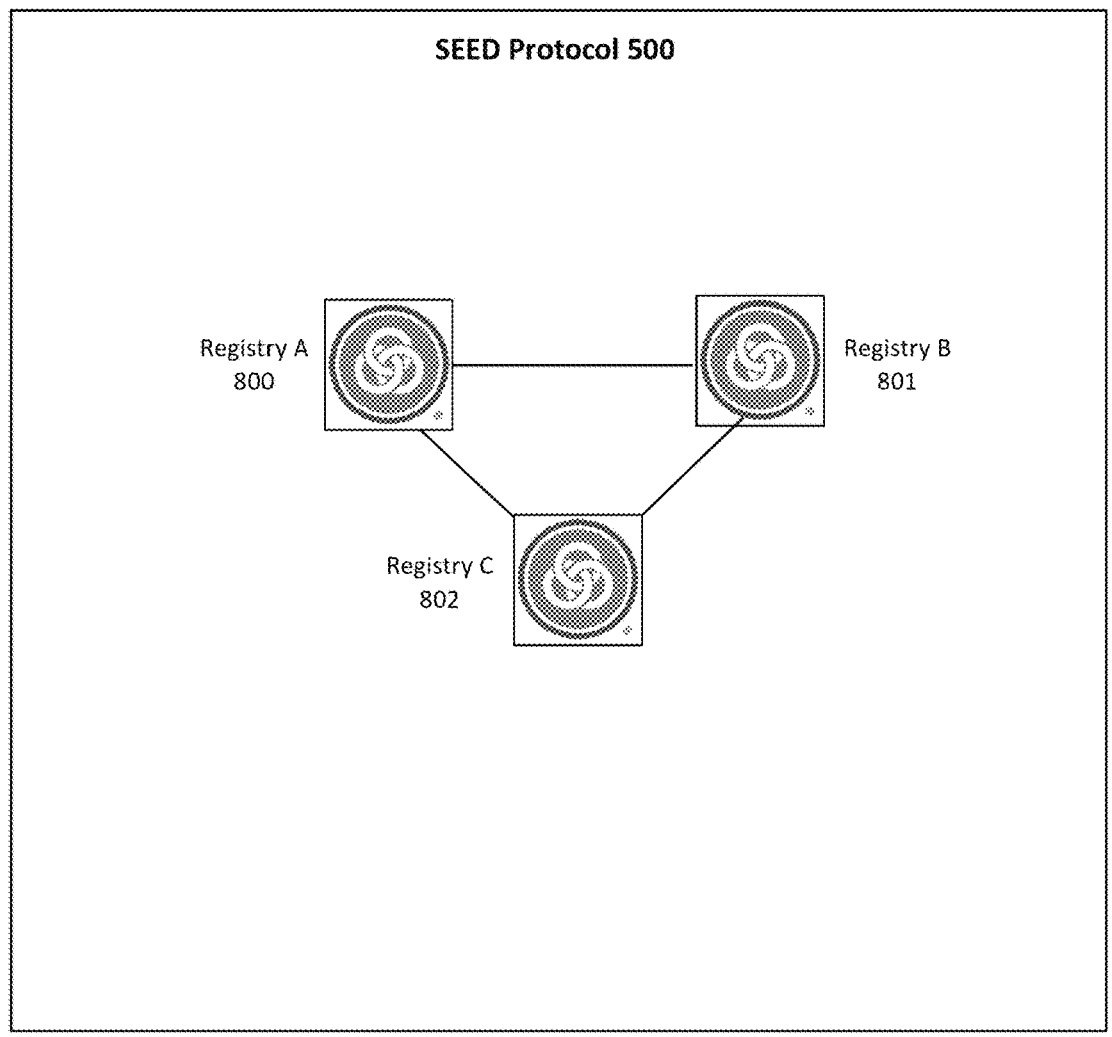
Figure 21: Multiple Registries in a Community of Interest

| Board of Elections 350 [BoE] | Origin | Source | Retn |
|---|---|---|---|
| Voter Demographics | BoE | BoE | Pers |
| Voter Identity Tokens | KM | KM | Pers |
| Races and Issues | BoE | BoE | Pers |
| Ballot Variations | BoE | BoE | Pers |
| Completed Ballots Block Vaults Tokens | KM | KM | Pers |

| Voter ID Computer 351 (VID) | Origin | Source | Retn |
|---|---|---|---|
| Voter Demographics | BoE | BoE | Vrfd |
| Voter Identity Tokens | KM | BoE | Vrfd |
| Ballot Variation # | VID | VID | Vrfd |
| Ballot # | VID | VID | Vrfd |
| Completion Code Auth Print | KM | R | Vrfd |
| Completion Code Vote | KM | R | Vrfd |

| Registry 620 [R] | Origin | Source | Retn |
|---|---|---|---|
| Voter Identity | BoE | KM | Pers |
| Voter Identity Tokens | KM | KM | Pers |
| Voter Identity Public Key | KM | KM | Pers |
| Voter ID Computer ID | KM | VID | Temp |
| Completion Code Auth Print | KM | KM | Temp |
| Completion Code Vote | KM | KM | Temp |
| Block Vault Tokens and Public Keys | KM | KM | Vrfd |
| File ID of Ballot Block | KM | KM | Vrfd |
| Sequence # of Ballot Block | KM | R | Vrfd |

| Key Master 112 [KM] | Origin | Source | Retn |
|---|---|---|---|
| Voter Identity Token and Key Pair | KM | KM | Pers |
| Ballot Variation # | VID | R | Temp |
| Voter ID Computer # | KM | Vote | Temp |
| Completion Code Auth Print | KM | KM | Temp |
| Completion Code Vote | KM | KM | Temp |
| Ballot Block Vault Token | KM | Vote | Temp |
| Ballot Block Vault Key Pair | KM | KM | Temp |
| Date/Time/KM Ballot Token Transaction # | KM | KM | Temp |
| Voter Masking Token and Key Pair | Vote | Vote | Temp |
| Completed Ballot | KM | KM | Pers |
| File ID of Ballot Block | KM | KM | Temp |
| Block Sequence # of Ballot Block | R | R | Temp |

| Ballot Auth Printer 352 [Auth] | Origin | Source | Retn |
|---|---|---|---|
| Voter Masking Token | KM | KM | Temp |
| Ballot Variation # | VID | KM | Temp |
| Voter ID Computer # | VID | KM | Temp |

De-Identified

Figure 22 : SEED-Chain Voter ID and Voting Data Elements

SYSTEM AND METHOD FOR SECURELY STORING AND SHARING INFORMATION

CROSS-REFERENCE TO RELATED APPLICATIONS

This application is a continuation-in-part of U.S. application Ser. No. 15/170,981 filed on Jun. 2, 2016, which is a continuation of U.S. application Ser. No. 14/539,614 filed on Nov. 12, 2014, which is a continuation-in-part of U.S. application Ser. No. 13/665,861 filed on Oct. 31, 2012, which claims priority to U.S. Provisional Patent Application Ser. No. 61/553,883 entitled "System and Method for Securely Storing and Sharing Information" filed Oct. 31, 2011, all of which are incorporated by reference in its entirety as if fully set forth herein.

TECHNICAL FIELD

The present application generally relates to systems, devices, and methods to deliver cyber security and secure collaboration within enterprises and across a business ecosystem using a three-element-core mechanism consisting of the key masters, the registries and the cloud lockboxes with application programming interfaces providing interaction with a wide variety of user-facing software applications. Together these elements and the related protocol provide: micro segmentation encryption and related key management; triangulation of identities and privileges; next-generation blockchain; and identity masking.

BACKGROUND

Certain methods and systems were previously used for securely storing and sharing access to confidential information. Some such systems employ cryptography, such as symmetric or asymmetric encryption, to protect information.

Co-mingled functions and reliance on trust compromise enterprise information technology, creating the vulnerabilities exploited every day by cyber criminals. Systems administrators continue to wield outsized authority and access to sensitive data leading to catastrophic breaches when they go rogue or are themselves compromised.

Enterprises deploy many cyber security tools in an attempt to overcome these fundamental flaws. Product categories range from encryption, $2^{nd}$ factor authentication, intrusion detection, and more. Within each of these categories an enterprise deploys multiple, incompatible products.

Solutions for sharing data with business partners and consumers rely on duplicating data rather than sharing access to a single source of the information. Once shared, the originator has no control or knowledge of how the receiver protects or shares the data with others.

Current blockchain variants suffer from high overhead, low transaction volume, and scarcity of qualified personnel. Integration with existing software applications remains the Achilles Heel of blockchain security.

Cryptography can provide strong protection but the key exchange process makes sharing encrypted data clumsy and sometimes insecure. Weak, absent, or disconnected identity verification also degrades the effectiveness. Existing practices for deployment of asymmetric public-private key cryptography has hampered adoption and application of this useful encryption technology.

SUMMARY

Accordingly, there is a need for systems, methods, and devices that defeat threats from cyber criminals and rogue insiders by using: triangulation to verify identities and privileges; micro segmentation encryption utilizing numerous individual or project centric keys; crowdsourced intrusion detection created by empowering users and consumers to police access to the sensitive data; identity masking that maintains two-way communications for uses ranging from medical research to voting; and distributed indelible ledgers that support external verification and high transaction volumes at low cost.

Systems, methods, and devices described herein provide a tightly coupled, distributed mechanism that splits the elements of control across three separate but interlocking computing envelopes achieving high security and integration flexibility to provide full lifecycle and cross-platform encryption within and between organizations, individuals, applications, and devices.

The present application generally relates to systems, devices, and methods to conduct the secure exchange and sharing of encrypted data using a tightly coupled, distributed three-element-core consisting of the key masters, the registries, and the cloud lockboxes that together provide triangulation of identities, privileges, and authentication. Application programming interfaces integrate the three-element-core with a wide variety of user-facing software applications. Together the three-element-core, combined with the application programming interfaces, provide full lifecycle encryption enabling cross-platform information sharing within and between organizations and individuals, applications, and devices.

The present application also expands the protective triangulation of the core components to encompass the integrated applications and the user devices through coordination of $1^{st}$ factor authentication to an application, $2^{nd}$ factor authentication directly to a registry, and authenticated application programming interface calls from an application to a key master, along with optional verification of $2^{nd}$ factor authentication directly from an application to a registry. This outer triangulation immediately detects a wide variety of unauthorized activity from cyber criminals to rogue insiders.

The present application also generally relates to the micro-segmentation encryption of protected data by using a multitude of asymmetric key pairs to confer resistance to brute force cracking, including cracking by quantum computers.

The present application also relates to:

Identity assertion that spans the boundaries of organizations and applications;
Robust identity masking for use in applications requiring both anonymity, accountability, and two-way communications while retaining anonymity;
An abstraction of vaults that span all three of the core components of the mechanism;
Crowdsourcing anomaly detection to users of applications as well as to the subjects of the data; and
Using organization separation in the management of the core components to create additional safeguards.

The present application also describes the ability to provide high availability of the system, methods and devices through distribution, caching, and responsive failover of operations of the mechanism.

The present application also relates to generation of chains of encrypted blocks to create a distributed indelible ledger that may be validated by multiple parties, a capability that may be coupled with robust identity masking capabilities for applications, including voting, smart contracts, and crypto currency.

According to a first aspect of the present application, a method to conduct secure exchange or shared access to a single copy of encrypted data using a tightly coupled, distributed three-element-core mechanism consisting of the key masters, the registries, and the cloud lockboxes with the core mechanism integrating with a wide variety of user-facing application programming interfaces is disclosed.

According to the second aspect of the present application, a method for creating a community of interest is disclosed.

According to the third aspect of the present application, a method for creating features through protocols operating among the three-element-core, application programming interfaces, parties, and metadata is disclosed.

According to the fourth aspect of the present application, a method for minimizing the exposure of data to system administrators is disclosed.

According to the fifth aspect of the present application, a method for integrating with applications and creation of hybrid cloud and on-premise data storage solutions is disclosed.

According to the sixth aspect of the present application, a method generating chains of encrypted blocks in order to create a distributed indelible ledger that may be verified among multiple parties is disclosed.

According to the seventh aspect of the present application, a method for identity masking in transactions that enables identity verification and process auditing for uses such as elections is disclosed.

According to the eighth aspect of the present application, a method for dynamic distribution and caching of data across multiple instances of the mechanism providing high operational survivability for situations in which communications may be disrupted or equipment destroyed is disclosed.

According to the ninth aspect of the present application, a method for micro-segmentation encryption sensitive data to prevent cracking even by quantum computers is disclosed.

According to the tenth aspect of the present application, a method for extending the mechanism's triangulation to encompass integrated applications, servers, and end-user devices across a business ecosystem is disclosed.

According to the eleventh aspect of the present application, a method for crowdsourcing anomaly detection such that users of applications and subjects of the data may be recruited to train and monitor the watchdog function of the mechanism is disclosed.

According to the twelfth aspect of the present application, a method for creating vault abstractions such that the concept of the cloud lockbox may be segmented into smaller units, each consisting of elements managed separately by the key master, the registry, and the cloud lockbox is disclosed.

According to the thirteenth aspect of the present application, a method for asserting identity across a business ecosystem, spanning organizations, applications, and devices is disclosed.

According to the fourteenth aspect of the present application, a method for separating control of the core components of the mechanism to separate organizations or separate parts of the same organization to increase operational security is disclosed.

BRIEF DESCRIPTION OF THE FIGURES

The accompanying figures, which are incorporated in and constitute as part of the specification, illustrate various example systems, devices methods, and so on, and are used merely to illustrate various example embodiments. It should be noted that various components illustrated in the figures may not be drawn to scale, and that the various assemblies and designs illustrated in the figures are presented for purposes of illustration only, and should not be considered in any way as limiting.

FIG. 1 is a schematic block diagram illustrating vulnerabilities in existing architectures.

FIG. 2 is a schematic block diagram illustrating the SEED overview and multi-factor authentication.

FIG. 3 is a schematic block diagram illustrating the abstraction of a vault.

FIG. 4 is a schematic block diagram illustrating the extension of person-centric vault abstraction.

FIG. 5 is a schematic block diagram illustrating the method for associating vaults of duplicate identities.

FIG. 6 is a schematic block diagram illustrating the SEED ecosystem using a healthcare example.

FIG. 7 is a schematic block diagram illustrating the dissociative masking with SEED-integrated research software.

FIG. 8 is a schematic block diagram illustrating the dissociative masking with non-SEED-integrated research software.

FIG. 9 is a schematic block diagram illustrating the extension of project-centric vault abstraction.

FIG. 10 is a schematic block diagram illustrating the SEED ecosystem using a project example.

FIG. 11 is a schematic block diagram illustrating the dynamic distribution of mission data.

FIG. 12 is a schematic block diagram illustrating the identity management and federation.

FIG. 13 is a schematic block diagram illustrating the SEED-chain based elections mechanics FIG. 14 is a schematic block diagram illustrating the SEED-chain based elections internals.

FIG. 15 is a schematic block diagram illustrating the remote voting with SEED-Chain based election mechanism subsequent to in-person identification.

FIG. 16 is a schematic block diagram illustrating the SEED-Chains smart contracts example.

FIG. 17 is a schematic block diagram illustrating the SEED-Coin ecosystem.

FIG. 18 is a schematic block diagram illustrating the SEED-Coin crypto currency internals.

FIG. 19 is a schematic block diagram illustrating the key master administration application.

FIG. 20 is a schematic block diagram illustrating the key vault and key restoration.

FIG. 21 is a schematic block diagram illustrating multiple registries in a community of interest.

FIG. 22 is a table illustrating SEED-Chain Voter ID and Voting Data Elements.

Data elements, Origins, Sources and Retention

As illustrated in the table of FIG. 22 and Table 2, a detailed review of the data elements that each device or vault manages includes:

Registry 620 abbreviated as "R" in the columns labeled "Origin" and "Source";

Key Master 112 abbreviated as "KM" in the columns labeled "Origin" and "Source";

Ballot Auth Printer 352 abbreviated as "Auth" in the columns labeled "Origin" and "Source";

Verifier's Software 355 abbreviated as "V" in the columns labeled "Origin" and "Source";

Voter ID Computer 351 abbreviated as "VID" in the columns labeled "Origin" and "Source";

Voting Computer 354 abbreviated as "Vote" in the columns labeled "Origin" and "Source";

Ballot Block Vaults such as Completed Ballots Block vault 1 372 abbreviated as "BV" in the columns labeled "Origin" and "Source"; and Race/Issue Block Vault such as Race/Issue A Block Vault 1 377 abbreviated as "RIV".

As illustrated in the table of FIG. 22 and Table 2:

The "Origin" column indicates the device that created the data element; and

The "Source" column indicates from where the data element was received. The "Source" may be a device, a vault or a block vault.

Also, as illustrated in FIG. 22 and Table 2, the "Retention" colun abbreviated as "Retn" indicates how long a data element is retained with the possible following values.

Temp=Data element retained on a temporary basis, only as along as required by current process. As an example, Key Master 112 loads the contents of the completed ballot into the memory for the purpose of encrypting it but, onc deposited, does not retain the contents of the ballot.

Vrfd=Data element retained until the election verified by a Board of Elections.

Pers=Data element retained on a persistant or permanent basis.

FIGURE REFERENCE NUMERALS

The following reference characters identify the associated elements depicted in the figures describing the present invention.

- 112 Key Master
- 130 Cloud Lockbox
- 132 Non-SEED-Integrated Software
- 135 SEED-Integrated Software
- 137 Identity Management Software
- 138 Identity and Privilege Federation
- 139 List of Associated Usernames
- 160 Other Health-Related Entities
- 320 Executive Identity F
- 321 Identity Assertion F
- 322 Team Leader Identity G
- 323 Field Data Identity H
- 324 Researcher Identity J
- 325 Testing Identity K
- 326 Accounting Identity L
- 330 Project 5
- 331 Vault F.5.*a*
- 332 Vault Token 20
- 333 Key Pair 20
- 334 Encrypted Files 1 . . . n for Vault Token 20
- 335 Project 6
- 336 Vault F.6.*a*
- 337 Vault F.6.*b*
- 338 Vaults F.6.*c* . . . F.6.*zz*
- 339 File IDs for Vault Token 20
- 340 Project 7 . . . n
- 341 Vaults F.7 . . . n.a . . . zz
- 342 Project 10
- 343 Vault P. 10.*a*
- 344 Block Vault P.10.*b*
- 345 Project 20
- 346 Vault T.20.*a*
- 347 Block Vault T.20.*b*
- 350 Board of Elections Software
- 351 Voter ID Computer
- 352 Ballot Authorization Printer
- 353 Ballot Authorization Scanner
- 354 Voting Computer
- 355 Verifier's Software
- 356 Poll Worker 1
- 357 Voter 1
- 358 Voter 1 Identity
- 360 Voter 1 Identity Assertion
- 361 Voter 1 Identity Token
- 362 Voter 1 Identity Key Pair
- 363 Voter 1 Masking Token
- 364 Voter 1 Masking Key Pair
- 365 Voters 2 . . . n Identities
- 366 Voters 2 . . . n Identity Assertions
- 368 Poll Worker 2
- 370 Election A
- 371 Data Loads for Voter ID and Voting Computers Vault
- 372 Completed Ballots Block Vault 1
- 373 Completed Ballots Block Vault 2 . . . n
- 375 Verifier 1 Identity
- 376 Verifier 1 Identity Assertion
- 377 Race/Issue A Block Vault 1
- 378 Race/Issue B . . . ZZ Block Vaults 1
- 380 Verifier 2 . . . n Identity
- 381 Verifier 2 . . . n Identity Assertions
- 382 Race/Issue A . . . ZZ Block Vaults 2 . . . n
- 385 Election Results Block Vault 1
- 386 Election Results Block Vault 2 . . . n
- 390 Elections B . . . ZZ
- 397 Voter ID Software
- 398 Voting Software
- 399 Workstation Ballot Application
- 400 Key Master Alpha
- 405 Trader 1
- 406 SEED-Coin Application 1
- 407 Key Master B
- 410 Trader 2
- 411 SEED-Coin Application 2
- 412 Key Master C
- 415 Verifier 1
- 416 SEED-Coin Application 3
- 417 Key Master D
- 425 Brokering Software
- 430 External Payment Gateway and Escrow
- 435 Payment Processors
- 450 Transactions Block Vault
- 451 Transactions Block Vault Duplicates 2 . . . n
- 460 Trader Identity 1
- 461 Trader 1 Identity Assertion
- 462 Trader 1 Identity Token
- 463 Trader 1 Identity Key Pair
- 464 Trader 1 Masking Token
- 465 Trader 1 Masking Key Pair
- 466 Trader 1's Coin Vault
- 467 Trader 1's Transaction Vault 1
- 468 Trader 1's Transaction Vaults 2 . . . n
- 470 Trader 2 Identity
- 471 Trader 2 Identity Assertion
- 472 Trader 2 Identity Token
- 473 Trader 2 Identity Key Pair
- 474 Trader 2 Masking Token
- 475 Trader 2 Masking Key Pair
- 476 Trader 2's Coin Vault
- 480 Verifier 1 Identity
- 481 Verifier 1's Identity Assertion
- 490 Traders 3 . . . n Identities 495 Verifiers 2 . . . n Identities
500 SEED Protocol
501 Core Components
505 Elements of Control
506 Identities & Permissions
507 Encrypted Files
508 Key Pair
510 Key Master Admin API
511 Key Master Admin
520 Key Vault
551 User A
553 New User
554 New User Application
557 Mobile Device
570 Consumer 1 Identity A
571 Identity Assertion A
572 Identity Token A.1
573 Identity Key Pair A.1
575 Category 1
576 Category 2
577 Categories 3 . . . n
578 Primary Care Physician Identity Assertion
580 Vault A.1.*a*
581 Vault Token 1
582 Key Pair 1
583 Encrypted Files 1 . . . n for Vault Token 1
584 File IDs 1 . . . n for Vault Token 1
585 Vault B.1.*a*
586 Vault Token 2
587 Key Pair 2
588 Encrypted Files 1 . . . n for Vault Token 2
589 File IDs 1 . . . n for Vault Token 2
590 Vault B.2.*a*
591 Vault Token 3
592 Key Pair 3
593 Encrypted Files 1 . . . n for Vault Token 3
594 File IDs 1 . . . n for Vault Token 3
595 Vault B.2.*b*
605 Vaults B.2.*c* . . . B.2.*zz*
606 Vaults B.3 . . . n.*a* . . . zz.3 . . . n
620 Registry
625 Watchdog
646 Consumer 1
647 Primary Care Physician
648 Workstation Running SEED-Direct App
649 Workstation
651 Research Software
652 Non-Integrated Research Software
655 Masking Token A.1
656 Masking Key Pair A.1
661 Masking Token B.1 . . . n
662 Masking Key Pairs B.1 . . . n
670 Consumer 1 Identity B
671 Identity Assertion B
672 Identity Token B.1
673 Identity Key Pair B.1
674 Consumer 1 Identity C
675 Consumer 1 Identities C . . . ZZ
676 Identity Assertions C . . . ZZ
677 Vaults C.1.*a* . . . ZZ.1.*a*
678 Vault C.1.*a*
712 Old Key Master
714 New Key Master
725 Cyber Thieves
726 Rogue Insiders
727 Malware
728 Phishing
740 External Cryptography Service
741 Cloud Access Security Broker
742 Public or Private Cloud
750 Dissociative Masking
751 Analyst
754 Researcher
760 Healthcare Ecosystem
761 Specialist
762 Radiologist
763 Tracker
764 Lab
765 Payers
770 Project Ecosystem
771 Executive
772 Team Leader
773 Researcher
774 Field Data
775 Testing
777 Accounting
789 Squad Leader
790 Mission Planner
791 Soldier
792 Field Command
793 Squad or Platoon
794 User Interface and SEED APIs
795 Cloud Lockbox Isolated Mode
796 Key Master Isolated Mode
797 Registry Isolated Mode
798 Soldier's Handheld Device
799 Biometric Device
800 Registry A
801 Registry B
802 Registry C

DETAILED DESCRIPTION

Danger of Co-Mingled Functions

As we hear in the news every day, organizations and governments around the world struggle with the triple challenges of: securing sensitive data, sharing access for collaboration across a business ecosystem, and ensuring consumer privacy.

Non-SEED-Integrated Software 132 remains vulnerable due to co-mingling of functions as illustrated in FIG. 1. Once a vulnerability has been exploited and control of the Non-SEED-Integrated Software 132 established, the Cyber Thieves 725 as depicted in reference numeral 4 or Malware 727 as depicted in reference numeral 5 enjoy unfettered access often resulting in massive loss of data.

High privilege users, the most powerful being information technology professionals such as systems administrators, pose a particularly pernicious threat when they become Rogue Insiders 726 as depicted in reference numeral 6 or are themselves compromised by Cyber Thieves 725 as depicted in reference numeral 8. Rogue Insiders 726 thus pose an existential threat to the security of the data within the Non-SEED-Integrated Software 132 being responsible for some of the largest breaches as depicted in reference numeral 6.

2nd factor authentication as depicted in reference numeral 2 helps reduce the threat; however, most 2nd factor solutions connect to the same Non-SEED-Integrated Software 132 thus reduces the ability to detect and stop unauthorized access. Once Cyber Thieves 725 or Malware 727 have established sufficient authority within the Non-SEED-Integrated Software 132, these intruders may bypass or spoof the 2nd factor authentication as depicted in reference numerals 4 and 5, respectively.

As an example, User A 551 may be tricked by Phishing 728 as depicted in reference numeral 7 to open an infected attachment that launches a Malware 727 that begins to take control of her Workstation 649. Once User A 551 completes $1^{st}$ factor authentication using her Workstation 649 as depicted in reference numeral 1 and 2nd factor authentication from her Mobile Device 557 as depicted in reference numeral 2, then the Cyber Thieves 725 or Malware 727 have a trusted platform from which to launch additional phases of the criminal intrusion into Non-SEED-Integrated Software 132 numerals 4 and 5, respectively.

Enterprises deploy many cyber security tools to overcome these fundamental flaws with limited success. Product categories range from encryption, $2^{nd}$ factor authentication, intrusion detection, and more. Within each of these categories, an enterprise deploys multiple, incompatible products. For instance, in encryption separate products generally address premise-based server encryption, cloud access security broker encryption, end-point encryption, and more.

Competing encryption solutions generally utilize symmetric encryption for data at rest with a single key protecting large quantities of data. External Cryptography Services 740 are sometimes deployed to provide encryption, decryption, and key management services for the Non-SEED-Integrated Software 132 as depicted in reference numeral 3. The External Cryptography Solution 740, though, responds to instructions from the Non-SEED-Integrated Software 132 as depicted in reference numeral 3. Thus, when the Non-SEED-Integrated Software 132 has been compromised by Cyber Thieves 725, Malware 727, or Rogue Insiders 726, the External Cryptography Service 740 continues to respond to the Non-SEED-Integrated Software 132 as depicted in reference numeral 3 without detecting the malicious activity.

Solutions for sharing data with business partners and consumers rely on duplicating data rather than sharing access to a single source of the information. Once shared, the originator has no control or knowledge of how the receiver protects or shares the data with others, further increasing the risks.

SEED Protocol Fundamentals

The systems, methods and devices described herein enables the secure exchange and sharing of encrypted data and shall be collectively referred to as the SEED Protocol 500 as illustrated in FIG. 2. The Core Components 501 include the Registry 620, the Key Master 112, and the Cloud Lockbox 130. Anomaly detection and prevention functions are provided by the Watchdog 625. The Watchdog 625 may be a function of the Registry 620 or a standalone component. The Core Components 501 may also generate chains of encrypted blocks for use as distributed indelible ledgers and external validation, to be called SEED-Chain herein. A variation of the mechanism provides real-time protection for intelligent embedded systems such as those described as the Internet of Things.

The Elements of Control 505 utilized to control access to protected data include Identities and Permissions 506 governing access to the data, the Encrypted Files 507 which contain the protected data, and the Key Pairs 508 required to encrypt and decrypt the associated Encrypted Files 507. The Encrypted Files 507 may contain unstructured data or elements from a structured database stored, for instance, as JSON or XML files. The SEED Protocol delivers quantum-computer-resistant encryption using individualized or project centric asymmetric encryption, resulting in micro-segmentation encryption of the protected data that is computationally unbreakable.

The SEED Protocol 500 distributes the Elements of Control 505 across the Core Components 501 with Identities and Permissions 506 managed by the Registry 620, the Encrypted Files 507 managed by the Cloud Lockbox 130, and the Key Pairs 508 generated and managed by the Key Master 112. This separation of functions significantly improves security resilience by creating triangulation that requires approval by all three of the Core Components 501 for all deposits and retrievals of protected data. This results in the SEED Protocol 500 providing a no single point of failure cyber security solution.

Key Masters

Key Masters 112 create and manage asymmetric key pairs for themselves, individuals, organizations and devices. Key Masters 112 also provide encryption and decryption services for related applications such as SEED-Integrated Application 135.

A Key Master 112 generates its own asymmetric key pair and may share the public portion of the device-specific asymmetric key pair with the Registry 620 with which it associates. A Key Master 112 never shares its own private key.

Key Masters 112 may be provisioned as hardware appliances, dedicated servers, dedicated virtual servers, shared virtual servers, or any combination thereof. Hardware Key Masters 112 may scale horizontally, each serving a workgroup for instance, or scale vertically with multiple units serving the same large group of users. Virtual server Key Masters 112 may operate in on-premise or cloud environments. Virtual server Key Masters 112 may utilize auto-scaling to respond to changes in demand.

Registries

Registries 620 establish unique identities, verify authenticity, and create directories of individuals, members, organizations, Key Masters 112, Cloud Lockboxes 130 and other Registries 620. These directories may include public keys of all associated identities, components and devices.

The Registries 620 catalog all protected data files and the respective storage locations. The Registries 620 also manage permissions lists for access to encrypted files. In addition, the Registries 620 provide SEED-Direct $2^{nd}$ factor authentication as describe herein.

Cloud Lockboxes

Cloud Lockboxes 130 manage encrypted files at rest, utilizing access controls of both the SEED Protocol 500 as well as the underlying file system. A Cloud Lockbox 130 may be implemented on public cloud, private cloud or premise-based storage, including on end-user devices. A given repository of files may occupy a single physical storage location or can be split across multiple physical locations.

Cloud Lockboxes 130 may be implemented on any file system with the inherent capabilities of that file system determining the level of related code required to support the SEED Protocol functions including but not limited to:

On-premise storage area network, network addressable storage and other forms of storage;

Cloud-based storage including both public and private infrastructure;

Local storage such as a users' laptop computer.

Any storage that does not satisfy the SEED Protocol 500 requirements for a Cloud Lockbox 130 may be provided with a front-end software element to provide the needed functionality.

Watchdog

The Watchdog 625 adds an additional layer of triangulation by using machine learning to oversee activities of the Core Components 501 to detect unusual patterns of activity: in aggregate, based on activities by given users of the SEED-Integrated Software 135 applications, and across any subset of the protected data. The source of the data processed by the Watchdog 625 are the Core Components 501, and the application programming interfaces from SEED-Integrated Software 135 in the form of activity records produced by each step of a transaction.

The Watchdog 625 may further process external sources of data such as network activity "netflows" to further enhance the machine learning knowledge base, thus improving detection. Based on alerts from the machine learning, the Watchdog 625 may also be configured to halt access to protected data of any given user, of an entire SEED-Integrated Software 135 application, or to any subset of the protected data.

Similar to any other behavioral-based anomaly detection solution, the Watchdog 625 models normal behavior and alerts when activity exceeds behavioral norms. However, the Watchdog 625 benefits from:
  The closed network of the SEED Protocol 500 in which Core Components 501 should, under normal circumstances, communicate with a very narrow range of computers;
  The isolation of an organization's most valuable data within the Core Components 501 significantly narrows the detection focus; and
  The ability to "crowdsource" the creation of detection thresholds and anomaly response, as described herein, rather than just counting on detection from beleaguered information technology staff.

Communities of Interest

Any community of interest can establish its own operating parameters including:
  Selecting one or more asymmetric and/or symmetric encryption algorithms;
  Selecting a registry or registries;
  Establishing related membership requirements and identity verification thresholds;
  Selecting a cloud storage provider or providers at which to establish Cloud Lockboxes;
  Selecting from among the optional security measures;
  Determining hosting environments in which multiple hosting environments may be supported simultaneously; and
  Determining the minimum application integration levels.

Levels of Security

The SEED Protocol 500 can be deployed in various ways to achieve the security level desired by the community of interest ranging from:
  The stringent Federal Information Processing Standards 140-2 Level 4;
  Rigorous civilian standards for protecting confidentiality such as Health Information Portability and Accountability Act and the European Union General Data Protection Regulation;
  The relatively low-level security required for non-sensitive information; and
  And many levels in between.

The design traverses these various security levels based on:
  Deploying the key master as an appliance, thus keeping critical processes such as key management, encryption, and decryption within a hardened environment rather than running this software on a general purpose computer;
  Depth of integration with the applications;
  Depth of identity verification applied;
  Use of SEED-Direct $2^{nd}$ factor authentication as described herein including use of a second device, a second network and a variety of biometric options;
  Organizational separation of control of the Core Components 501 as described herein; and
  Optional registered IP address restrictions.

Organizational Separation

Optimal security of the SEED Protocol 500 requires organizational separation of control over the individual elements that make up the Core Components 501. As an example, if a single person has high level access to both the Registry 620 and the Key Master 112, then an organization has vested too much control in a single person risking the integrity of the SEED Protocol 500 to a Rogue Insider 726 as depicted in FIG. 2.

As with good accounting standards in which accounts payable is separate from accounts receivable, functional separation of the Core Components 501 improves security.

Control may be split within a single organization. For instance, the information technology department might manage a Registry 620 and Cloud Lockboxes 130 but not the associated Key Masters 112. The Key Master 112 could be managed by a different department such as human resources. Key Masters 112 operate semi-autonomously thus the administrative duties of a department such as human resources fits well with the required Key Master 112 management.

Control may also be split across organizations. For instance, an outside service provider might control the Registry 620, while the internal information technology staff controls the Key Masters 112, and a cloud hosting company controls the Cloud Lockbox 130.

One skilled in the art will recognize that multiple options existing for creating the desired organization separation of control over the Core Components 501.

Identity Assertion and Identity Masking

Upon establishing an identity for a person within the SEED Protocol 500, a Key Master 112 will create an identity assertion. This process will generate an identity token, an identity asymmetric key pair, and may generate one or more masking tokens and masking key asymmetric key pairs.

Using the healthcare industry as example as illustrated in FIG. 3, a Primary Care Physician 647 may trigger the establishment of a SEED Protocol 500 identity for Consumer 1 646 using the SEED-Integrated Software 135 as depicted in reference numeral 1.

The SEED-Integrated Software 135 may use application programming interface (API) commands to establish a new SEED Protocol 500 identity for Consumer 1 646 as depicted in reference numeral 2.

In response, the SEED Protocol 500 establishes Consumer 1 Identity A 570 for Consumer 1 646. A Key Master 112 may then generate Identity Assertion A 571 which includes Identity Token A.1 572, and Identity Key Pair A.1 573 as depicted in reference numeral 7. Identity tokens, such as Identity Token A.1 571, may be shared with the Registry 620 and with SEED-Protected Software 135 as depicted in reference numerals 2 and 8 respectively.

To support anonymization, the Key Master 112 may also generate an Masking Key Pair A.1 656 and the related Masking Token A.1 655 for Identity Assertion A 571 as illustrated in FIG. 3. The Masking Key Pair A.1 656 and the Masking Token A.1 655 are not shared with the Registry 620, SEED-Integrated Software 135, nor the Cloud Lockbox 130. The Key Master 112 retains the mapping of the Masking Token A.1 655 to the Identity Token A.1 572. Consumer 1 646 may be provided access to the Masking Token A.1 655.

As illustrated in FIG. 4, a given identity assertion such as Identity Assertion B 671 may only have one identity token and identity key pair; such as Identity Token B.1 672 and Identity Key Pair B.1 673. However, a single identity assertion, such as Identity Assertion B 671, may have any number of masking tokens and masking key pair for various applications such as Masking Tokens B.1 . . . n 661 and corresponding Masking Key Pairs B.1 . . . n 662.

While many aspects of the SEED Protocol 500 may operate without identity tokens and identity key pairs, the benefits of these aspects are vast and will be described herein.

Levels of Identity Assertion

One may create a ranking within the Registry 620 regarding the method of identity assertion to reveal to all parties the level of identity verification conducted when establishing any given identity in SEED Protocol 500. For instance, identity verification might be differentiated as follows:

In-person with government issued identification document,
In-person based on familiarity,
Endorsed by other identity,
On-line registration demographics question and answer,
Invited by e-mail, and
Self-registered with no proof of identity.

Individuals and applications could then utilize the identity assertion ranking to determine whether to trust any given identity assertion.

The Abstraction of Vaults

SEED Protocol 500 may be deployed to support many uses for any given person described herein as categories and vaults. The vault exists as an abstraction supported by all three components of the SEED Protocol 500.

As illustrated in FIG. 3, in response to the API call from SEED-Integrated Software 135 as depicted in reference numeral 2, the SEED Protocol 500 will create Vault A.1.*a* 580 for Consumer 1 Identity A 570 as depicted in reference numeral 6. Given the source of the API command, the SEED Protocol 500 knows that Category 1 575 applies as depicted in reference numeral 5.

A Key Master 112 generates Vault Token 1 581 and corresponding Key Pair 1 582. The Key Master 112 shares the Vault Token 1 581 with the Registry 620, as depicted in reference numeral 8, and may share the Vault Token 1 581 with a SEED-Integrated Application 135 as depicted in reference numeral 2. The Key Master 112 retains the Vault Token 1 581 and Key Pair 1 582, but does not retain information regarding the Category 1 575 nor the Consumer 1 Identity A 570.

The Registry 620 retains the mapping of identity tokens to identities and vault tokens to vault categories.

Depositing a File

In the API call to deposit a file, a SEED-Integrated Application 135 transmits a file to a Key Master 112 for encryption as illustrated in FIG. 3 as depicted in reference numeral 2. The SEED-Integrated Application 135 may include the Vault Token 1 581 in the API call to identify the vault where the file is to be deposited. Alternatively, the SEED-Integrated Application 135 may transmit an internal identifier for Consumer 1 646 in the API call, which the Key Master 112 may map to Vault Token 1 581. If the Key Master 112 is tasked with mapping the internal identifiers used by the SEED-Integrated Application 135, then the Key Master 112 may share the internal identifiers of SEED-Integrated Software 135 with the Registry 620, as depicted in reference numeral 8.

A Key Master 112 will encrypt the file received from SEED-Integrated Software 135 with the public key portion of Key Pair 1 582. A Key Master 112 also generates a file identification number (File ID) that uniquely identifies the file across the entire SEED Protocol 500 community of interest.

The Key Master 112 transmits to the Registry 620 the newly generated File ID, the Vault Token 1 581, and the identity of Primary Care Physician 647 as depicted in reference numeral 8. The Primary Care Physician 647 will be identified using an identity token established for the identity assertion of Primary Care Physician 647, or represented as a user name if an identity token has not been created.

The Registry 620 catalogs the new File ID among the File IDs 1 . . . n for Vault Token 1 584 and maps these to Consumer 1 Identity A 570 and Category 1 575. In addition, The Registry 620 catalogs and maps the permissions of other SEED Protocol 500 identities to access Vault A.1.*a* 580. Access permissions may be granular down to the file level, groupings of files, or the entire contents of a vault.

The specific application of the SEED Protocol 500 may also include unencrypted metadata associated with the file to be deposited. In such cases, the Registry 620 may also receive such unencrypted metadata and append it to the catalog entry for a given file.

The Key Master 112 also shares the new file identification number with the SEED-Integrated Application 135 as depicted in reference numeral 2 for use in retrieving the file. The Key Master 112 does not retain the file identification numbers it creates. Multiple Key Masters 112 may contribute file identification numbers to File IDs 1 . . . n for Vault Token 1 584.

The Key Master 112 also transmits the encrypted file, identified with the new File ID, to the Cloud Lockbox 130, as depicted in reference numeral 10, to be added to the Encrypted Files 1 . . . n for Vault Token 1 583, a process that may involve a secure relay as described herein. Encrypted Files 1 . . . n for Vault Token 1 583 are the files associated with Vault A.1.*a* 580, but the Cloud Lockbox 130 does not receive the vault token information, such as Vault Token 1 581. As a result, the Cloud Lockbox 130 only identifies the file by the unique file identification number such as File IDs 1 . . . n for Vault Token 1 584.

The deposit of the file to the Cloud Lockbox 130 from the Key Master 112 may utilize a secure relay as described herein or may be a direct transmission.

Retrieval of Protected Data

Retrieval of a file from Vault A.1.*a* 580 begins with an API call by the SEED-Integrated Software 135 to the Key Master 112 as illustrated in FIG. 3 as depicted in reference numeral 2. The API call includes the identity of the Primary Care Physician 647, Vault Token 1 581, and the requested File ID from the set of File IDs 1 . . . n for Vault Token 1 584 as depicted in reference numeral 2. The Key Master 112 first verifies the authenticity of the requesting SEED-Integrated Software 135. If the Key Master 112 denies the request, then the denial is transmitted to the SEED-Integrated Software 135 as depicted in reference numeral 2.

If the Key Master 112 approves the API call, the Key Master 112 transmits the identity of the Primary Care Physician 647, Vault Token 1 581, and the requested File ID from the set of File IDs 1 . . . n for Vault Token 1 584 to the Registry 620 as depicted in reference numeral 8. The Registry 620 verifies whether Primary Care Physician 647 has permission to retrieve the specified file from Vault A.1.a 580 containing files related to Consumer 1 646.

If the Registry 620 denies the request, the denial is transmitted to the Key Master 112 as depicted in reference numeral 8 and the Key Master 112 returns an error code to the SEED-Integrated Software 135 as depicted in reference numeral 2.

If the Registry 620 approves the requested retrieval, then Registry 620 transmits a file retrieval request for the specific File ID to the Cloud Lockbox 130 as depicted in reference numeral 9. The Cloud Lockbox 130 generates a download token for the requested File ID which is returned to the Registry 620 as depicted in reference numeral 9. The download token may operate on a one-time basis and may further be time-sensitive in validity.

The Registry 620 transmits the download token to the Key Master 112 as depicted in reference numeral 8. Next, the Key Master 112 transmits the download token to the Cloud Lockbox 130 as depicted in reference numeral 10. The Cloud Lockbox 130 then transmits the encrypted file that corresponds to the requested File ID to the Key Master 112 as depicted in reference numeral 10.

The Key Master 112 then decrypts the file and transmits the contents to SEED-Integrated Software 135 as depicted in reference numeral 2, a transmission that may be encrypted with session encryption such as SSL/TLS.

Secure Relay Communications Option

One of ordinary skill in the art will recognize that the network environments hosting Key Masters 112 may restrict inbound communications to the Key Masters 112 and/or do not readily support direct Key Master 112-to-Key Master 112 communications or Key Master 112-to-Cloud Lockbox 130 communications.

An alternative solution illustrates the flexibility of the SEED Protocol 500 while maintaining the same level of security. The transmission of the file to the Cloud Lockbox 130 by the Key Master 112 may pass through the Registry 620 as an alternative method of communications. Key Masters 112 may maintain routine contact with Registry 620 in a type of polling process that lets Registry 620 both detect the status of Key Masters 112 as well as provide opportunities to transmit waiting files, keys, etc. to Key Masters 112 using the Registry 620 as a secure relay as depicted in reference numerals 8 and 9 as illustrated in FIG. 3. This "phone home" secure relay feature of the Key Masters 112 avoids many of the complexities of the various network environments hosting Key Masters 112.

In such a secure relay configuration, the Registry 620 does not have the keys required to decrypt the file being relayed thus the security model is not affected. Furthermore, the secure relay for depositing files retains the authority of the Registry 620 over deposits to the Cloud Lockbox 130.

Furthermore, keeping the Registry 620 with authority over deposits enables additional features such as replicating files to multiple locations and rotating the storage locations of files.

One of ordinary skill in the art will recognize that the secure relay function could be similarly facilitated by the Registry 620 even if the secure relay utilizes some temporary caching storage location other than the Registry 620.

Heartbeat Monitoring

The Key Masters 112 routine contact with the Registry 620 also enables optional security features, using the contact as a form of "heartbeat" for the Key Master 112. For instance, a Key Master 112 that goes offline for a period of time may trigger the Registry 620 to disable that Key Master's 112 functions such as retrieving and decrypting files.

Similarly, a Key Master 112 that goes offline may, after reappearing online again, report its IP address information and, if equipped with a GPS chip, report its physical location. These data points would provide additional information for the Registry 620 to act upon.

One of ordinary skill in the art will recognize numerous ways in which these "heartbeats," IP and location information about a Key Master 620 could be used to further improve the security of the mechanism.

Separation of Functions

The vault abstraction highlights the separation of functions and the isolation of data elements operating with the SEED Protocol 500 to improve security as illustrated in FIG. 3. For instance, related to accessing the contents of Vault A.1.a 580, the Key Master 112 retains the Vault Token 1 581 and the related Key Pair 1 582 but does not have the File IDs 1 . . . n for Vault Token 1 584 or the Encrypted Files 1 . . . n for Vault Token 1 583. Also, the Key Master 112 does not retain information regarding Category 1 575 or Consumer 1 Identity A 570.

The Registry 620 retains the information related to Consumer 1 Identity A 570, Category 1 575, the Vault Token 1 581, and the File IDs 1 . . . n for Vault Token 1 584. The Registry 620 does not, however, have the Encrypted Files 1 . . . n for Vault Token 1 583. The Registry 620 may receive the public key portion of Key Pair 1 582 from the Key Master 112 but will never receive access to the private key portion of Key Pair 1 582.

The Cloud Lockbox 130 retains the Encrypted Files 1 . . . n for Vault Token 1 583, but does not retain information regarding the Vault A.1.a 580, the associated Vault Token 1 581, the Key Pair 1 582, the Category 1 575, or the Consumer 1 Identity A 570.

Thus, as illustrated in FIG. 2, for Cyber Thieves 725 or Rogue Insiders 726 to steal data protected by the Core Components 501 would require the breach of, at a minimum, both the Key Master 112 and the Registry 620. Should that occur, other measures such as the crowdsourced Watchdog 625 would still prevent significant data loss.

Delivery Direct to Workstation in Client-Server Application

Data retrieved from the Core Components 501 would generally temporarily exist in an unencrypted state in the memory of the server hosting the SEED-Protected Software 135. Thus if a Cyber Thief 725 or Rogue Insider 726 had become deeply embedded in SEED-Protected Software 135, then he may be able to opportunistically siphon unencrypted data from the server memory as illustrated in FIG. 2 as depicted in reference numerals 5 and 7 respectively.

To combat such scenarios, a software designer may elect to deliver the decrypted file from the Key Master 112 directly to the Workstation 649 as illustrated in FIG. 3 as depicted in reference numeral 4. The communications between the Key Master 112 and the Workstation 649 employs, of course, session encryption such as SSL/TLS. The SEED-Protected Software 135 continues to generate API requests for retrieval of protected data using File IDs and vault tokens as described herein, but the protected data is delivered directly to a workstation such as Workstation 649 instead of to the SEED-Protected Software 135. This narrows the exposure to parties with privileged access to Workstation 649.

Deposits of sensitive data may follow the reverse path with the Workstation 649 using an API call to a Key Master 112, as depicted in reference numeral 4, to submit data for encryption, cataloging, and storage. The subsequent File ID may be returned to the SEED-Integrated Software 135 as depicted in reference numeral 2 and, based on the design of the software, may be returned to the Workstation 649 as depicted in reference numeral 4.

Similarly, Workstation 649 could itself be equipped with encryption/decryption capabilities as well as generating and managing its own key pairs in accordance with the requirements of the community of interest as described herein. In such a configuration, Workstation 649 may generate and deposit as well as retrieve and decrypt files to/from the Core Components 501.

Alternatively, a Key Master 112 may serve as a go-between from the Workstation 649 encryption and decryption functionality and the Cloud Lockbox 130. For instance, in retrieving a file, a Key Master 112 could first decrypt the retrieved data and then re-encrypt the retrieved data file with the public key of Workstation 649. A Key Master 112 could then transmit the file to Workstation 649 for local decryption. A reversal of this process would provide the same go-between function for deposits of data to the Core Elements 501.

Activity Tracking-Only Vault Access

One may provide a very low level of access to a vault, allowing a party access to only the metadata retained by a Registry 620, enabling the ability to track activity that has occurred but not access any of the protected data.

Computing File Hash Values

To further assert the integrity of the data retrieved from the SEED Protocol 500, whenever the Key Master 112 encrypts a file, it may also generate a cryptographic hash value for the file using an algorithm such as MD5. The cryptographic hash value for the file is transmitted to the Registry 620 along with the corresponding File ID as illustrated in FIG. 3 as depicted in reference numeral 8. Upon subsequent retrieval and decryption of the file, a Key Master 112 will compute a cryptographic hash value using the same algorithm. A Key Master 112 or the Registry 620 may then compare the two cryptographic hash values to validate that the protected data has not been altered between the time of its deposit and retrieval.

In some instances, the Registry may apply a "hash-lock" based on metadata received from SEED-Integrated Software 135 or determined on another basis. The hash-lock would focus on information that should remain indelible, such as lab results from a blood test. The hash-lock would mean that the original hash generated for the file must remain the sole hash for that file.

In contrast, data subject to revision would result in different hash values for each generation of the file. For example, a file containing a draft patent application may be deposited by one co-inventor and later accessed by a second co-inventor. The original hash related to the file would assure the second co-inventor that the file has not been altered. After the second co-inventor re-deposits the file with his edits, a different hash value will be calculated for the revised draft patent application.

End-Point Encryption

Cloud Lockbox 130 capability may be extended to end point devices such as laptop computers. In such a scenario, the laptop-located-files may be:

An extension of one or more existing vaults, receiving copies of files.
One or more separate vaults each with unique key pairs.
A Key Master 112 functionality may be provided to the laptop user using a mobile computer fob, such as a computer in a USB format, to provide local processing and/or offline access to the encrypted files. Such offline access would require pre-authorization by a Registry 620 function or be supported by a mobile Registry 620 function, which may be provided using a mobile computer fob such as a computer in a USB format or other similarly capable device.

Support for Multiple Encryption Algorithms and Key Lengths

The SEED Protocol 500 may be configured to support a variety of asymmetric encryption algorithms and key lengths on a vault-by-vault basis. For instance, our initial configuration utilizes RSA encryption with 2,048 bit keys. A single Key Master 112 with sufficient processing capacity and memory may simultaneously support keys of various lengths and other encryption algorithms such as elliptical curve.

Support for Symmetric Encryption

While many benefits arise from the use of asymmetric encryption with the SEED Protocol 500 as described herein, the SEED Protocol 500 may also support symmetric encryption.

IP Address Restrictions

In addition to the methods of controlling access described herein, the SEED Protocol 500 may also be configured to restrict access to specific IP addresses of devices as asserted in either/both the Key Masters 112 and Registries 620.

Individual Initiation and Use of SEED Protocol Vaults

As illustrated in FIG. 4, Consumer 1 646 may directly subscribe to and use the SEED Protocol 500. Upon establishing her Consumer 1 Identity B 670 account with SEED Protocol 500, Consumer 1 646 may create, manually or by default, multiple categories of information established within SEED Protocol 500. For instance, Category 1 575 may be assigned to protect healthcare data, Category 2 576 may be assigned to protect financial data, and Registry Categories 3 . . . n 577 may be assigned to protect respective categories of information.

For any given category such as Category 2 576, any number of vaults may be created and depicted as Vault B.2.a 590, Vault B.2.b 595, and Vaults B.2.c . . . B.2.zz 605. One purpose for creating multiple vaults in one category is to create another mechanism for differential sharing of data with various parties. For instance, Consumer 1 646 may elect to share Vault B.2.a 590 with her parents but share Vault B.2.b 595 only with her business partner.

SEED Ecosystem

Joining Multiple SEED Identities Created for the Same Person

As illustrated in FIG. 5, circumstances may arise in which Consumer 1 646 has established Consumer 1 Identity B 670 with related Vault B.1.a 585 and Identity Assertion B 671, using a Workstation Running SEED-Direct App 648 reference numerals 1, 2, and 3 respectively. Consumer 1 646 may be using Vault B.1.a 585 to store health information she herself has generated or collect data from healthcare providers other than Primary Care Physician 647.

Rather than creating copies of data and/or merging the two identities for Consumer 1 646 into a single SEED identity, the Registry 620 may employ mapping of the two identities as depicted in reference numeral 4. After the mapping by the Registry 620, Primary Care Physician 647 will remain in control of Vault A.1.a 580 and Consumer 1 646 will remain in control of Vault B.1.a 585. Primary Care Physician 647 will gain access to all, or any portion of, the contents of Vault B.1.a 585 as determined by Consumer 1 646. Consumer 1 646 will gain access to all, or any portion of, the contents of Vault A.1.a 580 as determined by Primary Care Physician 647. Thus, both parties will have real-time access to the up-to-date contents of both vaults as per the permissions established. Either Consumer 1 646 or Primary Care Physician 647 may delegate any level of control over their respective vaults, but the "ownership" of the vault remains with the originating party.

Naturally, this model may be extended to any number of vaults created by Other Health-Related Entities 160 to protect healthcare related data of Consumer 1 646. For instance, healthcare providers, insurance companies, testing laboratories, and other parties may create Consumer 1 Identities C . . . ZZ 675 and related Vaults C.1.a . . . ZZ.1.a 677 for storing the data created in relation to Consumer 1 646.

Similarly, the originators of Consumer 1 Identities C . . . ZZ 675, Primary Care Physician 647, or Consumer 1 646 may trigger similar mapping of Vaults C.1.a . . . ZZ.1.a 677 to expand the unified view of the data related to Consumer 1 646 as illustrated in FIG. 5 as depicted in reference numeral 5.

Also, one may imagine situations in which vaults from other Categories may be mapped to create a unified view of data associated with Consumer 1 646.

Avoiding Encryption Silos

This ability to map multiple vaults to create a shared set of data as illustrated in FIG. 5 highlights another key capability of the SEED Protocol 500. Organizations take effort in securing their own sensitive data by using various types of encryption solutions as illustrated in FIG. 1, usually focusing on the data's residing location. For instance, an External Cryptography Service 740, aka "encryption on a stick," may be deployed to provide key management and encryption services for data stored within an enterprise as illustrated in FIG. 1. A Cloud Access Security Broker 741 may be deployed to encrypt data for applications hosted in a Public or Private Cloud 742. A third solution may be deployed to encrypt data on the Workstation 649.

Each of these encryption solutions utilize different encryption algorithms and varied methods of control. Sharing data among the various solutions requires both decryption and re-encryption. Interfaces built to create a unified corporate information system from the varied encryption solutions create attack surfaces for exploitation by Cyber Thieves 725, Malware 727, and Rogue Insiders 726, numerals 4, 5, and 6 respectively as illustrated in FIG. 1.

In the normal course of business, a company's confidential data needs to be shared with one or more other companies. Such sensitive data may move repeatedly in whole or in part among parties as updated or based on process progression. As with internal exchange of data, these inter-company movements of data require that sensitive information be decrypted before sharing outside the company. The originator of the sensitive data has no idea how the receiving company protects the data, nor with what other parties the receiving company shares the sensitive data. When such sensitive information has been updated by one party, the other parties have no clear methodology for synchronizing the unknown number of copies.

Healthcare Ecosystem Organized Around the Patient

The SEED Protocol 500 offers a comprehensive solution to these issues by facilitating the sharing of a single set of data among multiple parties.

For instance, consider the example of integrating health care data from multiple providers, each using different electronic health care record solutions. As illustrated in FIG. 6, three SEED Identities have been created for Consumer 1 646 in the Healthcare Ecosystem 760. In this example:

Consumer 1 Identity A 570 was generated by the Primary Care Physician 647, resulting in the generation of Vault A.1.a 580.

Consumer 1 Identity B 670 was generated by Consumer 1 646, resulting in the generation of Vault B.1.a 585.

Consumer 1 Identity C 674 was generated by Specialist 761, resulting in the generation of Vault C.1.a 678.

One of normal skill in the art will realize that the Healthcare Ecosystem 760 as illustrated in FIG. 6 includes software applications operated by the various parties which, for the sake of simplicity, have not been included in FIG. 6.

The three SEED Identities for Consumer 1 646 have been joined as described herein as depicted in reference numerals 1 and 2 respectively. Despite the data regarding Consumer 1 646 being stored in three separate vaults, all three parties have real time access to the latest version of the data. One of normal skill in the art will realize that other parties, such as the Radiologist 762, may also be added to the Healthcare Ecosystem 760 for Consumer 1 646.

As illustrated in FIG. 6 as depicted in reference numeral 3, the Primary Care Physician 647 may authorize a Lab 764, to deposit information into Vault A.1.a 580 for Consumer 1 646, as depicted in reference numerals 4. Such permission may be configured to allow "deposit only" access in which Lab 764 may deposit information into Vault A.1.a 580 but is not authorized to retrieve any information. One of normal skill in the art will realize that Lab 764 may alternatively establish a separate vault for Consumer 1 646 into which it may deposit information for Consumer 1 646 and then share the data within the Healthcare Ecosystem 760 for Consumer 1 646. One of normal skill in the art will also realize that other parties such as Tracker 763 may also be added to the Project Ecosystem 770 for Consumer 1 646.

Payers 765 may be added by Primary Care Physician 647 as depicted in reference numeral 3 to access the contents of Vault A.1.a 580 as depicted in reference numeral 5. Such permission grants Payers 765 limited access to claims forms for Consumer 1 646 but not the additional healthcare data in Vault A.1.a 580. Similarly, Specialist 761 may grant Payers 765 as depicted in reference numeral 8 access to Vault C.1.a 678 as depicted in reference numeral 7. One of normal skill in the art will realize that access for Payers 765 to claim forms may be configured in numerous ways.

Internal Integration

The example provided in FIG. 6 details the integration of health care data from multiple providers. In addition, the SEED Protocol 500 may be utilized to integrate disparate software systems within a single health care provider. Naturally, the same flexibility and integration capabilities extend across other industries.

Micro Segmentation Encryption

For any given individual, numerous asymmetric key pairs may be generated related to her identity, to vaults protecting information about her, and to vaults protecting information regarding projects in which she is involved. For instance, Consumer 1 646, as illustrated in FIG. 4, has on her own initiative generated:

Identity Key Pair B.1 673;
Masking Key Pairs B.1 . . . n 662 to mask her identity in some transaction;
Key Pair 2 587 for Vault B.1.a 585;
Key Pair 3 592 for Vault B.2.a 590;
As well as key pairs associated with Vault B.2.b 595, Vaults B.2.c . . . B.2.zz 605, and Vaults B.3 . . . n.a . . . zz 606.

Other parties also generate asymmetric key pairs regarding Consumer 1 646 as illustrated in FIG. 5:

Primary Care Physician 647 causes the Core Components 501 to generate key pairs for Identity Assertion A 571 and Vault A.1.*a* 580; and Other Health-Related Entities 160 cause Core Components 501 to generate key pairs for Identity Assertions C . . . ZZ 676 and Vaults C.1.*a* . . . ZZ.1.*a* 677.

This multitude of key pairs related to a single person such as Consumer 1 646 results in the micro segmentation encryption of sensitive data protected by the SEED Protocol 500. Rather than a single key protecting the records of many people as is common in symmetric encryption, in the SEED Protocol 500 a single asymmetric key pair may protect only a small portion of the data regarding a single person such as Consumer 1 646. This micro segmentation encryption creates insurmountable computational cracking hurdles due to the quantity of key pairs employed, impractical to crack even if one employed a quantum computer. While a quantum computer may decrypt the data protected by a single key pair, the computational effort to crack the contents of a large data set representing millions of people would remain infeasible.

Further, if one had both a set of keys and access to a Cloud Lockbox 130 containing the records of many patients, the File IDs of the encrypted files provide neither an indication of what keys are required to decrypt the file nor any link back to the identity of the patient whose data is in the file. Thus one would have to attempt decryption on every file in order to find out what files a stolen key might decrypt, if any, as the pertinent encrypted data may be stored in a different location.

Key Management

Unlike most implementation of asymmetric encryption, the key pairs in the SEED Protocol 500 are managed by the Core Components 501, primarily by the Key Masters 112. In some cases, such as SEED-Coin Application 1 406 as illustrated in FIG. 17, the end-user application may also possess cryptographic functions and generate its own key pair. Key Master 112 administrators, such as Key Master Administrator 511, may operate a Key Vault 520 as illustrated in FIG. 20. In none of these circumstances, though, do individuals directly access or manage the asymmetric key pairs. The key pairs generated by the SEED Protocol 500 are "owned" by the mechanism for the purposes described herein rather than being "owned" and managed by the individuals. This greatly simplifies use of the SEED Protocol 500 and dramatically extends the usefulness of asymmetric encryption.

The SEED Protocol 500 encompasses multiple types of asymmetric encryption key pairs:

Key Masters 112 generate:
 Their own public and private key pair,
 Identity key pairs and masking key pairs, and
 Vault key pairs.
Individual workstations, in some use cases described herein, may generate their own key pairs.

Sharing Access to a Vault

In one of the more unorthodox aspects of the SEED Protocol 500, the respective Key Masters 112 may exchange private keys of specific vaults to share a common set of files. For instance, a Key Master 112 serving an individual, such as Consumer 1 646, as illustrated in FIG. 6, may share the private key of a vault such as Vault B.1.*a* 585 to enable Primary Care Physician's 647 Key Master 112 to both retrieve and decrypt files from Vault B.1.*a* 585. This approach minimizes the duplication of data by allowing shared access to a common set of data.

Similarly, Primary Care Physician 647 may authorize Specialist 761 to have access to some portion of Primary Care Physician's 647 files regarding Consumer 1 646 to which Specialist's 761 Key Master 112 does not currently have the private key required for decryption.

Primary Care Physician 647 updates permissions at Registry 620 for Specialist 761 to access all, or a designated portion of, Primary Care Physician's 647 files regarding Consumer 1 646 as illustrated in FIG. 6 as depicted in reference numeral 3. Such changes to permissions may be executed via application programming interface calls from the related SEED-Integrated Software 135 as depicted in reference numeral 2.

Vault Private Key Exchange Process

The Specialist's 761 now has the permission in the Registry 620 to access files for Consumer 1 646 created by Primary Care Physician 647 and protected in Vault A.1.*a* 580. However, the Key Master 112 serving the Specialist 761 does not have the private key required to decrypt the files. related to Consumer 1 646 shared by Primary Care Physician 647.

In order to share a copy of the relevant private vault key, a Registry 620 transmits the public key of Specialist's 761 Key Master 112 to Primary Care Physician's 647 Key Master 112 as depicted in reference numeral 3 as illustrated in FIG. 6.

To create the key exchange file, the Primary Care Physician's 647 Key Master 112 may assemble:
 Consumer 1 Identity A 570 identity token;
 Vault A.1.*a* 580 vault token; and
 Private key portion of Vault A.1.*a* 580 key pair.
The Key Master 112 serving the Primary Care Physician 647 then performs two levels of encryption on the key exchange file as follows:
 Level 1: Using the public key of Specialist's 761 Key Master 112; and
 Level 2: Using the private key Consumer 1 Identity A 570 created at the request of Primary Care Physician 647 for Consumer 1 646, serving as a digital signature by proxy.

Primary Care Physician's 647 Key Master 112 then transmits the encrypted key exchange file to Specialist's 761 Key Master 112 as depicted in reference numeral 7, a process that may utilize secure relay as described herein.

Upon receipt of the key exchange, Specialist's 761 Key Master 112:
 Decrypts the level 1 encryption using the private key of the Key Master 112 serving the Specialist 761; and
 Decrypts the level 2 encryption using the public key of Consumer 1 Identity A 570 retrieved from the Registry 620 as depicted in reference numeral 8.

This process can also be reversed to provide a mechanism for Primary Care Physician's 647 Key Master 112 to request deletion of a previously shared private key of Vault A.1.*a* 580 if Primary Care Physician 647 revokes access.

This approach also retains the benefit of the Registry 620 never knowing the decryption keys because the Registry 620 will not have the respective Key Masters' 112 private keys required to decrypt the exchanged keys.

Alternatively, rather than sharing the private keys of vaults, a Key Master 112 to Key Master 112 relay may achieve the same goals for sharing access to a single set of files. In this scenario, rather than passing the private key for the vault from Key Master 112 to Key Master 112, the exchange will instead progress as follows as illustrated in FIG. 6:

Specialist 761 will request a file from Vault A.1.a 580 as depicted in reference numeral 8.

Key Master 112 of Primary Care Physician 647 will retrieve and decrypt the requested file as described herein.

Key Master 112 of Primary Care Physician 647 will re-encrypt requested file with the public key of the Key Master 112 of Specialist 761 and transmit the encrypted file to the Key Master 112 of Specialist 761 as depicted in reference numeral 7, a process that may involve a secure relay as describe herein.

Key Master 112 of Specialist 761 may now decrypt the file with its own private key and deliver to the Specialist 761.

Identity Private Keys

One of skill in the art will realize that tradition dictates that the private key portions of asymmetric key pairs related to identities are never shared due to concerns regarding non-repudiation and information security. To aid consumer mobility, the Core Components 501 do support the Key Master 112-to-Key Master 112 exchange of the private key of identity key pairs, such as Identity Key Pair B.1 673 as illustrated in FIG. 4. The only circumstance in which this may occur is when a consumer such as Consumer 1 646 requires service from more than one Key Master 112.

Securely sharing the private key of Consumer 1 Identity B 670 enables a secondary Key Master 112 to provide service to Consumer 1 646. For instance, Consumer 1 646 may utilize an at-home Key Master 112 appliance for day-to-day activities but when travelling does not have access to her at-home Key Master 112 due to a condition such as firewall settings in her home network. Thus, sharing the private portion of the asymmetric key pair for Consumer 1 Identity B 670 from her at-home Key Master 112 to a cloud-based Key Master 112 would enable full access to the SEED Protocol 500 while traveling.

When identity private keys are exchanged, the process is the same as used for the exchange of vault private keys as described herein:

Level 1: Using the public key of the receiving Key Master 112, and

Level 2: Using the private key of the identity to serve as a digital signature.

In terms of security of the protected information, possession of a private key for a vault or an identity is not in itself sufficient to compromise any protected data nor impersonate an individual, instead requiring successful triangulation as described herein.

The Key Masters 112 never share their own private keys. Thus, Key Masters 112 may assert their own identity using digital signatures. Key Masters 112 may also exchange data with other Key Masters 112 without any other device or software element in possession of either of the Key Masters' 112 private keys required to decrypt the Key Master 112-to-Key Master 112 communications.

One of ordinary skill in the art will recognize that the secure relay alternative method of communications as described herein may be used to facilitate key exchange for situations in which the networks to which Key Masters 112 are connected do not readily support direct Key Master 112-to-Key Master 112 communications.

Key Exchange and Non-Repudiation

In terms of the impact on non-repudiation, the SEED Protocol 500 does not rely on the identity key pair alone to deliver non-repudiation. Instead, the SEED Protocol 500 employs triangulation among SEED-Direct $2^{nd}$ factor authentication, $1^{st}$ factor authentication to the application accessing the Core Components 501, and authenticated API calls to the Key Master 112 as described herein.

Identity Masking and Dissociative Tokenization

Businesses of all kinds conduct analysis of company data to better understand trends and gain insights. The company data under analysis often contains valuable and sensitive data about customers, products, and market trends. Such aggregations of valuable and sensitive data create a risk of theft by Rogue Insiders 726 or external Cyber Thieves 725. Furthermore, companies often engage third parties to conduct data analysis, expanding the number of participants who have access to the valuable and sensitive data, resulting in the expansion of associated risks.

Masking identities has long been a practice to diminish the risks associated with data analysis yet re-identification has proven simpler than anticipated. With the addition of machine learning combined with an increase in the availability of large databases housing personal data, re-identification risks have risen drastically. Adding to the complexity, longitudinal research requires timely updates of the data set about any given individual, product, project, or other object of the analysis.

In addition, the individuals conducting the analysis may want to request further details about the object of analysis, e.g. ask a set of individuals represented in the data a question. Finally, particularly in relation to healthcare research, an individual who agrees to have his/her data included in a research program may want to check on the specifics of the analysis in their particular case. Traditional de-identification methods do not allow such two-way communications.

Finally, just because data has been de-identified does not mean that it loses all value in the wrong hands. For example, the consumer behaviors captured through web activity tracking offers valuable marketing insights to one's competitors even though the consumer identities have been masked.

The SEED Protocol's 500 dissociative masking may be used to:

De-identify a data set,

Dissociate the meaning of the data by tokenizing sensitive fields,

Re-identify and re-associate as needed,

Add to a de-identified data set longitudinally, and

Enable two-way communications between individuals and researchers without compromising anonymity.

Given the tremendous impact of dissociative masking in supporting healthcare research, we use a healthcare example to illustrate the mechanism below.

Consumer 1 646, or Consumer 1's 646 designee such as her Primary Care Physician 647, authorizes contribution of Consumer 1's 646 data for medical research as illustrated in FIG. 7 as depicted in reference numerals 1. Such permission may extend to all vaults and files containing Consumer A's 646 medical data or may be restricted to any subset of vaults and files.

Registry 620 flags Consumer 1 646 as a research participant and sends notification to a Key Master 112 as depicted in reference numeral 5. Key Master 112 sends Dissociative Masking 750 and Research Software 651 the selected masking token for Consumer 1 646, as illustrated in FIG. 7 as depicted in reference numeral 3.

Dissociate Masking 750 maintains tables of masking tokens for various patients, such as Consumer 1 646 mapped to various research programs.

Registry 620 sends a catalog digest to Key Master 112 including the file identification numbers of all files eligible for inclusion in research efforts from the patient such as Consumer1 646 identified with Consumer 1's 646 identity token as depicted in reference numeral 5.

Key Master 112 replaces identity token with corresponding masking token and forwards the digest to Dissociative Masking 750 as depicted in reference numeral 3. The same process may be repeated each time data eligible for inclusion in the research efforts is updated for Consumer 1 646.

An analyst, such as Analyst 751, who has already completed $1^{st}$ factor and SEED-Direct $2^{nd}$ factor authentication as described herein, uses Dissociative Masking 750 to create and transmit file retrieval requests to a Key Master 112 by using the file identification numbers provided in the digest of files eligible for inclusion in research efforts and the masking token of the related patient as illustrated in FIG. 7 as depicted in reference numeral 3. A Key Master 112 replaces the masking token with the corresponding identity token for the related patient and passes the file retrieval request to a Registry 620 as depicted in reference numeral 5.

To avoid abuse in the case that the Dissociative Masking 750 is hijacked by Cyber Thieves 725, retrieval processes from Dissociative Masking 750 may only trigger for a given patient such as Consumer 1 646 when:

Consumer 1 646 initially consents to contributing data to research program, or New data has been added for Consumer 1 646 in the associated vaults, making detection of abnormal activity easily spotted by the Watchdog 625 function as described herein.

As with other retrieval processes by applications, the cross-verification among the Key Master 112, Registry 620, and Cloud Lockbox 130 will apply to retrievals by Dissociative Masking 750 as described herein.

Upon receipt of a new file for Consumer 1 646, Dissociative Masking 750 searches for and deletes personal identifiers, e.g. Consumer 1's 646 name in a continuity of care document. Dissociative Masking 750 performs any additional de-identification, such as removal of address as prescribed by agreement with patients, healthcare providers, and participating research programs.

Next, Dissociative Masking 750 performs tokenization as prescribed by agreement among patients, healthcare providers, and participating research programs. For instance, a translation table in Dissociative Masking 750 may convert medical diagnoses into tokens with the translation tables retained in Dissociative Masking 750. In this way, the data can be dissociated from personal medical information allowing for wide distribution of resulting data sets to data scientists searching for and analyzing patterns in the data but whose research does not require explicit revelation of the various medical conditions.

To be effective, Dissociative Masking 750 will have to be trained to understand the various types of documents and data sources being processed by people such as Analyst 751. Dissociative Masking 750 may elect not to process data files that do not adhere to a known field mapping, providing a process error message for further human intervention. Once the files have been processed, Dissociative Masking 750 may delete the original files to avoid retention of data meant to be de-identified or dissociated.

Consumer 1's 646 data has now been both de-identified and dissociated as agreed to among patients, healthcare providers, and participating research programs. The data of Consumer 1 646 is now ready for delivery to researchers such as Researcher 754 in accordance with the specific subset of data required by the research program being conducted with Research Software 651.

Dissociative Masking 750 may conduct either push or pull notifications to Research Software 651 regarding availability of new data as illustrated in FIG. 7 reference numerals 3 and 4 respectively. Researcher 754 or Analyst 751 may elect to create a vault for exchange of the research data.

Given that the same masking token for Consumer 1 646 will be mapped to all eligible data sources, the Research Software 651 may construct a longitudinal record for Consumer 1 646.

Research programs may request additional information from Consumer 1 646 or her proxy using her masking token. A message is created by the Researcher 754 using the Research Software 651 as illustrated in FIG. 7 as depicted in reference numeral 6. The message is then transmitted to the Key Master 112 as depicted in reference numeral 4. The Key Master 112 replaces Consumer 1's 646 masking token with the corresponding identity token and forwards the message to the Registry 620, as depicted in reference numeral 5, for delivery to Consumer 1 646 or her designee such as Primary Care Physician 647 as depicted in reference numerals 1. Replies or questions from Consumer 1 646 follow the reverse path to Researcher 754 resulting in a two-way communications channel that does not compromise the anonymity of Consumer 1 646.

As an example to illustrate the use for such two-way communications, consider that the postal code and street address may have been removed from the de-identified data as part of the research agreement to avoid re-identification. Researcher 754 may, however, request additional location information if etiology of a medical condition is suspected to include a geographic clustering effect. Depending on the conditions of the research agreement, obtaining this additional information may require explicit consent from the patients such as Consumer 1 646.

Resulting amendments to the research agreements will be reflected in the data masking plan in Dissociative Masking 750. Rather than Consumer 1 646 directly providing additional information, the flow may proceed as with the original flow of data with Dissociative Masking 750 ensuring that personal identifiers remain absent from the data flows.

Consumer 1 646, or her designee, may also initiate communications with the researcher such as Researcher 754 to, as an example, retrieve any available results regarding her health uncovered in the study from Research Software 651. Naturally, for such a potentially sensitive data retrieval effort one would expect Consumer 1 646 or her designess had completed both $1^{st}$ factor and SEED-Direct $2^{nd}$ factor authentication as described herein.

As with all other types of transactions in the SEED Protocol 500, the movement of data for Dissociated Masking 750 and Research Software 651 would be logged and analyzed by the Watchdog 625 function, as well as made available for review by Consumer 1 646 and/or her designee.

Alternatively, one may envision a set of applications empowering Consumer 1 646 or her designee such as Primary Care Physician 647 to de-identity and dissociate Consumer 1's 646 healthcare records independent of any centralized application.

Alternatively, one may elect to allow Non-Integrated Research Software 652 to receive de-identified and dissociated data from Dissociative Masking 750 as illustrated in FIG. 8 as depicted in reference numeral 1. In this configuration, burden for security and identity verification falls on Dissociative Masking 750 as it serves as the sole connection to the SEED Protocol 500.

Use of SEED Protocol for Projects, Missions, and Cases

One of normal skill in the art will understand that the SEED Protocol 500 mechanism may organize around a project, mission, or case instead of being person-centric. The operations of the mechanism remain the same as SEED Protocol 500 adapts to these varying use cases. Both project-centric and person-centric use cases may co-exist within the same SEED Protocol 500 instance.

As illustrated in FIG. 9, an Executive 771 may establish her Executive Identity F 320, including the optional Identity Assertion F 321. The Executive 771 may then create any number of projects with any number of vaults for each project or may delegate control over the project to others while retaining access and control over any vaults created. For example, as illustrated in FIG. 9, Executive 771 via Executive Identity F 320 has authority over:

- Project 5 330 with associated Vault F.5.a 331 and the related elements created for every vault such as Vault Token 20 332, Key Pair 20 333, Encrypted Files 1 . . . n for Vault Token 20 334, and File IDs 1.n for Vault Token 20 339.
- Project 6 335 with associated Vault F.6.a 336, Vault F.6.b 337, and Vaults F.6.c . . . F.6.zz 338.
- Projects 7 . . . n 340 with associated Vaults F.7 . . . n.a . . . zz 341.

A Key Master 112 participating in the creation of a vault for a project, as with all vaults, creates a vault token and a corresponding key pair as described herein.

Project Ecosystem Organized Around a Project, Case, and/or Mission

One of normal skill in the art will realize that the Project Ecosystem 770, as illustrated in FIG. 10, includes software applications operated by the various parties which, for the sake of simplicity, have not been included in FIG. 10.

Proceeding with project execution, consider the example Project Ecosystem 770 as illustrated in FIG. 10. In this example, Executive 771 using Executive Identity F 320 launches Project 6 335 as depicted in reference numeral 1. Executive 771 then grants Team Leader 772 full access and control over Project 6 335 as depicted in reference numeral 1.

Using Team Leader Identity G 322, Team Leader 772 creates Vault F.6.a 336 associated with Project 6 335 as depicted in reference numeral 2. Team Leader 772, using Team Leader Identity G 322, authorizes deposit and retrieve privileges for Vault F.6.a 336 to Field Data 774, Researcher 773 and, in the same manner, to other team members as depicted in reference numeral 2. Now, the Field Data Identity H 323 and Researcher Identity J 324 share real time access to Vault F.6.a 336. The access may be unrestricted or restricted to specific files or groupings of files as determined by Team Leader 772.

Similarly, Team Leader 772 using Team Leader Identity G 322 authorizes deposit and retrieve privileges to Vault F.6.a 336, as depicted in reference numeral 2, to Accounting 777 with restrictions to specific files or groups of files related to the accounting job function. Subsequently, Accounting Identity L 326 shares real time access to the specific files or groups of files in Vault F.6.a 336 as depicted in FIG. 10 as depicted in reference numeral 7.

Team Leader 772 may establish a second vault for Project 6 335 as depicted in reference numeral 4, which results in the generation of Vault F.6.b 337. Due to secrecy or other "need to know" purposes, Team Leader 772 may limit access to Vault F.6.b 337 to Testing 775 as depicted in reference numeral 6. Subsequently, the Testing Identity K 325, Team Leader Identity G 322, and Executive Identity F 320 share real time access to Vault F.6.b 337. Team Leader 772 may limit Testing 775 to deposit-only access wherein, as depicted in reference numeral 6, Testing 775 may deposit information but may not retrieve information.

One of normal skill in the art will recognize that any number of vaults may be created for any given project. Use of multiple vaults to segregate access, as illustrated in FIG. 10, could be used in many ways including a military setting to segregate general mission data in one vault while using a separate vault for secret or top-secret information, and yet a third vault for information to be shared with coalition partners. The combination methods for differential access to information thus spans:

- Using a single vault and restricting access down to a file level, and
- Using multiple vaults along with file-level controls, permitting tremendous granularity, variation, and security.

Abstraction of the Cloud Lockbox and Option for Multiple Locations for Encrypted Files Given that a Registry 620 catalogs storage location information on a file-by-file basis, the Registry 620 may designate any number of storage locations to serve the Cloud Lockbox 130 functions. As an example illustrated in FIG. 4, for Vault B.1.a 585 the Encrypted Files 1 . . . n for Vault Token 2 588 may be stored in a public cloud, while for Vault B.2.a 590 the Encrypted Files 1 . . . n for Vault Token 3 593 may be stored in an on-premise computing system of an enterprise. Advancing further, the storage location of individual files may be distributed across multiple storage locations.

In logical extension, encrypted files could also be stored in local storage operated by Consumer 1 646 including, but not limited to, a laptop computer or mobile device such as a smartphone if such local storage operates within the functional requirements of a Cloud Lockbox 130 as illustrated in FIG. 5 as depicted in reference numeral 2.

While the initial implementation of SEED Protocol 500 utilizes a public cloud providing data replication, instances may occur in which it is helpful for the SEED Protocol 500 to replicate protected data. For example, as illustrated in FIG. 3, a Registry 620 may be configured to replicate any or all Encrypted Files 1 . . . n for Vault Token 1 583 in multiple locations. The primary copy may reside in public cloud storage while the secondary copy resides on the Workstation 649 of Primary Care Physician 647, or in any other storage location configured to serve as a Cloud Lockbox 130.

Levels of Integration

While the SEED Protocol 500 may be used to create a tightly coupled business ecosystem in which all parties share access to a single set of data, the solution offers logical stages of integration in which a single enterprise may commence with utilization of the SEED Protocol 500 and grow into wider use over time. For instance, an enterprise might pursue the following sequence in adoption of SEED Protocol 500:

Level 1: Use for encrypted backup and archive.
Level 2: Encrypt unstructured data files.
Level 3: Engage SEED-Direct $2^{nd}$ factor authentication.
Level 4: Utilize for internal integration of applications surrounding a shared set of data.
Level 5: Tokenize fields in relational databases.
Level 6: Conduct selective exchange of data resulting in data duplication.
Level 7: Conduct selective exchange of data using shared access to a common set of data.
Level 8: Unify data across a business ecosystem.

One skilled in the art will recognize that any number of integration and adoption phases may be created to adapt to the particular needs and circumstances of the customer.

SEED-Direct $2^{nd}$ Factor

To further bolster the security model, the SEED Protocol 500 supports triangulation as illustrated in FIG. 2 among:
- $1^{st}$ factor authentication from the User A 551 to the SEED-Integrated Software 135 as depicted in reference numeral 1,
- API calls required to deposit and retrieve protected data between the SEED-Integrated Software 135 and the Key Master 112 as depicted in reference numeral 2, and,
- 2nd factor authentication from User A 551 directly to the Registry 620 as depicted in reference numeral 3, which we call "SEED-Direct $2^{nd}$ factor."

A higher level of security is obtained when the SEED-Direct $2^{nd}$ factor authentication utilizes both a separate device and separate network from the original device and network used for $1^{st}$ factor authentication to the SEED-Integrated Software 135. For instance, the 1st factor authentication may utilize a Workstation 649 and the internal local area network as depicted in reference numeral 1. SEED-Direct $2^{nd}$ factor authentication, on the other hand, may use a Mobile Device 557 and a mobile carrier network, as depicted in reference numeral 3.

SEED-Direct $2^{nd}$ factor authentication may employ a variety of biometric, password, and/or SMS texted session codes to identify User A 551 allowing for multi-factor authentication directly with the Registry 620 as depicted in reference numeral 3. The Registry 620 may verify the authentication event by comparing previously stored data related to User A 551, including previously stored biometric data. The Registry 620 may also generate one-time, time-sensitive passcodes to be transmitted to User A 551.

Continuous SEED-Direct $2^{nd}$ Factor Authentication

For a higher level of security, continuous SEED-Direct $2^{nd}$ factor authentication, as illustrated in FIG. 2 as depicted in reference numeral 3, could be required for User A 551 to continue using the SEED-Integrated Software 135 and to continue accessing the data protected by Core Components 501. Examples of continuous authentication include biometric options, such as facial recognition or cardiac rhythm.

SEED-Direct $2^{nd}$ Factor and Proximity

In the cases where a Mobile Device 557 is utilized for SEED-Direct $2^{nd}$ factor authentication, the SEED-Direct $2^{nd}$ factor process may support location-based information from the Mobile Device 557 to determine authorization for User A 551 to access data protected within the Core Operational Components 501 of SEED-Integrated Software 135 as illustrated in FIG. 2. For instance, User A 551 might only have access to SEED-Integrated Software 135 from known GPS waypoints of User A's 551 work locations.

As another option, in the cases in which a Mobile Device 557 is utilized for SEED-Direct $2^{nd}$ factor authentication, SEED-Direct $2^{nd}$ factor authentication may support proximity as an aspect of the authentication event. For instance, a Bluetooth connection between the Mobile Device 557 and the Workstation 649, as depicted in reference numeral 9, could be required to maintain authorization to access the SEED-Integrated Software 135 and the related data protected within the Core Operational Components 501.

SEED-Direct $2^{nd}$ Factor with Single Envelope Implementation of Core Components 501

Although the Core Components 501 offer the most robust security when operated on three separate computing envelopes, one could operate a Key Master 112 and a Registry 620 of the Core Components 501 on a single computing instance using memory isolated application containers. Such a collapsed instance of the Core Components 501 retains the triangulation benefits illustrated in FIG. 2 among the $1^{st}$ factor authentication as depicted in reference numeral 1, the API calls from SEED-Integrated Software 135 to Key Master 112 as depicted in reference numeral 2, and SEED-Direct $2^{nd}$ factor authentication as depicted in reference numeral 3. In such a collapsed configuration, to those implementing the SEED Protocol 500, the Core Operational Components 501 would appear and function as though it were a single service component with multiple interfaces for specific purposes.

SEED-Direct $2^{nd}$ Factor Cross-Verifying $1^{st}$ Factor Authentication

SEED-Direct $2^{nd}$ factor authentication may also be used to verify $1^{st}$ factor authentication to the SEED-Integrated Software 135 as illustrated in FIG. 2. This cross-verification function offers powerful advantages even if the integration level of the software into the SEED Protocol 500 is quite low, for instance, if the SEED-Integrated Software 135 only uses SEED Protocol 500 for the verification of $1^{st}$ factor authentication.

Such verification would require that the SEED-Integrated Software 135 query the Registry 620, as depicted in reference numeral 4, prior to authorizing User A 551 access to the SEED-Integrated Software 135. Upon completion of User A's 551 first factor authentication as depicted in reference numeral 1, the SEED-Integrated Software 135 would issue an API call to the Registry 620, as depicted in reference numeral 4, to query whether User A 551 had completed SEED-Direct $2^{nd}$ factor authentication.

Until Registry 620 affirmatively responds to the inquiry from SEED-Integrated Software 135, User A 551 will not have access to the SEED-Integrated Software 135. Error messages from the SEED-Integrated Software 135 may be used to alert User A 551 of the reason for failed authentication. The Registry 620 may also share data with the Watchdog 625 regarding failed authentication attempts. The Watchdog 625 may be configured to alert any number of concerned parties including User A 551, IT staff, compliance staff, etc.

This verification of $1^{st}$ factor authentication may operate with or without the use of other features of the SEED Protocol 500 providing, for example, the benefits of the authentication triangulation without moving any data from the SEED-Integrated Software 135 into the Core Operational Components 501.

The addition of SEED-Direct $2^{nd}$ factor to the $1^{st}$ factor authentication to SEED-Integrated Software 135 enables the SEED Protocol 500 to detect a variety of breach scenarios. For instance:
- Hijacking of User A's 551 workstation through Phishing 728 as depicted in reference numeral 8;
- Compromise of User A 551's user account used by Cyber Thieves 725 as depicted in reference numeral 5 or Malware 727 as depicted in reference numeral 6;
- Unauthorized access by a Rogue Insider 726 as depicted in reference numeral 7.

Integration with Identity Management Software 137

Many organizations have implemented identity management strategies, using Identity Management Software 137 that, as illustrated in FIG. 12, may:
- Enable User A 551 to authenticate to multiple software systems, such as SEED-Integrated Software 135 and Non-SEED-Integrated Software 132, using a single user name and password;

Automate provisioning of accounts on SEED-Integrated Software 135, Non-SEED-Integrated Software 132, and other software systems interfaced to the Identity Management Software 137, and Extend trust to other organizations via a process based on negotiated agreements called federation, which enables a single identity and related authentication credentials be validated across a business ecosystem.

The Identity Management Software 137 solutions may seamlessly integrate with the SEED Protocol 500. In this scenario, User A 551 uses Workstation 649 to complete $1^{st}$ factor authentication with Identity Management Software 137 as depicted in reference numeral 1. User A 551 also completes SEED-Direct $2^{nd}$ factor authentication with the Registry 620 using Mobile Device 557 as depicted in reference numeral 3. Then, Identity Management Software 137 may verify completion of User A 551 SEED-Direct $2^{nd}$ factor authentication with a query to the Registry 620 as depicted in reference numeral 4 prior to authorizing User A 551 access to SEED-Integrated Software 135, Non-SEED-Integrated Software 132, and any other software associated with Identity Management Software 137.

While in many organizations User A 551 would have a single username and password for Identity Management Software 137, User A 551 may have multiple different usernames and passwords for software associated with Identity Management Software 137 such as SEED-Integrated Software 135, Non-SEED-Integrated Software 132, etc. The Identity Management Software 137 maintains a List of Associated Usernames 139 for User A 551. This list allows Identity Management Software 137 to, upon successful authentication to Identity Management Software 137 by User A 551, provide access to software associated with Identity Management Software 137, such as SEED-Integrated Software 135 and Non-SEED-Integrated Software 132.

Organizations adopting the SEED Protocol 500 may synchronize Identity Management Software 137 with the Registry 620 so that the Registry 620 has additional access to the List of Associated Usernames 139 for User A's 551. Such synchronization enables SEED-Integrated Software 135 and Non-SEED-Integrated Software 132 to query Registry 620 for verification of completion of User A 551 SEED-Direct $2^{nd}$ factor authentication as depicted in reference numerals 5 and 6 respectively, providing triangulation to detect whether Identity Management Software 137 has been compromised by cyber thieves.

Watchdog 625 Crowdsourcing

Traditional anomaly detection solutions depend on the work of information technology professionals who are frequently over-tasked. Further exacerbating the situation, the many alerts generated by anomaly detection systems frequently result in alert fatigue. Thus many breaches go undetected for months.

The SEED Protocol 500 offers the opportunity to crowdsource anomaly detection, engaging users of the applications such as Primary Care Physician 647 and subjects of the data such as Consumer 1 646 as illustrated in FIG. 3. Given that the SEED Protocol 500 organizes encryption and access controls around the subject of the data rather than the source of the data, the Watchdog 625 may engage users and consumers in training.

With users such as User A 551 and consumers such as Consumer 1 646 independently training the Watchdog 625 regarding levels of sensitivity for triggering alerts, a multitude of alert thresholds make it very difficult for Cyber Thieves 725 and Rogue Insiders 726 to determine an activity level that will evade detection. For instance, one consumer may elect to receive notification every time one of her medical records is accessed, while a second consumer may elect to receive notification only if his records are accessed outside of normal business hours, while yet a third consumer may elect to receive notification only if his records are accessed en masse.

Watchdog 625 training methods vary widely ranging from: text messaging queries and answers, to responses by users and consumers, to prompts in a SEED-Direct application, to a gamified web interface. The Watchdog 625 training may serve to both educate and determine alarm thresholds.

Responses to training prompts and activity alerts from users and consumers create a ledger to establish accountability.

Dynamic Distribution of Mission Data for Resilience

The flexibility of storage locations for the contents of a Cloud Lockbox 130 and related vaults, as described herein, enables the SEED Protocol 500 to be utilized for dynamic distribution of mission data to provide resilience in the event of communications disruptions and/or component destruction. For instance, the SEED Protocol 500 may be used to meet the information resiliency and secrecy needs for military activities across a battlespace including coordination with one or more allies. Full lifecycle encryption from the point of data creation protects data at-rest, in-motion, and as it traverses devices, applications and coalitions. This obviates the need for any additional network security such as VPNs. Since the SEED Protocol 500 is network-agnostic, the solution will function on any IP-capable network, adapting to varying speeds and quality.

As illustrated in FIG. 11, Mission Planner 790 gathers information from multiple sources to plan the mission and stores the information in one or more vaults associated with the mission using the Field Command 792 instance of the Core Components 501 to protect the information, as depicted in reference numeral 1. The Field Command 792 instance of the Core Components 501 may, for instance, be entirely based in a private cloud operated by the military branch involved.

With the ability to establish multiple vaults for a single project or mission as described herein, the Mission Planner 790 may create separate vaults for various levels of secrecy. Similarly, if the mission is being coordinated with a coalition of forces from other countries, the Mission Planner 790 may create a separate vault for data to be shared with coalition partners. As with the example herein of using SEED Protocol 500 for managing projects, rather than duplicating data among the various vaults, a single participant's view of a mission will be crafted based on their role and the unification of the contents of various vaults will be crafted based on their level of privilege.

At the discretion of the Mission Planner 790 or based on pre-determined time intervals, the encrypted mission data will be distributed to one or more Squad or Platoon 793 instances of the Core Components 501 as depicted in reference numeral 2, populating the Cloud Lockbox 130 and the Registry 620 with the mission data.

Encrypted mission data is automatically cached and routinely synchronized prior to mission launch and distributed to the encapsulated Core Component 501 instances at various command levels, including to individual Soldier's Handheld Device 798 as depicted in reference numeral 3. Each Soldier's Handheld Device 798 may be pre-loaded with authentication data to support multiple soldiers, such as Soldier 791. Furthermore, the Soldier's Handheld Device 798 may be pre-loaded with data for multiple missions while preventing access to missions other than the current mission.

At the Squad or Platoon 793 level, the Core Components 501 may be provisioned on ruggedized hardware operating across the data communications network utilized by the Squad or Platoon 793.

Mission data, although distributed, may not be accessed until Mission Planner 790 releases the necessary vault-specific private keys required for decryption and authorizes Registry 620 to permit retrievals. As an example, until the Squad Leader 789 needs access to the data, the required private keys will not be sent from the Field Command 792 Key Master 112 to the Squad or Platoon 793 Key Master 112. Until the Mission Planner 790 releases the vault-specific private keys, no soldier in the Squad or Platoon 793 may access the mission data, even though the data will be accumulating in the Squad or Platoon 793 Core Components 501. When the mission data is released to the Squad or Platoon 793, Mission Planner 790 may elect to authorize only the Squad Leader 789 to access the mission data.

Once the mission is activated, updates and new information will flow up and down the chain of command including to/from individual soldiers such as Soldier 791. Soldier's 791 authentication to the Squad or Platoon 793 Core Components 501 utilizes Soldier's Handheld Device 798 and may include biometric methods, including possible continuous authentication using a Biometric Device 799 as depicted in reference numeral 6.

In normal operations, Soldier's Handheld Device 798 will primarily function as a user interface and authentication tool. If Soldier's Handheld Device 798 loses contact with the Squad or Platoon 793 Core Components 501, the Soldier's Handheld Device 798 may launch lightweight versions of the Core Components 501 so that Soldier 791 may still have access to the mission data. Such isolated function may require continued biometric authentication using a Biometric Device 799.

Soldier's Handheld Device 798 may use any communications channel to which it can connect, e.g. low signal strength LTE sufficient for text messages. Soldier's Handheld Device 798 resumes normal operations when sufficient network capacity is available for the device to reconnect to any Core Components 501 instance within the command hierarchy.

If the Soldier 791 is captured, he may trigger "capture mode" operations of the Soldier's Handheld Device 798. In this mode, as long as Soldier 791 remains in continuous biometric contact, the Soldier's Handheld Device 798 will continue to operate but degrade performance of information retrievals, retrieving only low-level intel and/or offer false intel (pre-loaded as part of mission planning data caching).

If in contact with any usable network, Soldier's Handheld Device 798 will return duress code and GPS location inside the encrypted heartbeat signal routinely sent from Soldier's Handheld Device's 798.

One skilled in the art will recognize that this dynamic distribution of mission data may also be applied to a variety of other use cases such as intelligence field operations and disaster response operations.

SEED-Chain of Encrypted Blocks

Many companies pursue blockchain implementations primarily due to the distributed indelible ledger and distributed validation features of the technology; however, blockchain's tremendous computational effort in reversing cryptographic functions through brute force cracking results in low transaction volume and high costs in compute power and the related electricity consumption.

These overhead factors diminish the peer-to-peer promise of blockchain as the complexity and cost of running a node relegates most participants to working through "exchanges," i.e. the very middlemen blockchain is purported to eliminate. The exchanges have turned out to be the weak link in blockchain security with many large breaches affecting crypto currencies and smart contracts.

The cryptographic tools built into SEED Protocol 500 provide the option to construct next generation chains of encrypted blocks \that deliver distributed indelible ledgers and distributed validation, while maintaining very high transaction volume and consuming nominal amounts of electricity, which we call SEED-Chain herein. Combined with its cyber security features, the SEED Protocol 500 powers end-to-end protection for the next-generation blockchain applications using SEED-Chain.

The use cases described herein provide examples of how the SEED Protocol 500 may be used to generate chains of encrypted blocks for creation of distributed indelible ledgers suitable for distributed validation. These examples are themselves not exhaustive in detail regarding the relevant use cases nor are the examples intended to be limiting in the ways in which SEED-Chains of encrypted blocks may be created and used. Rather, the examples explain the general mechanisms and approaches.

Block Vaults

Vaults created for storing blocks in chains, thus named "block vaults," have both similarities and differences from the SEED Protocol 500 vaults discussed up to this point, offering tremendous flexibility to accommodate a variety of use cases. All vaults, including block vaults, have related tokens, key pairs, file identification numbers, and encrypted files as described herein. Blocks are specialized encrypted files utilized to implement specific business processes. Blocks and block vaults utilize additional features such as differential encryption for varied portions of a block as well as use case dependent modifications to the protocol among the core components and the integrated applications. A given chain of encrypted blocks may be entirely contained within a single block vault or distributed across multiple block vaults.

When a block vault is established, conditions specific to block vaults are also automatically established:
- Blocks may be deposited by any authorized party but may not be deleted.
- Blocks may be retrieved by any authorized party but may not be deleted.
- Blocks may not be altered and re-deposited, a condition which may be verified in multiple ways as describe herein.
- Blocks may be automatically and simultaneously replicated to any number of block vaults.

Optionally, one may require that all processing of blocks occurs within an application fully integrated into the SEED Protocol 500.

Flexible Block Contents

For the examples in this application, a block in a SEED-Chain may include any of the following elements:
- Entire block encrypted with, depending on the use case, either the public key or private key portion of the block vault key pair:
  - Unique File ID generated by a Key Master 112, which also serves as the filename for the block. File IDs are unique across the entirety of a SEED Protocol 500 community of interest as described herein.

Block sequence number that is unique to the related chain of encrypted blocks and is generated by a Registry 620 for the associated File ID generated by a Key Master 112.

Date/Time/KM Token generated by a Key Master 112 that serves as a unique identifier of the block creation event, unique across the entirety of a SEED Protocol 500 community of interest as described herein.

Identity token or identity masking token as described herein of the subject of the data in or of the originator of the block.

Additional metadata pertinent to the specific use case.

Hash value of the $2^{nd}$ portion of the block, if applicable.

$2^{nd}$ portion of the block encrypted with, depending on the use case, the private key or public key portion of key pair related to identity token or masking token contained in the first portion of the block:

Date/Time/KM Token as in first portion of the block.

Data elements specific to the use case.

One of ordinary skill in the art will recognize that many possible configurations exist for SEED-Chain, which are intended to be covered by the present application.

Voting Example Using Masking Tokens and SEED-Chains of Encrypted Blocks

The use of SEED Protocol 500, including the SEED-Chain and masking token capabilities, offers a uniquely powerful solution to the voting process. Voting represents a difficult use case due to the conflicting requirements to:

Verify voter identity prior to voting;

Maintain voter anonymity in relation to the votes he casts;

Enable third party audit of the votes and vote counting to verify the accuracy, validity, and absence of tampering; and Enable voter verification of ballot contents and vote counting of his individual ballot selections.

The SEED Protocol 500 uniquely addresses all four requirements. The following paper proof of an election management solution offers one of many possible configurations of the SEED Protocol 500 to satisfy the requirements.

A Board of Elections interfaces Board of Elections Software 350 into the SEED Protocol 500 as illustrated in FIG. 13. A Board of Elections also establishes SEED Protocol 500 identities for its own employees as described herein. Employees at a Board of Elections complete $1^{ST}$ factor authentication to the Board of Elections Software 350 and SEED-Direct $2^{nd}$ factor authentication, as described herein, prior to initiating actions related to the voting process.

Board of Elections Software 350 establishes voter identities using Application Programming Interface (API) calls to the Key Master 112 as illustrated in FIG. 13 as depicted in reference numeral 1.

As illustrated in FIG. 14, an API call may create a single voter identity, such as Voter 1 Identity 358, or may create multiple identities such as Voter 2 . . . n Identities 365 numerals 1 and 2, respectively. For each voter identity, a Key Master 112 will also generate voter identity cryptographic elements as depicted in reference numeral 3, such as Voter 1 Identity Assertion 360 containing:

Voter 1 Identity Token 361,

Voter 1 Identity Key Pair 362,

Voter 1 Masking Token 363, and

Voter 1 Masking Key Pair 364.

The Core Components 501 may return to the Board of Elections Software 350 voters' identity tokens, such as Voter 1 Identity Token 361, and may return the public portion of Voter 1 Identity Key Pair 362. The masking tokens and masking key pairs, such as Voter 1 Masking Token 363 and the Voter 1 Masking Key Pair 364, remain in the Key Master 112 rather than being shared with the Registry 620 or with the Board of Elections Software 350.

Alternately, the Core Components 501 may translate voter identification numbers utilized within the Board of Elections Software 350 to voter identity tokens such as Voter 1 Identity Token 361.

A Key Master 112 may also create a file containing Voter 1 Masking Token 363 and encrypt it with the public key portion of Voter 1 Identity Key Pair 362. The Key Master 112 may use Voter 1's Identity Token 361 to deposit the resulting file containing the Voter 1 Masking Token 363 into Voter 1's Cloud Lockbox 130, as described herein as depicted in reference numeral 7 as illustrated in FIG. 13, which may utilize a secure relay as describe herein. Providing masking tokens to the voters may enable:

Voter 1 357, or his designee, to retrieve his Voter 1 Masking Token 363 to verify that his ballot selections were accurately recorded and counted;

Alternatively, rather than a Key Master 112 retaining the mapping of Voter 1 Identity Token 361 to Voter 1 Masking Token 363, a Key Master 112 may be permitted to retrieve the Voter 1 Masking Token 363 from the Cloud Lockbox 130 of Voter 1 357 when needed for the voting process.

At any given time before the election, the Board of Elections Software 350 generates data sets for both the voter identification stations, such as Voter ID Computer 351, and the voting computers, such as Voting Computer 354 illustrated in FIG. 13.

As illustrated in FIG. 14, the Board of Elections Software 350 will also trigger the creation the category Election A 370 as depicted in reference numeral 10 and of completed ballots block vaults such as Completed Ballots Block Vault 1 372 as depicted in reference numeral 4.

Data sets for the voter identification computers, such as Voter ID Computer 351, will include necessary demographic information about each voter, each voter's identity token such as Voter 1 Identity Token 361, and ballot variation information, e.g. related to specific precincts, party affiliations, etc. These voter identification data sets may be encrypted and stored in a vault, such as Data Loads for Voter ID and Voting Computers Vault 371 as depicted in reference numeral 13 as illustrated in FIG. 14.

Data sets for the voting computers, such as Voting Computer 354, will include the vault token for the designated completed ballots block vault such as Completed Ballots Block Vault 1 372, and the ballot variations, e.g. based on differences by precinct, party affiliation, etc. These voting computer data sets may be encrypted and stored in a vault such as Data Loads for Voter ID and Voting Computers Vault 371 as illustrated in FIG. 14.

As illustrated in FIG. 13, as the election time draws near a poll worker, such as Poll Worker 1 356, logs into Board of Elections Software 350 using Voter ID Computer 351 for $1^{st}$ factor authentication as depicted in reference numerals 10, and completes SEED-Direct $2^{nd}$ factor authentication using a Mobile Device 557 as described herein. Once authenticated, Poll Worker 1 356 may activate the download of the data load specified for the Voter ID Computer 351 from the Core Components 501 as depicted in reference numerals 2 and 9.

Similarly, a poll worker, such as Poll Worker 2 368 logs into the Board of Elections Software 350 using Voting Computer 354 by using both $1^{st}$ factor authentication as depicted in reference numerals 8, and SEED-Direct $2^{nd}$ factor authentication using a Mobile Device 557 as described herein. Once authenticated, Poll Worker 2 368 may activate the download from the Core Components 501 of the data load specified for the Voting Computer 354 as depicted in reference numeral 3 as illustrated in FIG. 13.

Each voter ID computer, such as Voter ID Computer 351, and voting computer, such as Voting Computer 354, may have unique identification numbers generated by the Board of Elections Software 350 or by a Key Master 112 used to better control access to API calls and which may be included in resulting blocks. Each voter ID computer such as Voter ID Computer 351 and voting computer such as Voting Computer 354 may also utilize unique application programming interface authorization keys assigned by the Core Components 501 that are utilized to further tighten access to API calls.

As voting commences, voters such as Voter 1 357, first confirm their identities at the voter identification station manned by a poll worker such as Poll Worker 1 356 using Voter ID Computer 351. At the completion of the voter identification process, the Poll Worker 1 356 will have determined within the Voter ID Computer 351 the appropriate ballot variation for Voter 1 357. The Voter ID Computer 351 will generate a ballot number for the voter such as Voter 1 357. API calls from the Voter ID Computer 351 to the Core Components 501 may contain the identity token for the poll worker such as Poll Worker 1 356.

The Voter ID Computer 351 will then conduct an API call to the Registry 620, providing the voter identity token, such as Voter 1 Identity Token 361, the ballot variation identifier and the unique identification number for Voter ID Computer 351 as depicted in reference numeral 2 as illustrated in FIG. 13. In response, the Registry 620 authorizes the Key Master 112 to generate a ballot authorization for Voter 1 357 as depicted in reference numeral 6.

The Key Master 112 creates a ballot authorization containing the voter's masking token such as Voter 1 Masking Token 363, the ballot variation identifier, and the unique identification number for Voter ID Computer 351. Then, the Key Master 112 transmits the ballot authorization to a printer such as Ballot Authorization Printer 352 as depicted in reference numeral 4 as illustrated in FIG. 13. The ballot authorization may include barcodes or other types of encoding so that the Voter 1 Masking Token 363 is not visible in plain text but may be scanned by Ballot Authorization Scanner 353. The ballot authorization may be time sensitive and restricted to single use. Poll Worker 2 368 removes ballot authorization from Ballot Authorization Printer 352 and hands to the voter, such as Voter 1 357.

After successful printing of the ballot authorization by the Ballot Authorization Printer 352, the Key Master 112 returns a completion code to the Registry 620 as depicted in reference numeral 6 as illustrated in FIG. 13. In turn, the Registry 620 returns a printing completion code to the Voter ID Computer 351 along with the Voter Identity Token 361 as depicted in reference numeral 2.

Voter 1 357 takes printed ballot authorization and scans at the voting station using the Ballot Authorization Scanner 353. The Voting Computer 354 presents the designated ballot variation. Voter makes selections, reviews selections, and finalizes the ballot. Naturally, the Voting Computer 354 may be equipped with accommodations for the visually impaired.

Voting Computer 354 transmits to a Key Master 112 as depicted in reference numeral 3 as illustrated in FIG. 13:
  Voter masking token such as Voter 1 Masking Token 363,
  Completed ballot,
  Ballot variation number,
  Completed ballots block vault token such as the token for Completed Ballots Block Vault 1 372,
  Unique identifier for Voting Computer 354, and
  Transaction number generated by the Voting Computer 354.

This transmission may include the identity token of the poll worker such as Poll Worker 2 368.

A Key Master 112 generates the File ID for the received ballot, which is unique across the entirety of the SEED Protocol 500 community of interest. The Key Master 112 sends the File ID and the token for the completed ballots block vault, such as Completed Ballots Block Vault 1 372, to a Registry 620 as depicted in FIG. 13 as depicted in reference numeral 6. The Registry 620 increments the block sequence number for Completed Ballots Block Vault 1 372, associates and retains the new block sequence number with the File ID, and returns to the Key Master 112 the new block sequence number as depicted in reference numeral 6.

The Key Master 112 then generates a Date/Time/Key Master token that is unique across the entirety of the SEED Protocol 500 community of interest.

Next, The Key Master 112 generates a completed ballot block reflecting Voter 1's 357 selections that contains the following elements:
  Encryption with public key portion of block vault pair for block vault such as Completed Ballots Vault 1 372:
    Block sequence number,
    File ID of the completed ballot block,
    Date/Time/KM Ballot Token,
    Voter 1 Masking Token 363,
    Ballot variation number,
    Voting computer ID,
    Hash value for $2^{nd}$ portion of block;
    $2^{nd}$ portion of block contained within the first portion, with secondary encryption using the private key portion of Voter 1 Masking Key Pair 364 serving as a digital signature by proxy:
      Races A . . . ZZ=Candidates 1 . . . n,
      Issues 1 . . . n=For or against selections for each respective issue,
      Date/Time/KM Ballot Token.

Depositing the Completed Ballot

As illustrated in FIG. 14, a Key Master 112 transmits the completed ballot block to the designated block vault, such as Completed Ballots Block Vault 1 372, with the filename equal to the File ID as depicted in reference numeral 4. As described herein, this transmission of the ballot block from the Key Master 112 to a Cloud Lockbox 130 may involve a secure relay.

After successfully forming and depositing the completed ballot block, a Key Master 112 confirms completion by returning to the Voting Computer 354 the Date/Time/KM Ballot Token and the Transaction Number as depicted in reference numeral 3 as illustrated in FIG. 13, and by returning the completion code and voter identity token, such as Voter 1 Identity Token 361, to the Voter ID Computer 351 by relaying through the Registry 620 numerals 6 and 2 as illustrated in FIG. 13. Voting Computer 354 may print a paper receipt for voters such as Voter 1 357, providing the Date/Time/KM Token so that the voter or voter's designee may track their ballot selections through the vote counting process.

As configured by the Board of Elections, a Registry 620 may replicate the completed ballot blocks to any number of pre-determined block vaults and storage locations as long as such storage locations adhere to the attributes of a Cloud Lockbox 130 and the associated block vaults.

The Key Master 112 may separately encrypt specific voter election data consisting of either:
- the File ID, and the Date/Time/Key Master Token, or
- the entirety of the completed ballot, with the public key portion of Voter 1 Identity Key Pair 362. The Key Master 112 may then use Voter Identity Token 361 to deposit the encrypted voter election data into Voter 1's Cloud Lockbox 130 as depicted in reference numeral 7 as illustrated in FIG. 13 which may involve a secure relay as described herein.

While a Registry 620 will catalog the File IDs associated with completed ballots and may know that the referenced file contains a completed ballot, a Registry 620 can neither decrypt the voter's voting data nor learn the mapping of the masking tokens to identity tokens, such as Voter 1 Masking Token 363 to the Voter 1 Identity Token 361.

Authorized Verifiers and Board of Elections

Authorized verifiers, including the Board of Elections, may operate Verifier's Software 355, any variation of which may be acceptable if the software complies with the SEED Protocol 500. Each verifier shall establish their identity in the SEED Protocol 500, such as Verifier 1 Identity 375 as depicted in reference numeral 5 as illustrated in FIG. 14, for whom the Core Components 501 shall generate associated Verifier 1 Identity Assertion 376 as depicted in reference numeral 6.

The verifier's software such as Verifier's Software 355, may be integrated with the SEED Protocol 500, including complying with configuration requirements of the application programming interfaces. Prior to gaining access to any data, verifiers such as Verifier 1 Identity 376 may complete $1^{st}$ factor authentication with the Verifier's Software 355 and SEED-Direct $2^{nd}$ factor authentication as described herein.

Verifier's Software 355 is authorized through the SEED Protocol 500 with the following privileges as illustrated in FIG. 14:
- Read-only access to vaults containing completed ballot blocks such as Completed Ballots Block Vault 1 372 as depicted in reference numeral 4.
- Read-only access to the block sequence number-to-FileID lists from a Registry 620 for completed ballot block vaults such as Completed Ballots Block Vault 1 372.
- Creation and control over race and issue block vaults dedicated to a specific verifier such as Race/Issue A Block Vault 1 377 as depicted in reference numeral 7.
- Access to either:
  - Decryption and encryption services provided by a Key Master 112 using API calls from Verifier's Software 355, or
  - Private portion of vault key pair for completed ballot block such as Completed Ballots Block Vault 1 372, plus public portion of voters' masking key pairs such as the public portion of Voter 1 Masking Key Pair 364.

A Verifier's Software 355 may decrypt or request that a Key Master 112 decrypt one ballot at a time. Once a completed ballot has been decrypted, a Verifier's Software 355:
- Verifies that the File ID and Block Sequence Number in a Registry 620 matches the File ID and Block Sequence Number in ballot block,
- Verifies the hash value of the $2^{nd}$ portion of the block, and
- Verifies that the Date/Time/KM Ballot Token in the $1^{st}$ section of the block matches the Date/Time/KM Ballot Token in the $2^{nd}$ portion of the block, and Depending on the agreed upon contents of the completed ballot blocks, verifiers may also cross check data points such as the voting computer identification, validity of ballot variations, etc.

Next, The Verifier's Software 355 creates or utilizes pre-created block vaults for each race/issue such as Race/Issue A Block Vault 1 377 and for additional race/issues using vaults such as Race/Issue B . . . ZZ Block Vault 1 378 numerals 7 and 8 respectively as illustrated in FIG. 14. Only the verifiers have the right to make deposits to the respective race/issue block vaults they populate.

For any given race/issue, such as Race/Issue A, the Verifier's Software 355 creates one block for each vote for deposit in the race/issue vault such as Race/Issue A Block Vault 1 377 as depicted in reference numeral 7 as illustrated in FIG. 14. This interim step between completed ballot and vote count creates a fully traceable "show your work" feature of the election process.

The race/issue vote block may contain the following data elements:
- Encrypted with the public key of the associated race/issue block vault.
  - Block sequence number assigned by a Registry 620 for this block in this race/issue block vault as described herein for block sequence numbers assigned for completed ballot blocks.
  - File ID created by a Key Master 112 for this block in this race/issue block vault.
  - Block sequence number from associated completed ballot block.
  - File ID from the associated completed ballot block.
  - Date/time/key master token from completed ballot block.
  - Race/Issue identifier.
  - Race/Issue vote value.
  - Verifier identity token.
  - Attestation by verifier encrypted with private portion of verifier's identity key pair serving as a digital signature.

For deposits to race and issue vaults, the Verifier's Software 355 may conduct the required encryption and decryption or may issue application programming interface calls to a Key Master 112 to conduct the encryption. The Verifier's Software 355 may proceed to populate additional race/issue block vaults such as Race/Issue B . . . ZZ Block Vault 1 378 as depicted in reference numeral 8 as illustrated in FIG. 14.

Verifier 2 . . . n Identity 380 may commence simultaneously with vote counting, the processed contents of the Completed Ballots Block Vault 1 372, or other Completed Ballot Block Vaults 2 . . . n 373 as illustrated in FIG. 14. These additional verifiers populate vaults dedicated to them for each race/issue, as well such as Race/Issue A . . . ZZ Block Vaults 2 . . . n 382 as depicted in reference numeral 9 as illustrated in FIG. 14.

A Verifier's Software 355 may post a vote tally for any given race/issue in an election's results block vault such as Election Results Block Vault 385 as depicted in reference numeral 12 as illustrated in FIG. 14. This election results block structure may consist of the following components:
- Encrypted with public key of election results block vault such as Election Results Block Vault 385;
  - Block sequence number assigned by a Registry 620 for this block in this election results block vault as described herein;
  - File ID created by a Key Master 112 for this block in this election results block vault;
  - Race A . . . ZZ Candidate 1 . . . n Vote Count;

Issue A . . . ZZ Selection A or B Vote Count;

Verifier Identity Token; and

Attestation by verifier encrypted with private portion of verifier's identity key pair serving as a digital signature.

The Board of Election Software 350 may query the Election Results Block Vault 385 and Election Results Block Vaults 2 . . . n 386 to establish official vote tallies based on confirmation of counts from multiple verifiers.

A Board of Elections may also open the vote counting process to the general public. As one skilled in the art will realize, many suitable methods could be developed to count the votes. If a self-deputized verifier found discrepancies, the Board of Election may enlist the help of one or more recognized and integrated verifiers to analyze the results from the self-deputized verifier.

To perform the tracking of an individual's vote, the voter such as Voter 1 357 may grant the application verifying the vote access to his Voter 1 Masking Token. The vote verification application may retrieve the Date/Time/KM Ballot Token of Voter 1's 357 completed ballot from a completed ballots vault, such as Completed Ballots Block Vault 1 372 as depicted in reference numeral 4 as illustrated in FIG. 14. With the benefit of the File ID and Date/Time/KM Token, the application used by Voter 1 357 may traverse the race/issue vaults of any given verifier or multiple verifiers to confirm proper counting of his votes. Alternatively, the Voter 1 357 may have received a copy of his completed ballot in his Cloud Lockbox 130, in which case, the File ID and Date/Time/KM Ballot Token may be retrieved from that copy of his ballot.

Verifiers, including a Board of Elections, or other third parties, may streamline the ability of individual voters to verify that their own vote was properly counted by creating a separate log of the:

Date/Time/Key Master Token

Token for Race/Issue A Block Vault 1 372 and File ID.

Tokens for Race/Issue B . . . ZZ Block Vault 1 378 and File IDs.

Such access may be automated using a simple desktop or mobile application with which the voter, after authenticating to the SEED Protocol 500, may trace their own ballot based on the unique Date/Time/KM Token created by the Key Master 112 serving the Voting Computer 354.

The SEED-Vote design uniquely tackles the combined challenge of maintaining the anonymity of the ballot and enabling robust integrity and multi-party verification of the vote. FIG. 22 and Table 2 illustrate the data elements managed by every component of the voting process and their ability to de-identify a voter.

Data Elements, Origins, Sources and Retention

As illustrated in FIG. 22 and Table 2, a detailed review of the data elements that each device or vault manages includes:

Registry 620 abbreviated as "R" in the columns labeled "Origin" and "Source";

Key Master 112 abbreviated as "KM" in the columns labeled "Origin" and "Source";

Ballot Auth Printer 352 abbreviated as "Auth" in the columns labeled "Origin" and "Source";

Verifier's Software 355 abbreviated as "V" in the columns labeled "Origin" and "Source";

Voter ID Computer 351 abbreviated as "VID" in the columns labeled "Origin" and "Source";

Voting Computer 354 abbreviated as "Vote" in the columns labeled "Origin" and "Source";

Ballot Block Vaults such as Completed Ballots Block Vault 1 372 abbreviated as "BV" in the columns labeled "Origin" and "Source"; and Race/Issue Block Vault such as Race/Issue A Block Vault 1 377 abbreviated as "RIV."

As illustrated in FIG. 22 and Table 2:

The "Origin" column indicates the device that created the data element; and

The "Source" column indicates from where the data element was received. The "Source" may be a device, a vault or a block vault.

Also, as illustrated in FIG. 22 and Table 2, the "Retention" column abbreviated as "Retn" indicates how long a data element is retained with the possible following values.

Temp=Data element retained on a temporary basis, only as along as required by current process. As an example, Key Master 112 loads the contents of the completed ballot into the memory for the purpose of encrypting it but, once deposited, does not retain the contents of the ballot.

Vrfd=Data element retained until the election verified by a Board of Elections.

Pers=Data element retained on a persistent or permanent basis.

Investigations of election irregularities would benefit from the unprecedented ability to trace a detailed replay of the voting activities through poll workers, voters, specific voting machines, voter identification computers, the distributed indelible ledgers of the completed ballots blocks, and the stages of the vote counting process.

TABLE 2

SEED-Chain Vote Counting Data Elements

|  | Origin | Source | Retn |
|---|---|---|---|
| Voting Computer 354 [Vote] | | | |
| Voter Masking Token | KM | Auth | Vrfd |
| Ballot Variation # | VID | Auth | Vrfd |
| Voter ID Computer # | KM | Auth | Vrfd |
| Voting Computer ID | KM | Vote | Vrfd |
| Completed Ballots Block · Vaults Token | KM | Vote | Vrfd |
| Completed Ballot | Vote | Vote | Vrfd |
| Date/Time/KM Ballot Token | KM | KM | Vrfd |
| Transaction # | Vote | Vote | Vrfd |
| Race/Issue Block Vault [RIV] | | | |
| Encrypted with public key of Block Vault | | | |
| Block Sequence # | R | KM | Pers |
| File ID | KM | KM | Pers |
| Ballot Block Sequence # | R | Vote | Pers |
| Ballot File ID | KM | Vote | Pers |
| Date/Time/KM Ballot Token | KM | V | Pers |
| Race/Issue Identifier | BoE | V | Pers |
| Race/Issue Note Value | Vote | V | Pers |
| Verifier's Identity Token | KM | V | Pers |
| Encrypted with private portion of Verifier's identity key pair to serve as digital signature | | | |
| Attestation | V | V | Pers |
| Ballot Block Vaults [BV] | | | |
| Encrypted with public key of Block Vault | | | |
| Block Sequence # | R | KM | Pers |
| File ID | KM | KM | Pers |
| Date/Time/KM Ballot Token | KM | KM | Pers |

TABLE 2-continued

SEED-Chain Vote Counting Data Elements

| | Origin | Source | Retn |
|---|---|---|---|
| Voter Masking Token | KM | Vote | Pers |
| Ballot Variation # | VID | Vote | Pers |
| Voting Computer ID | KM | Vote | Pers |
| Hash Value of $2^{nd}$ Block Portion Encrypted with private key of Voter Identity Masking Pair to serve as digital signature by proxy | KM | KM | Pers |
| Race A . . . ZZ = Candidate 1 . . . n | Vote | KM | Pers |
| Issue 1 . . . n = Selection A or B | Vote | KM | Pers |
| Date/Time/KM Ballot Token Verifiers Software 355 [V] | KM | KM | Pers |
| Sequence # of Ballot Block | R | BV | Temp |
| File ID of Ballot Block | KM | BV | Temp |
| Voter Masking Token | KM | BV | Temp |
| Public portion of Voter Masking Key Pair | KM | KM | Temp |
| Date/Time/KM Ballot Token | KM | BV | Temp |
| Ballot Variation # | VID | Vote | Temp |
| Hash of $2^{nd}$ Portion of Ballot Block | KM | Vote | Temp |
| Completed Ballot | Vote | BV | Temp |

The SEED Protocol 500 may support any number of elections such as Elections B . . . ZZ 390 as illustrated in FIG. 14. Multiple levels of identity obfuscation may also be created using multiple sets of identity masking tokens, related multiple sets of masking key pairs, and multiple Key Masters 112.

One of normal skill in the art will see that numerous variations of the SEED Protocol 500 mechanism may be employed to support voting and other activities requiring both positive identification and anonymity.

Enabling Remote Voting and Other Interactions with Voters

The face-to-face voter identification process creates the opportunity to establish strong online identity assertion within the SEED Protocol 500 that may be used to support remote voting and other types of electronic interactions among voters and their local, county, state, and federal governments. Commercial entities may also elect to trust identity assertion backed by the various boards of election that adopt SEED Protocol 500. Likewise, a board of elections may elect to accept identification processes from others, such as driver license bureaus.

At any time during the in-person voter identification and voting process, the voter such as Voter 1 357 may voluntarily establish a password for future $1^{st}$ factor authentication to Voter ID Software 397 as illustrated in FIG. 13. At the same time, voter such as Voter 1 357 may also register a Mobile Device 557 for SEED-Direct $2^{nd}$ factor authentication with a Registry 620. Voter 1's 357 establishment of SEED-Direct $2^{nd}$ factor credentials may include capturing biometric characteristics.

Establishing credentials for both $1^{st}$ factor and SEED-Direct $2^{nd}$ factor authentication enables votes, such as Voter 1 357, to remotely access his own voting data that may have been deposited in the Cloud Lockboxes 130 established by a Board of Elections as described herein, but also to participate in remote voting.

At the same time, the Board of Elections may offer Voter 1 357 the opportunity to join in crowdsourced anomaly detection as described herein, further strengthening the integrity of the election process.

Subsequently, voting may be conducted from anywhere on the planet. A voter such as Voter 1 357 may complete $1^{st}$ factor authentication to the Voter ID Software 397 using a Workstation 649 running Workstation Ballot Application 399 as depicted in reference numeral 1 as illustrated in FIG. 15. Voter 1 357 may also complete SEED-Direct $2^{nd}$ authentication as described herein, using Mobile Device 557 as depicted in reference numeral 2. The Voter ID Software 397 may verify completion of SEED-Direct $2^{nd}$ factor authentication with the Registry 620 as depicted in reference numeral 3 before proceeding. The Voter ID Software 397 may further bolster identity assertion with questions for Voter 1 357 generated by the Board of Elections or other sources of data as depicted in reference numeral 1.

Once fully authenticated, Voter ID Software 397 may query the version of the Workstation Ballot Application 399 running on voter's Workstation 649 and update it accordingly as depicted in reference numeral 1 as illustrated in FIG. 15.

As with the in-person voting process, the Voter ID Software 397 will send Voter 1 Identity Token 361, ballot variation number, and Voter ID Software's 397 unique identifier to the Registry 620, which will in turn transmit this data to a Key Master 112 as depicted in reference numerals 3 and 5 respectively as illustrated in FIG. 15.

The Key Master 112 will send the Voter 1 Masking Token 363 and the ballot variation number to Voting Software 398 as depicted in reference numeral 6 as illustrated in FIG. 15. The Voting Software 398 will transmit the appropriate ballot through the Key Master 112 to Workstation 649 for use with Workstation Ballot Application 399 numerals 6 and 4 respectively, which may involve a secure relay as described herein.

One of normal skill in the art will recognize that the remainder of the remote voting process, as illustrated in FIG. 15, may proceed in a way similar to the in-person voting process as described herein. One of normal skill in the art will also recognize additional security measures may be layered into the remote voting process, such as establishing a unique identifier for each instance of the Workstation Ballot Application 399, and/or creating a unique key pair for the Workstation 649.

Alternative Configurations

One skilled in the art will recognize any number of modifications of the elections mechanism described herein.

As an example of the flexibility of the SEED Protocol 500, when the Board of Elections Software 350 prompts the generation of voter identities, the resulting identity and masking tokens could be encrypted and stored in a Cloud Lockbox 130 and then be purged from the Key Master 112. Later as the election draws near, the identity tokens and masking tokens may be loaded into the Key Master 112.

Further, each polling place could be equipped with dual, load balancing Key Masters 112. The download of voter identification information could then also prompt the decryption and download of voter identity and masking tokens to the Key Masters 112 at the specific polling place. This approach would further disperse the mapping of identity tokens to the related masking tokens, segmenting the mapping to individual polling places.

As another example of the flexibility of the SEED Protocol 500, rather than using the voter masking token such as Voter 1 Masking Token 363 in the ballot block vault, a key master may instead generate a unique token used only one time that may not in any way be mapped back to the individual voter. While this ensures privacy of the ballot, one loses the ability for an individual to trace their own vote through the process and, generally, erodes some of the methods that could be used to verify the integrity of the election. However this may be an acceptable trade-off in situations in which even the minutest risk of identifying the voter to his ballot must be avoided.

Validation without SEED Protocol 500 Integration

In creation of blocks and block vaults, many variations may be employed to support different use cases. For instance, in the election example described herein, the ballot block vaults are encrypted with the public key of the key pair for the block vault. This implies a need for one who wishes to access the block vault to have permission to do so. An alternative approach that is the most open configuration would be to:

Use the private key of the block vault key pair to encrypt the block,
Provide public read-only access to the block vault,
Publish the public key of the block vault, and
Publish the public keys for the voter identity masking key pairs.

Under these conditions, anyone would be able to access and validate the contents of a chain of encrypted blocks without using any other portions of or being integrated with the SEED Protocol 500.

Smart Contract Example of SEED-Chains of Encrypted Blocks

As another example of the power and flexibility of SEED-Chain, consider the application for "smart" contracts often discussed in relation to blockchain use cases. In this example of the smart contract use case, it is assumed that the identities of the parties do not require masking. One of normal skill in the art will recognize that by using identity masking tokens as in the voting example described herein, one may construct instead an anonymous smart contract solution.

Consider a project involving three; Party A, Party B and Party C in which identities do not need to be masked as illustrated in FIG. 16, which may reasonably consist of various stages such as:

Negotiations including multiple revisions,
Final executed agreement,
Deliverables,
Acceptances,
Invoices, and
Payments.

The three parties may share a single vault for the project or, more likely, establish their own vaults for the project as illustrated in FIG. 16 with:

Party A Executive F creating Project 6 335 and establishing Vault F.6.*a* 336.
Party B Executive P creating Project 10 342 and establishing Vault P.10.*a* 343.
Party C Executive T creating Project 20 345 and establishing Vault T.20.*a* 346.

As described herein, any party may elect to establish any number of vaults associated with a given project. Also, as described herein, the parties may elect to share the entirety of any vault's contents with other parties or may select specific files or file groups to share with other parties.

Given that the parties agreed to utilize SEED Protocol 500 SEED-Chains, they will need to establish at least one vault as the destination for the block deposits from the various parties. As illustrated in FIG. 16. we have assumed that each party will establish their own vault for receiving blocks generated by themselves or the other parties:

Party A Executive F establishing Block Vault F.6.*b* 337.
Party B Executive P establishing Block Vault P.10.*b* 344.
Party C Executive T establishing Block Vault T.20.*b* 347.

The Registry 620 will duplicate the chain blocks to all three associated vaults created for this purpose. Any of the parties may also allow access to external verifiers if so desired, most likely requiring consent from the other parties.

Smart Contract Block Contents

One of the many options for content and structure of the blocks follow.

Encrypted with public key portion of block vault key pair:
Unique File ID generated by a Key Master 112 that also serves as the filename for the block. File IDs are unique across the entirety of a SEED Protocol 500 community of interest as described herein.
Block sequence number that is unique to the related SEED-Chain and is generated by a Registry 620 for the associated File ID generated by a Key Master 112.
Date/Time/KM Token generated by a Key Master 112 that serves as a unique identifier of the block creation event across the entirety of a SEED Protocol 500 community of interest as described herein.
Party Taking Action.
Type of Action.
Identity token of user authorizing action.
Hash value of $2^{nd}$ portion of block.
$2^{nd}$ Portion encrypted with private key portion of authorizing User's actions identity key pair serving as a digital signature:
Associated File ID, e.g. of a related contract.
Hash of Associated File ID contents.
Date/Time/KM Token.

In the same way that one may map overlapping healthcare identities as described herein, the sharing configured in the Registry 620 provides a view of the project from the perspective of the different parties. For instance, Executive F will see Project 6 335 with:

Vault F.6.*a* 336 that she owns, controls, and shares with others as needed.
Vault P.10.*a* 343 as content, shared by Party B.
Vault T.20.*a* 346 as content, shared by Party C.
Block Vault F.6.*b* 337 as the location for blocks from all parties.

As one skilled in the art will realize, many options exist for variation on the project-related SEED-Chains:

The block may include an entire file rather than simply a reference to the associated file in the form of the associated File ID.
Blocks may be generated for internal actions as well as party-to-party actions to provide visibility into progress within one party for another party, e.g. verify whether invoice been approved for payment and passed to accounts payable.
Metadata retained by a Registry 620 may be particularly useful in helping the parties determine which blocks they may want to inspect.

All parties may inspect all blocks but access to related File IDs may be restricted to specific parties as described herein. For instance, as illustrated in FIG. 16, one individual at Party A may be authorized to verify that an invoice from Party B to Party C has been approved for payment, but the individual at Party A may not be authorized to access the associated File ID containing the invoice details and amount.

Parties may validate a block as the following process:
Stage 1 validation:
Decrypt $1^{st}$ portion of block with private key of block vault to verify that the block sequence number and File ID match between the Registry 620 and the block contents.
Inspect data elements in $1^{st}$ portion of block.
Stage 2 validation:
Decrypt $2^{nd}$ portion of block with public key for the identity token of person authorizing action to verify digital signature.
Verify Date/Time/KM is the same in $1^{st}$ portion and $2^{nd}$ portion.
Verify hash value of $2^{nd}$ portion of block.
Verify hash of contents of associated File ID (if access to associated file allowed).

Parties may agree to invite external validators to conduct stage 1 only, or stage 1 and stage 2 validation, by providing access to the vault(s) containing the blocks, the private key of the block vault, and the public keys of related identity tokens. The security of the SEED Protocol 500 will not be compromised in the verification process because verifiers:
Gain access to identity tokens of users authorizing actions and the associated public keys, but do not learn the users' identities.
Gain access to File IDs, but not to the vault tokens where the associate files reside.
Gain access to block vault tokens and the related private keys, but not to project vault tokens nor related keys.

If identity masking is needed, one may use masking tokens and corresponding masking key pairs of users authorizing actions for creating the blocks.

Support for Crypto Currencies

One of normal skill in the art may see how SEED Protocol 500 vaults, controlled by individuals as described herein, may be used as a "wallet" for storing tokens and cryptographic keys used in the exchange of any type of crypto currency. One may wed such a mechanism to the smart contract use case, as described herein, to create a payment mechanism. Beyond wallet functionality, the SEED Protocol 500 may be used to support distributing and trading any crypto currency by providing an end-to-end crypto currency solution using SEED-Chain coupled with the cyber security features described herein.

The SEED Protocol 500 may also generate unique crypto currencies, which we will refer to as SEED-Coin herein. The SEED-Coin use case illustrates the full range of crypto currency features of the SEED Protocol 500. Given the ability for true peer-to-peer operations, the verification of transactions may be conducted by the parties to a transaction. In the example presented herein, we have included $3^{rd}$ party verifiers.

As illustrated in our exemplary SEED-Coin configuration depicted in FIG. 17, each trader and verifier such as Trader 1 405, Trader 2 410, and Verifier 1 415 operate:
Their own key masters such as Key Master B 407, Key Master C 412, and Key Master D 417 respectively. These Key Masters 112 may be provisioned as local hardware appliances, as cloud-based virtual servers, or any mix thereof. A single Key Master 112 may participate in multiple crypto currency communities of interest, each using differing encryption algorithms and key lengths. While SEED-Coin may operate using shared Key Masters 112, we present a use case in which independently operated Key Masters 112 are deployed.
Workstations running a SEED-Coin software application such as SEED-Coin App 1 406, SEED Coin App 2 411, and SEED-Coin App 3 416 respectively. Use of the SEED-Coin software application provides an additional layer of encryption and enables richer peer-to-peer interaction but is not required for the SEED-Coin model to properly function.

As illustrated in FIG. 17:
Key Master Alpha 400 commissions the coins and performs all deposits to the block vault.
Brokering Software 425 may be used for multiple purposes such as connecting traders interested in buying and selling coins, broadcasting requests to verifiers, and automating other party-to-party and party-to-Core Components 501 tasks.
External Payment Gateway and Escrow 430 receives payments from one or more external Payment Processor 435 to settle pending transactions.

As with the SEED-Coin software application, the Brokering Software 425 and External Payment Gateway and Escrow 430 provide useful functions as described herein, but are not required for all possible configurations for the SEED-Coin mechanism.

Initialization of the SEED-Coin Application

The SEED-Coin application software generates its own asymmetric public/private key pair as per the encryption algorithm and key length requirements of the community of interest being joined. Upon registration with the SEED Protocol 500, the SEED-Coin application such as SEED Coin Application 1 406 will provide its own public key to the Registry 620 as illustrated in FIG. 17 as depicted in reference numeral 1.

The Core Components 501 will generate and return a unique workstation identifier and API key for the SEED-Coin application software instance to use in operations within the SEED Protocol 500 as depicted in reference numerals 2 and 1. The workstation identifier and API key may further be restricted to the specific hardware running the SEED-Coin application.

For all SEED-Coin operations, we assume in this example that traders and verifiers will complete both 1 st factor authentication to their respective workstations running the SEED-Coin application and SEED-Direct $2^{nd}$ factor authentication using a Mobile Device 557 as described herein.

One skilled in the art will recognize that the workstation running the SEED-Coin application may employ additional security features to restrict access to the SEED-Coin application software to a specific user of the workstation, and that such access may require entry of a username and password or other form of authentication.

A single workstation running the SEED-Coin application software may participate in multiple SEED Protocol 500 communities of interest. The SEED-Coin software application functions could also be implemented within other software solutions such as those operating smart contracts.

Coin Vaults

As illustrated in FIG. 18, coin vaults, such as Trader 1's Coin Vault 466 operated by Trader 1 Identity 460 may employ three levels of encryption:
First level using the public key of the vault itself; Second level using the public key of the trader's masking key pair such as Trader 1 Masking Key Pair 465; and
Third level using the public key of the trader's SEED-Coin application such as SEED-Coin App 1 406.

This triple encryption creates a very high level of security. For example, if Trader 1 405 wants to retrieve and decrypt a file from her Trader 1 Coin Vault 466, the program requires:

For first level action by the Core Components 501 as with any retrieval from a SEED Protocol 500 vault as describe herein, For the second level action by her own Key Master B 407, in which the private portion of the masking key pair is isolated; and For the third level, action by her own SEED-Coin App 1 406 in which the private portion of the SEED-Coin App 1 406 private key is isolated.

As with all vaults in the SEED Protocol 500, a coin vault such as Trader 1's Coin Vault 466 may utilize any storage media including, but not limited to, the workstation being used by the trader to run the SEED-Coin application, removable media such as USB drives, alternative cloud storage, and on-premise network addressable storage, etc. For storage media that does not adhere to the requirements of a Cloud Lockbox 130, the SEED-Coin application may fulfill the unmet Cloud Lockbox 130 functions for the storage media of choice.

Selling a Crypto Currency Coin

While crypto currencies may be used to purchase goods or services, the example herein will focus on the sale of a coin owned by Trader 1 405 to Trader 2 410. The transaction process may be modified to support the use of any crypto currency. For the remainder of this example, we will assume the sale of a SEED-Coin.

Coin sellers and buyers may find one another using match making software such as Brokering Software 425 as illustrated in FIG. 17. Whether through match making software or otherwise, once Trader 1 405 and Trader 2 410 identify their mutual intent to conduct a SEED-Coin transaction, they may complete the transaction in a purely peer-to-peer fashion. The following process example reflects an agreement between Trader 1 405 and Trader 2 410 regarding the sequence of actions, for instance submitting payment to escrow prior to receiving the SEED-Coin.

Traders Agree

Trader 1 405 and Trader 2 410 will negotiate details of the transaction, which may include trader-to-trader encrypted messaging provided by the SEED-Coin application running on their workstations as illustrated in FIG. 17 as depicted in reference numeral 3, communications that may involve a secure relay as described herein.

Trader 1 405 will authorize Trader 2 410 to access to Trader 1's Pending Transaction Vault 467 as depicted in reference numerals 1 and 2 as illustrated in FIG. 17.

Once agreement has been reached, Trader 1's 405 Key Master B 407 generates a pending transaction and deposits it in Trader 1 Transaction Vault 467, as depicted in reference numerals 2 and 4 as illustrated in FIG. 17. As illustrated in Table 3, the agreed to transaction file contains the pertinent data elements and is encrypted with the private key of Trader 1's Transaction Vault 1 467.

Trader 1 405 may operate multiple transaction vaults such as Trader 1's Transaction Vaults 2 . . . n 468. For simplicity of operations and security, Trader 1 405 may utilize a separate transaction vault for each pending transaction.

Next, Key Master B 407 provides the File ID of the pending transaction to the Registry 620, SEED-Coin Application 1 406, Key Master C 412, and SEED-Coin Application 2 411 with as depicted in reference numerals 2, 1, 3, and 5 respectively as illustrated in FIG. 17.

The Registry 620 then posts the File ID of the pending transaction, along with the vault token for Trader 1 Transaction Vault 467, to its public record for the SEED-Coin sequence number being sold. This serves as public notification that the given SEED-Coin is the subject of a pending transaction. The Registry 620 allows only one pending transaction per SEED-Coin sequence number to prevent double spending.

Trader 2 410 uses SEED-Coin App 2 411 to confirm that Trader 1 405 recorded the pending transaction with the Registry 620 as illustrated in FIG. 17 as depicted in reference numerals 5 and 6. Next, Trader 2 410 authorizes payment either:

a. Initiated internally to SEED Protocol 500 using External Payment Gateway and Escrow 430, which communicates with one or more Payment Processors 435 as depicted in reference numerals 6, 9 and 8; or b. Initiated externally by Trader 2 410 using Payment Processors 435, which transmits payment information to External Payment Gateway and Escrow 430 as depicted in reference numeral 8.

Trader 1 405 then uses SEED-Coin App 1 406 to confirm that payment from Trader 2 410 has been received by External Payment Gateway and Escrow 430 as depicted in reference numerals 1, 2, and 9.

Transferring the Coin

Once receipt of payment has been confirmed in External Payment Gateway and Escrow 430, Trader 1 405 uses SEED-Coin App 1 406 to transfer the SEED-Coin being sold from Trader 1's Coin Vault 466 to Trader 2 410. The transfer includes:

SEED-Coin Token,
Sequence number of the SEED-Coin,
Date/Time/KM Token of the SEED-Coin,
Trader 1's Transactions Vault 467 Token, and
File ID of Pending Transaction.

The SEED-Coin transfer file contents are triple encrypted as illustrated in Table 5 with:

$1^{st}$ level using public key of Trader 2's Key Master C 412, $2^{nd}$ level using public key of Trader 2's Identity Key Pair 473, and $3^{rd}$ level using public key of Trader 2's SEED-Coin Application 2 411 key pair.

These three layers of encryption provide tremendous security for the transfer of the coin such that:

$1^{st}$ level: Only Trader 2's Key Master C 412 may decrypt the outside of the SEED-Coin transfer file because Key Masters 112 never share their device-specific private key required for decryption, allowing for a wide variety of transmission methods without risk of exposure;

$2^{nd}$ level: Trader 2 410 will need to have completed $1^{st}$ factor and SEED-Direct $2^{nd}$ factor authentication to access the private portion of Trader 2 Identity Key Pair 473 required for decryption; and $3^{rd}$ level: Trader 2 410 will require access to his workstation running the SEED-Coin Application 2 411 to access the private portion of the SEED-Coin Application 2's 411 key pair required for decryption.

Coin transfer could be accomplished without the use of the SEED-Coin Application 2 411 in which case level 3 of encryption would not apply. Even using only level 1 and level 2 encryption for the coin transfer as described herein, the coin transfer file could be publicly posted without risking compromise of the SEED-Coin due to the computationally unbreakable encryption.

Trader 2 410 may use the SEED-Coin Application 2 411 to verify the authenticity of the transferred SEED-Coin by comparing the contents of the coin transfer, the pending transaction, and the currently valid transaction block to verify, among other data points, the:

Date/Time/KM Token of SEED-Coin in transfer to Date/Time/KM Token of SEED-Coin contained in the preceding transaction;

Sequence number of SEED-Coin in the transfer to the sequence number contained in preceding transaction and to the sequence number recorded in the Registry 620; and File ID contained in preceding transaction comparing, the File ID recorded in the Registry 620 for the given SEED-Coin sequence number.

After confirming the SEED-Coin, Trader 2 410 uses SEED-Coin Application 2 411 to receive the coin and deposit it in his own Trader's 2 Coin Vault 476, which may include use of Trader 2 Masking Key Pair 475. Then, Trader 2 410 uses SEED-Coin Application 2 411 to send coin transfer acceptance acknowledgement to Trader 1's 405 Key Master B 407 and SEED-Coin Application 1 406 as illustrated in FIG. 17 as depicted in reference numerals 5, 6, 2 and 1.

Signing the Transaction

Once the SEED-Coin transfer has been acknowledged, Trader 1's 405 Key Master B 407 computes the hash value of the transaction, encrypts the hash value with private key of Trader 1 Identity Key Pair 463, and deposits the results in the Trader 1's Transaction Vault 1 467 as illustrated in FIG. 18, serving as Trader 1's 405 attestation and digital signature for acceptance of the transaction.

Next, Trader 2's Key Master C 412 computes the hash value of the transaction, encrypts the hash value with private key of Trader 2 Identity Key Pair 473, and deposits the results in Trader 1's Pending Transaction Vault 467 serving as Trader 2's 410 attestation and digital signature for acceptance of the transaction.

Trader 1 405 may use SEED-Coin App 1 406 to submit the pending transaction for verification, potentially using Brokering Software 425 as illustrated in FIG. 17 as depicted in reference numerals 1, 2, and 16.

A verifier such as Verifier 1 415 may manually or automatically accept the incoming verification request. Verifier 1's SEED-Coin Application 3 416 and Key Master D 417 may, amonth other steps:

Retrieve the pending transaction file as illustrated in FIG. 17 as depicted in reference numerals 10, 11, 4 and 12 from Trader 1's Transaction Vault 1 467;

Retrieve the preceding transaction block listed in the pending transaction file as illustrated in FIG. 17 as depicted in reference numerals 10, 11, 4 and 12 from the Transactions Block Vault 450;

Verify with the Registry 620 that the coin sequence number in the pending transaction has been flagged as pending in the Registry 620 based on the File ID of the pending transaction and the vault token of Trader 1's Transaction Vault 1 467;

Verify that the File ID listed as "preceding" in the pending transaction matches the File ID recorded in the Registry 620 for the current ownership of the SEED-Coin; and Verify the attestations by Trader 1 405 and Trader 2 410.

If the transaction is verified, then Verifier 1's 415 Key Master D 417 computes the hash value of the pending transaction, encrypts the hash value with private key of his identity key pair, and deposits the results in Trader 1's Transaction Vault 1 467 serving as Verifier 1's 415 attestation and digital signature for validation of the transaction. A community of interest may define compensation rates for verifiers.

Posting a New Transaction Block

Once Trader 1 405, Trader 2 410, and Verifier 1 415 have all verified and signed the pending transaction, then one of the parties such as Verifier 1 415 may submit the pending transaction for posting to Key Master Alpha 400 as illustrated in FIG. 17 as depicted in reference numerals 10, 11, and 13. In response, the Key Master Alpha 400:

Retrieves pending transaction from Trader 1's Transaction Vault 1 467 as illustrated in FIG. 17 as depicted in reference numeral 14, which may involve a secure relay as describe herein;

Generates a File ID for the new transaction block; and

Provides Registry 620 with File ID for new transaction block as depicted in reference numeral 13.

Registry 620 increments the transaction block sequence number and transmits the new block sequence number to Key Master Alpha 400 as depicted in reference numeral 13. Then, the Key Master Alpha 400:

Generates Date/Time/KM token for the transaction;

Computes the hash value of the pending transaction;

Deposits the new transaction block as depicted in reference numeral 14 as illustrated in FIG. 17 into Transaction Block Vault 450 as illustrated in FIG. 18, which may involve a secure relay as described herein; and Transmits confirmation of deposit of new transaction block to Registry 620 as illustrated in FIG. 17 as depicted in reference numeral 13.

Registry 620 updates the "most recent" fields associated with relevant SEED-Coin sequence number with the File ID and sequence number of the new transaction block. The Registry 620 then purges the pending transaction data for the associated SEED-Coin, enabling the SEED-Coin to be traded again.

The Registry 620 next confirms completion of the transaction with communications to the External Payment Gateway and Escrow 430 as depicted in reference numeral 9, Trader 1's 405 Key Master B 407 as depicted in reference numeral 2, Trader 2's 410 Key Master C 412 as depicted in reference numeral 6, and Verifier 1's 415 Key Master D 417 as depicted in reference numeral 11.

The Transaction Block Vault 450 may be automatically replicated to any number of locations, such as Transaction Block Vault Duplicates 2 . . . n 451, constrained only by operating parameters determined by the community of interest.

External Payment Gateway and Escrow 430 may validate the new transaction block and:

Notify Trader 1 405 of release of payment as depicted in reference numerals 9, 2 and 1, and Release payment through external Payment Processors 435, if required, as depicted in reference numeral 8.

All traders and verifiers may be permitted access to the Transaction Block Vault 450 as illustrated in FIG. 18, as well as to the public keys required to decrypt transactions and validate any number of transaction blocks.

Naturally, the SEED-Coin solution may support any number of traders and verifiers such as Traders 3 . . . n Identities 490 and Verifiers 2 . . . n Identities 495 as illustrated in FIG. 18.

Data Elements, Origins, Sources, Retention and Cross-Checks

As illustrated in Table 3, Table 4 and Table 5, a detailed review of the data elements that each device manages includes:

Registry 620 abbreviated as "R" in the columns labeled "Origin" and "Source";

Key Master Alpha 400 abbreviated as "KM-A" in the columns labeled "Origin" and "Source";

Trader 1 Key Master B 407 abbreviated as "KM-B" in the columns labeled "Origin" and "Source";

Trader 2 Key Master C 412 abbreviated as "KM-C" in the columns labeled "Origin" and "Source"; and Verifier 1 Key Master D 417 abbreviated as "KM-D" in the columns labeled "Origin" and "Source."

SEED-Coin App 1 406 abbreviated as "App 1" in the columns labeled "Origin" and "Source."

SEED-Coin App 2 411 abbreviated as "App 2" in the columns labeled "Origin" and "Source."

SEED-Coin App 3 416 abbreviated as "App 3" in the columns labeled "Origin" and "Source."

Trader 1's Coin Vault 466 abbreviated as "CV" in the columns labeled "Origin" and "Source."

A detailed view of the levels of encryption and the data elements contained within a Coin Transfer from Trader 1 to Trader 2, abbreviated at "CT" in the columns labeled "Origin" and "Source", is also illustrated in Table 5.

As illustrated in Table 3, Table 4 and Table 5, a detailed review of the contents of the various vaults utilized in the SEED-Coin example includes:

Trader 1's Transaction Vault 1 467 abbreviated as "T1-TV" in the columns labeled "Origin" and "Source";

Transaction Block Vault 450 abbreviated as "TBV" in the columns labeled "Origin" and "Source"; and Trader 1's Coin Vault 466 abbreviated as "CV" in the columns labeled "Origin" and "Source."

As illustrated in Table 3, Table 4 and Table 5:

The "Origin" column indicates the device that created the data element; and

The "Source" column indicates from where the data element was received. The "Source" may be a device, a vault or a block vault. An abbreviation of "Multi" indicates that multiple sources contribute to a given data element such as a transaction file.

Also, as illustrated in Table 3, Table 4 and Table 5, the "Retention" column abbreviated as "Retn" indicates how long a data element is retained with the possible following values:

Temp=Data element retained on a temporary basis, only as along as required by current process. For example, Trader 1 Key Master B 407 loads the contents of the transaction into memory for the purpose of encrypting it, but once deposited, does not retain the contents of the transaction.

Opt=Data element retained or not retained on an optional basis. For example, Trader 1 Key Master B 407 may retain Trader 2 Identity Token 472 after completion of the current transaction.

Verf=Data element retained until transaction verified and recorded in the Transaction Block Vault 450.

Pers=Data element retained on a persistent or permanent basis.

Next=Until data element replaced with the next transaction for the given coin.

TABLE 3

SEED-Coin Transaction Formation Data Elements and Core Components

| Trader 1's Transaction Vault 467 [T1-TV] | Origin | Source | Retn |
|---|---|---|---|
| Transaction File | | | |
| Encrypted with private key of Trader 1's Transaction Vault 467 | | | |
| File ID of Transaction | KM-B | App 1 | Verf |
| Trader 1 Identity Token 462 | KM-B | App 1 | Verf |
| Trader 2 Identity Token 472 | KM-C | App 1 | Verf |

TABLE 3-continued

SEED-Coin Transaction Formation Data Elements and Core Components

| | | | |
|---|---|---|---|
| Sequence # of Coin | R | App 1 | Verf |
| Date/Time/KM token of Coin | KM-A | App 1 | Verf |
| Type of Transaction, e.g. Sell, Transfer for Goods/Services | App 1 | App 1 | Verf |
| If Sell, Price | App 1 | App 1 | Verf |
| Sequence # of Preceding Transaction Block | R | R | Verf |
| File ID of Preceding Transaction Block | KM-A | R | Verf |
| Trader 1 Attestation File | | | |
| Entire file encrypted with private key of Trader 1's Transaction Vault 467 | | | |
| File ID of Transaction | KM-B | KM-B | Verf |
| Trader 1 dentity Token 462 | KM-B | KM-B | Verf |
| Encrypted with private key Trader 1 Identity Key Pair 463 | | | |
| Hash value of Transaction | KM-B | KM-B | Verf |
| Trader 2 Attestation File | | | |
| Entire file encrypted with private key of Trader 1's Transaction Vault 467 | | | |
| File ID of Transaction | KM-B | T1-TV | Verf |
| Trader 2 Identity Token 472 | KM-C | KM-C | Verf |
| Encrypted with private key of Trader 2 Identity Key Pair 473 | | | |
| Hash value of Transaction | KM-C | KM-C | Verf |
| Verifier 1 Attestation File | | | |
| Entire file encrypted with private key of Trader 1's Transaction Vault 467 | | | |
| File ID of Transaction | KM-B | T1-TV | Verf |
| Verifier 1 Identity Token 462 | KM-D | KM-D | Verf |
| Encrypted with private key of Verifier 1 Identity Key Par 463 | | | |
| Hash value of Transaction File | KM-D | KM-D | 1 Verf |
| Trader 1 Key Master B 407 [KM-B] | | | |
| Trader 1 Identity Token 462 & Identity Key Pair 463 | KM-B | KM-B | Pers |
| Trader 1 Masking Token 464 & Masking Key Pair 465 | KM-B | KM-B | Pers |
| Trader 1 Transaction Vault 467 Token & Key Pair | KM-B | KM-B | Pers |
| Trader 2 Identity Token 472 | KM-C | KM-C | Opt |
| Public key of Trader 2 Identity 470 | KM-C | R | Opt |
| Verifier 1 415 Identity Token | KM-D | KM-D | Opt |
| Public key of Verifier 1 415 Identity | KM-D | R | Opt |
| Contents of the Transaction | Multi | T1-TV | Temp |
| Trader 2 Key Master C 412 [KM-C] | | | |
| Trader 2 Identity Token & Key Pair 472 & 473 | KM-C | KM-C | KM-CPers |
| Trader 1 Identity Token 462 | KM-B | KM-B | Opt |
| Public key of Trader 1 identity 460 | KM-B | R | Opt |
| Trader 1 Transactions Vault 467 Token | KM-B | KM-B | VerfOpt |
| Public key of Trader 1 Transaction Vault 467 | KM-B | R | Opt |
| Contents of Transaction | Multi | T1-TV | Temp |
| Verifier 1 Key Master D 417 [KM-D] | | | |
| Verifier 1 Identity 480 Token & Key Pair | KM-D | KM-D | Pers |
| Trader 1 Identity Token 462 | KM-B | T1-TV | Temp |
| Public key of Trader 1 Identity 460 | KM-B | R | Temp |
| Trader 2 Identity Token 472 | KM-C | T1-TV | Temp |
| Public key of Trader 2 Identity 470 | KM-C | R | Temp |
| Trader 1's Transactions Vault 467 Token | KM-B | R | Temp |
| Public key of Trader 1's Transaction Vault 467 | KM-B | R | Temp |
| Contents of Transaction | Multi | T1-TV | Temp |

TABLE 4

SEED-Coin Core Components and Block Vault Data Elements

| Registry 620 [R] | Origin | Source | Retn |
|---|---|---|---|
| Trader's & Verifier's Identities 460, 470 & 480 | Self | Self | Pers |
| Trader's & Verifier's Identity Tokens & Public Keys | KM-B, C & D | KM-B, C & D | Pers |
| Trader 1's Transaction Vault 467 Token & Public Key | KM-B | KM-B | Pers |
| Public Keys of SEED-Coin Apps 406, 411 & 416 | App 1, 2 & 3 | App 1, 2 & 3 | Pers |
| Unique IDs of SEED-Coin Apps 406, 411 & 416 | R | R | Pers |
| Transaction Block Vault 450 Token & Public Key | KM-A | KM-A | Pers |
| Coin Sequence #s | | | Pers |
| a. File ID of Current Block in Transaction Block Vault 450 | KM-A | KM-A | Next |
| b. Sequence #s of Current Transaction in Transaction Block Vault 450 | R | R | Next |
| c. Pending Transaction File ID and Vault Token for Trader 1's Vault 467 | KM-B | KM-B | Temp |

| Key Master Alpha 400 [KM-A] | Origin | Source | Retn |
|---|---|---|---|
| Trader 1's Transaction Vault 467 Token and File ID of Pending Transaction | KM-B | R | Temp |
| Trader 1 & 2 Identity Tokens 462 & 472 | KM-B & C | T1-TV | Temp |
| Public Keys Trader 1 & 2 Identities 460 & 470 | KM-B & C | R | Temp |
| Verifier 1 Identity 480 Token | KM-D | T1-TV | Temp |
| Public Key of Verifier 1 Identity 480 | KM-D | R | Temp |
| Public key of Trader 1 Transaction Vault 467 | KM-B | R | Temp |
| Contents of Transaction | KM-B | T1-TV | Temp |
| Attestations by Trader 1 405, Trader 2 410 and Verifier 1 415 | KM-B, C & D | T1-TV | Temp |
| Transaction Block vault 450 Token & Key Pair | KM-A | KM-A | Pers |
| File ID of Transaction Block | KM-A | KM-A | Pers |
| Sequence # of Transaction Block | R | R | Pers |
| Date/time/KM Token of Transaction Block | KM-A | KM-A | Temp |

| Transaction Block Vault 450 [TBV] | Origin | Source | Retn |
|---|---|---|---|
| Entire block encrypted with private key of Transaction Block Vault 450 | | | |
| Sequence # of Transaction Block | R | KM-A | Pers |
| File ID of Transaction Block | KM-A | KM-A | Pers |
| Date/Time/KM Token of Transaction Block | KM-A | KM-A | Pers |
| Sequence # of Coin | R | T1-TV | Pers |
| Date/Time/KM Token of Coin | KM-A | T1-TV | Pers |
| Verifier 1 415 Identity token | | T1-TV | Pers |
| Encrypted with private key of KM-A | | | |
| Hash value of Transaction | KM-A | KM-A | Pers |
| Encrypted with private key of Trader 1's Transaction Vault 467 | | | |
| File ID of Transaction | KM-B | T1-TV | Pers |
| Trader 1 Identity Token 462 | KM-B | T1-TV | Pers |
| Trader 2 Identity Token 472 | KM-C | T1-TV | Pers |
| Sequence # of Coin | R | T1-TV | Pers |
| Date/time/KM Token of Coin | KM-A | T1-TV | Pers |
| Type of Transaction, e.g. Sell, Transfer for Goods/Services | App 1 | T1-TV | Pers |
| If Sell, Price | App 1 | T1-TV | Pers |
| Sequence # of Preceding Transaction | R | T1-TV | Pers |
| File ID of Preceding Transaction Block | KM-A | T1-TV | Pers |

TABLE 4-continued

SEED-Coin Core Components and Block Vault Data Elements

| | | | |
|---|---|---|---|
| Encrypted with private key of Trader 1 Identity Key Pair 463 | | | |
| Hash value of Transaction | KM-B | T1-TV | Pers |
| Encrypted with private key of Trader 2 Identity Key Pair 473 | | | |
| Hash value of Transaction | KM-C | T1-TV | Pers |
| Encrypted with private key of Verifier 1's Identity 4780 Key Pair | | | |
| Hash value of Transaction | KM-D | T1-TV | Pers |

TABLE 5

SEED-Coin Vault and Coin Transfer Data Elements

| | Origin | Source | Retn |
|---|---|---|---|
| Trader 1's Coin Vault 466 [CV] | | | |
| $1^{st}$ level encrypted with public key of Trader 1's Coin Vault 466 | | | |
| $2^{nd}$ level encrypted with public key of Trader 1 Masking Key Pair 465 | | | |
| $3^{rd}$ level encrypted with public key of Trader 1's SEED-Coin App 1 406 | | | |
| SEED-Coin Token | KM-A | Previous | Pers |
| Date/Time/KM Token of Coin | KM-A | Owner | Pers |
| Sequence # of Coin | R | | Pers |
| Coin Transfer (CT) | | | |
| $1^{st}$ level encrypted with public key of Key Master C 412 | | | |
| $2^{nd}$ level encrypted with public key of Trader 2 Identity Key pair 473 | | | |
| $3^{rd}$ level encrypted with public key of SEED-Coin App 2 411 | | | |
| SEED-Coin Token | KM-A | CV | Temp |
| Sequence # of Coin | R | CV | Temp |
| Date/Time/KM Token of Coin | KM-A | CV | Temp |
| Trader 1's Transactions Vault 467 Token | KM-B | KM-B | Temp |
| File ID of Pending Transaction | KM-B | KM-B | Temp |

As illustrated collectively by FIGS. 17 and 18, the separation of duties and segregation of data elements creates a high security trading environment and generates a robust distributed indelible ledger as per the following examples.

The hash values of the transaction in the Transaction Block Vault 450 has been calculated independently by four separate Key Masters including Trader 1's Key Master B 407, Trader 2's Key Master C 412, Verifier's Key Master D 417, and Key Master Alpha 400. All four hash values must be equal for the block to be valid. Attempts to alter or counterfeit a block would, among other data elements, require the private portion of the identity key pairs for Trader 1 Identity 460, Trader 2 Identity 470, and Verifier 1 Identity Assertion 480.

The transaction File IDs and Date/Time/KM Tokens are generated by a Key Master 112, while the transaction sequence numbers are generated by a Registry 620. Modification or counterfeit of a block would require control of both the Registry 620 and the relevant Key Masters 112. However, the deceit would be uncovered when examining the Date/Time/KM Token, which is not retained in the Registry 620 or a Key Master 112.

Trader 1's SEED-Coin Application 1 406 or Trader 1's Key Master B 407 may receive Trader 2's Identity Token 472 directly from Trader 2's SEED-Coin Application 2 411 or from Trader 2's Key Master C 412. To avoid identity spoofing, Trader 1's SEED-Coin Application 1 406 or Trader 1's Key Master B 407 may directly verify Trader 2's Identity Token 472 with Registry 620 and retrieve Trader 2's public key portion of Trader 2 Identity Key Pair 473 from the Registry 620.

Trader 1's Coin Vault 466 may employ Trader 1 Masking Key Pair 465 as part of the encryption and decryption sequence for SEED-Coins. Only Trader 1's Key Master B 407 has the Trader 1 Masking Key Pair 465. Similarly, Trader 1's Coin Vault 466 may employ Trader 1's SEED-Coin Application 1's 406 key pair as part of the encryption and decryption sequence for SEED-Coins. Only Trader 1's SEED-Coin Application 1 406 possesses the private portion of the related key pair.

In assembling and verifying a transaction block for deposit in the Transaction Block Vault 450, Key Master Alpha 400 pulls many data elements from Trader 1's Transaction Vault 1 467, but also requires data elements from the Registry 620 such as the public keys of Trader 1's Identity 460, Trader 2's Identity 470, and Verifier 1's Identity Assertion 480 used to verify the attestations. Key Master Alpha 400 also verifies that the transaction sequence number and transaction File ID from Trader 1's Transaction Vault 1 467 match the same values as at the Registry 620.

One of normal skill in the art will recognize that the examples above represent a portion of the cross-checking and validation features of the crypto currency operations described herein.

Initial Coin Commissioning

Many options exist for commissioning a new coin to occupy a SEED-Coin chain of encrypted blocks. Generally, a community of interest will agree regarding the size of the initial coin offering and determine whether coins will be pre-sold or simply commence trading once the coins have been commissioned.

Initial coin generation will involve a commissioner, one whom operates the Key Master Alpha 400 and the Registry 620, to generate the pre-determined number of coins en masse and deposit the coins in the commissioner's coin vault, like Trader 1's Coin Vault 466. Key Master Alpha 400 will also create the Transaction Block Vault 450.

When coins are sold from the commissioner's coin vault, the transaction process will proceed with the sales process described herein. In the resulting transaction, the seller would be the community of interest and the buyer would be the respective buying trader.

The exemplary mechanism represents one of many ways in which the SEED Protocol 500 may be configured to support crypto currency operations. The present application is intended to be inclusive of all such variations.

The crypto currency configuration described herein may be utilized to trade any commodity.

Wide Applicability

With the three uses cases for SEED-Chain detailed herein—voting, smart contracts, and crypto currencies—one of normal skill in the art may extrapolate many other ways in which the SEED Protocol's 500 SEED-Chains, the related cryptographic attributes, and the triangulation capabilities may be utilized to serve a wide variety of use cases in which distributed indelible ledgers and distributed verification are required.

One may also utilize SEED-Chains, as described herein, independently of the SEED Protocol 500.

Key Master Admin Application and Adding a User to an Existing Key Master

Administration of Key Masters 112 can be aided by a Key Master Admin Application 510, improving convenience and security of the mechanism as depicted in FIG. 19.

New User 553 using New User Application 554 establishes identity with Registry 620, which may include various forms of identity verification as depicted in reference numeral 1, and may include establishing SEED-Direct $2^{nd}$ factor authentication using a Mobile Device 557 as described herein.

New User 553 using New User Application 554 requests services from an existing Key Master 112 including submission of credentials established with Registry 620 as depicted in reference numeral 2.

Key Master 112 and New User Application 554 identify one another using unique Key Master 112 serial number and/or other unique identifiers as depicted in reference numeral 2.

Key Master 112 communicates to Registry 620 the credentials of the New User 553 and New User Application 554 who is requesting services from existing Key Master 112, seeking authorization to provide services as depicted in reference numeral 3.

New User Application 554 transmits Key Master's 112 serial number and/or other unique identifiers to Registry 620, along with credentials of New User 553 as depicted in reference numeral 1.

Registry 620 confirms match of information coming from New User Application 554 and existing Key Master 112 regarding New User 553. The Registry 620 may also gather additional information such as IP address of New User's App 554 to aid in detection of anomalous behavior.

If Registry 620 detects a mismatch or anomaly, then Registry 620 notifies Key Master Admin 511 of denied request for new user creation, along with any other requested information regarding denied new user credentials and associated Key Master 112. Such notification may occur via a Key Master Admin Application 510 as depicted in reference numeral 4, via text message, e-mail, or other forms of communications.

If Registry 620 detects no mismatches or anomalies, then Registry 620 notifies Key Master Admin 511 of request for new user creation. Such notification may occur via a Key Master Admin Application 510 as depicted in reference numeral 4, via text message, e-mail, or other forms of communications.

Key Master Admin 511 notifies Registry 620 of approval or denial of request from New User 553 to be served by existing Key Master 112. Such approval or denial may occur via a Key Master Admin Application 510 as depicted in reference numeral 4.

Registry 620 notifies existing Key Master 112 of approval or denial decision by Key Master Admin 511 as depicted in reference numeral 3.

If Key Master 112 receives approval to provide services to New User 553 and to New User Application 554, then normal operations may proceed as described herein.

Key Master Admin Application and the Key Vault

To prevent loss of access to encrypted data due to loss of private keys, a Key Vault 520 may be created by the Key Master Admin Application 510 to which all private keys may be automatically and securely stored as illustrated in FIG. 19.

The combination of low cost Key Masters 112 and the Key Vault 520 enables distribution of encryption functions down to individuals or small groups of users such as workgroups, small offices, families, etc.

The Key Master Admin Application 510 may integrate the Key Vault 520 within itself or elect to use any secure storage location.

In this variation of the process, the Key Master Admin Application 510 does not have encryption/decryption capabilities thus making the Key Master Admin Application 510 and associated Key Vault 520 very lightweight able, for instance, to be operated on a mobile smart phone.

Using the Key Master Admin Application 510, the Key Master Admin 511 will authenticate to the Registry 620 as depicted in reference numeral 4. Such authentication may include SEED-Direct $2^{nd}$ factor authentication using a Mobile Device 557 as well as described herein.

Upon initialization of a Key Master 112, the Key Master 112 will send to Key Vault 520 a portion of its private key, for instance, two-of-three components, encrypted with the Registry's 120 public key, plus the remaining portion of its own private key, for instance the third of three components, which may remain unencrypted in the Key Vault 520. This initial deposit of the Key Master 112 private key becomes central to the key recovery process described below.

Each time the Key Master 112 generates a new key pair for an identity or a vault, the Key Master 112 encrypts the newly generated private key and related identity or vault token with the Key Master's 112 own public key. The Key Master 112 then transmits the encrypted private key and related token to the Key Vault 520 through the Key Master Admin Application 510 as depicted in reference numeral 5.

The Key Master Admin Application 510 and Key Vault 520 may employ a variety of security measures to prevent unauthorized access to the data stored in the Key Vault 520, but even if breached, no unencrypted data is at risk. Even if the contents of the Key Vault 520 could be decrypted by unauthorized parties, the unauthorized parties still lack access to the encrypted files or any information regarding the identities to which the keys relate.

Restoration of Keys from a Key Vault after Failure of Serving Key Master

If a Key Master 112 fails or is destroyed a Key Vault 520 may be used to restore the private keys of the failed Old Key Master 712 to the New Key Master 714 as illustrated in FIG. 20.

Upon start-up of a New Key Master 714 to replace an Old Key Master 712, the New Key Master 714 will generate its own device key pair and identify itself to the Registry 620, including providing the Registry 620 with the New Key Master's 714 public key as depicted in reference numeral 1.

The Key Master Admin 511, using the Key Master Admin Application 510, will authenticate to the Registry 620 as depicted in reference numeral 3, a process which may also employ SEED-Direct $2^{nd}$ factor authentication using a Mobile Device 557 as described herein.

Key Master Admin 511, using Key Master Admin Application 510, provides New Key Master 714 device ID to Registry 620 as depicted in reference numeral 3. Registry 620 acknowledges the pairing of the Key Master Admin Application 510 to the New Key Master 714 as depicted in reference numeral 3.

Key Master Admin Application 510, using Key Vault 520, transmits the two-of-three components of the Old Key Master's 712 private key previously encrypted by the Old Key Master 712 with the Registry's 620 public key, to the Registry 620 as depicted in reference numeral 3.

The Registry 620 decrypts the two-of-three components of the Old Key Master's 712 private key by using the Registry's 620 private key, encrypts with the New Key Master's 714 public key, and transmits to the New Key Master 714 as depicted in reference numeral 1.

The New Key Master 714 decrypts the two-of-three components of the Old Key Master's 712 private key using the private key of the New Key Master 714.

The Key Master Admin Application 510 transmits from the Key Vault 520 to the New Key Master 714 the third component of old Key Master's 112 private key as depicted in reference numeral 2.

The New Key Master 714 now has the Old Key Master's 712 private key.

Registry 620 transmits a list of identities and vaults served by Old Key Master 712 to the New Key Master 714 encrypted with the New Key Master's 714 public key as depicted in reference numeral 1.

The Key Master Admin Application 510 transmits from the Key Vault 520 the private keys and related tokens of the identities and vaults served, previously encrypted by the Old Key Master's 712 with its own public key, to the New Key Master 714 as depicted in reference numeral 2, a process that may require a served-identities and served-vaults verification process that may involve the Registry 620, and/or transmission of a served-user list from the New Key Master 714 to the Key Master Admin Application 510.

Using the Old Key Master's 712 private key, the New Key Master 714 can now decrypt the recovered served-identities and served-vaults private keys, restoring the private keys for normal operations by the New Key Master 714.

The Registry 620 updates any other Key Masters 112 with association to Old Key Master 712 of the New Key Master's 714 identification as depicted in reference numeral 4.

The Registry 620 updates any Cloud Lockboxes 130 with association to Old Key Master 712 of the New Key Master 714 identification as depicted in reference numeral 5.

As one of ordinary skill in the art will recognize, if other secure storage has been designated to serve as the Key Vault 520 then a similar process would ensue.

Multiple Registries

A community of interest may operate a single Registry 620 to serve all participants. However, situations may arise in which a community of interest elects to operate multiple Registries 620 such as Registry A 800, Registry B 801 and Registry C 802 as depicted in FIG. 21. The SEED Protocol's 500 inclusion of support for multiple Registries 620 enables tremendous scalability.

In such an embodiment, the Registry A 800, Registry B 801 and Registry C 802 communicate with each other during:

Identity creation processes to confirm uniqueness;
Exchange of permissions changes for access; and
Coordination of other functions as described herein.

Wide Applicability

One with ordinary skill in the art will recognize that the mechanisms described herein may be configured in a variety of ways while retaining the primary characteristics, capabilities, and benefits of the overall design all of which are intended to be addressed in this application. The present application provides in-depth explanation of some of the variations, but the presented variations are not meant to be exhaustive, but rather provide examples.

What is claimed is:

1. A system for use by a plurality of participants within a community of interest for purposes of data integrity, privacy, security, confidentiality and non-repudiation, the system comprising: a tightly-coupled, distributed three-element-core mechanism comprising:

one or more registries managing identities and permissions;

one or more key masters generating, managing and exchanging keys, and providing encryption and decryption services based on third-party encryption libraries; and one or more cloud lockboxes configured to store encrypted data and enable retrieval of protected data;

wherein the three-element-core mechanism is configured to interface with a software application to generate a chain of encrypted blocks stored in vault abstractions to serve as a distributed indelible ledger of transactions for a verification process in which the indelible ledgers are verifiable by a party or parties provided access to the chain of encrypted blocks.

2. The system of claim 1, wherein contents of the encrypted blocks in the chain are flexible for adapting to a specific use case.

3. The system of claim 1, wherein identity tokens and corresponding identity key pairs enable identity assertion within the chain of encrypted blocks.

4. The system of claim 1, wherein identity masking tokens and corresponding identity masking key pairs enable anonymity within the chain of encrypted blocks.

5. The system of claim 1, wherein the chain of encrypted blocks is configured to be transformed into additional and related chains of encrypted blocks to support a complex, multi-step use case with the blocks stored in one or more vault abstractions.

6. The system of claim 1, wherein the verification process traverses all related chains of encrypted blocks.

7. The system of claim 4, wherein a participant may trace their own anonymized activity through a series of transactions and through all related chains of encrypted blocks with the blocks stored in one or more vault abstractions.

8. The system of claim 1, wherein contents of a block include data encrypted with two or more cryptographic keys.

9. The system of claim 1, wherein the chain of encrypted blocks is configured to enable full public access to the chain of encrypted blocks for verification purposes through public access to associated vault abstractions.

10. The system of claim 9, wherein enabling full public access to the chain of encrypted blocks maintains anonymity of individual identities.

11. The system of claim 1, wherein the software application may process the chain of encrypted blocks without interaction with the three-element-core mechanism through independent access to the associated vault abstractions.

12. The system of claim 1, wherein the chain of encrypted blocks is replicated to multiple storage locations as blocks are generated.

13. The system of claim 1, wherein the system comprises a voting system, wherein the chain of encrypted blocks, identity tokens and corresponding identity key pairs, and masking tokens and corresponding making key pairs provide for a voting application that meets requirements of voter identification, anonymity of the ballot, and vote-count verification, both collectively and by individual voters through use of multiple related vault abstractions.

14. The system of claim 1, wherein the system comprises a smart contract system, wherein the chain of encrypted blocks, identity tokens and corresponding identity key pairs, and project tokens and corresponding project key pairs provide for a smart contract application.

15. The system of claim 1, wherein the system comprises a crypto currency system, wherein the chain of encrypted blocks, identity tokens and corresponding identity key pairs, masking tokens and corresponding masking key pairs, coin tokens and related data provide for a crypto currency application including commissioning a new coin offering.

16. The system of claim 15, wherein the crypto currency system adapts to trade any commodity.

17. The system of claim 1, further comprising hash values and digital signatures generated by multiple parties for the same data and configured to be used in the verification process.

18. The system of claim 1, wherein a single block may include segments encrypted with different key lengths or different encryption algorithms.

19. The system of claim 1, wherein elements of control for accessing data stored in the vault abstractions are split across the registry, the key master, and the cloud lockbox, the elements of control including identity assertion by the registry, cryptography key pairs by the key master, unique file identifiers in the registry, and encrypted files in the cloud lockbox.

20. A system for use by a plurality of participants within a community of interest for purposes of data integrity, privacy, security, confidentiality and non-repudiation, the system comprising: a tightly-coupled, distributed three-element-core mechanism comprising:

one or more registries managing identities and permissions;

one or more key masters generating, managing and exchanging keys, and providing encryption and decryption services based on third-party encryption libraries; and one or more cloud lockboxes configured to store encrypted data and enable retrieval of protected data;

wherein the three-element-core mechanism is configured to interface with a software application to enable de-identification of identities in a dataset or a transaction stored in vault abstractions by generating and managing a masking token and a related masking key pair.

21. The system of claim 20, wherein a two-way communication between the recipient of the de-identified data stored in one or more vault abstractions and a subject of the data occurs while maintaining anonymity of a subject.

22. The system of claim 20, wherein data regarding the subject is added longitudinally to de-identified data while maintaining anonymity of a subject.

23. The system of claim 20, wherein the data provided to the recipient of the de-identified data is tokenized to prevent re-identification and to eliminate value of the data to a third party.

24. The system of claim 20, wherein elements of control for accessing data stored in the vault abstractions are split across the registry, the key master, and the cloud lockbox, the elements of control including identity assertion by the registry, cryptography key pairs by the key master, unique file identifiers in the registry, and encrypted files in the cloud lockbox.

* * * * *